US011792605B2

(12) United States Patent
Daoura et al.

(10) Patent No.: US 11,792,605 B2
(45) Date of Patent: Oct. 17, 2023

(54) TRACKING DEVICE SYSTEMS

(71) Applicant: PB Inc., Issaquah, WA (US)

(72) Inventors: Daniel J. Daoura, Renton, WA (US); Robert Aldridge, Renton, WA (US); Johnathan Charles Miller, Renton, WA (US); Kal K Lambert, Hammond, OR (US); Nicholas R. Pearson-Franks, Sammamish, WA (US)

(73) Assignee: PB, Inc., Issaquah, WA (US)

( * ) Notice: Subject to any disclaimer, the term of this patent is extended or adjusted under 35 U.S.C. 154(b) by 179 days.

(21) Appl. No.: 17/228,403

(22) Filed: Apr. 12, 2021

(65) Prior Publication Data

US 2021/0274315 A1 Sep. 2, 2021

Related U.S. Application Data

(63) Continuation-in-part of application No. 16/747,458, filed on Jan. 20, 2020, now Pat. No. 10,979,862,
(Continued)

(51) Int. Cl.
*H04W 4/029* (2018.01)
*H04W 4/80* (2018.01)
(Continued)

(52) U.S. Cl.
CPC .......... *H04W 4/029* (2018.02); *H04W 4/023* (2013.01); *H04W 4/20* (2013.01); *H04W 4/38* (2018.02);
(Continued)

(58) Field of Classification Search
CPC ....... H04W 4/029; H04W 4/023; H04W 4/20; H04W 4/38; H04W 4/80; H04W 4/021;
(Continued)

(56) References Cited

U.S. PATENT DOCUMENTS 4,500,051 A 2/1985 Cottle, Jr. et al.
5,528,460 A 6/1996 Byrd
(Continued)

FOREIGN PATENT DOCUMENTS

GB 2389216 A 12/2003
WO 2011057287 A1 5/2011
(Continued)

OTHER PUBLICATIONS

US 9,144,735 B2, 09/2015, Nasiri et al. (withdrawn)
(Continued)

*Primary Examiner* — Quan Zhen Wang
*Assistant Examiner* — Mancil Littlejohn, Jr.

(57) ABSTRACT

In a tracking device system, a networked smart device is enabled to cause execution of an executable function if a trigger condition of a conditional rule is satisfied. The conditional rules are customizable on a user interface of the smart device. The trigger condition may be any information received in a signal from a tracking device, for example, sensor data, location, a time, a date, a button press, a proximity, and more generally a trigger condition can be any condition that has a truth value by which an IF/THEN conditional rule can be evaluated and either is satisfied or is not. Executable functions for use in conditional rules may be selected from functions of a smart device, but also may include any function of a remote machine, network or system. Bluetooth radiotag devices may also include a cellular radio modem for global networking. Network systems may include software for tracking groups of radiotags and for autoprovisioning location and tracking services.

44 Claims, 39 Drawing Sheets

Related U.S. Application Data which is a continuation-in-part of application No. 14/301,236, filed on Jun. 10, 2014, now Pat. No. 10,580,281.

(51) Int. Cl.
*H04W 4/38* (2018.01)
*H04W 4/02* (2018.01)
*H04W 4/20* (2018.01)
*G08B 3/10* (2006.01)
*G06F 3/04847* (2022.01)

(52) U.S. Cl.
CPC ........... *H04W 4/80* (2018.02); *G06F 3/04847* (2013.01); *G08B 3/10* (2013.01)

(58) Field of Classification Search
CPC ......... H04W 4/06; H04W 4/70; H04W 8/005; G06F 3/04847; G08B 3/10; G08B 21/0277; G08B 21/24; H04L 67/04; H04L 67/10; H04L 67/12; H04L 67/306; H04L 67/52; H04L 67/535; H04L 67/563
See application file for complete search history.

(56) References Cited

U.S. PATENT DOCUMENTS

| | | |
|---|---|---|
| 5,587,955 A | 12/1996 | Lee et al. |
| 5,610,596 A | 3/1997 | Petitclerc |
| 5,731,757 A | 3/1998 | Layson, Jr. |
| 5,963,130 A | 10/1999 | Schlager et al. |
| 5,973,599 A | 10/1999 | Nicholson et al. |
| 6,058,309 A | 5/2000 | Huang et al. |
| 6,297,737 B1 | 10/2001 | Irvin |
| 6,756,901 B2 | 6/2004 | Campman |
| 6,774,811 B2 | 8/2004 | Kaufman et al. |
| 6,847,892 B2 * | 1/2005 | Zhou ................. G08C 17/02 342/357.46 |
| 7,034,684 B2 | 4/2006 | Boman et al. |
| 7,091,851 B2 | 8/2006 | Mason et al. |
| 7,114,175 B2 | 9/2006 | Lahteenmaki |
| 7,142,982 B2 | 11/2006 | Hickenlooper et al. |
| 7,180,500 B2 | 2/2007 | Marvit et al. |
| 7,218,944 B2 | 5/2007 | Cromer et al. |
| 7,274,295 B2 | 9/2007 | Koch et al. |
| 7,321,774 B1 | 1/2008 | Lau et al. |
| 7,418,257 B2 | 8/2008 | Kim |
| 7,420,465 B2 | 9/2008 | Ritter |
| 7,479,871 B2 | 1/2009 | Holowick |
| 7,502,619 B1 | 3/2009 | Katz |
| 7,551,930 B2 | 6/2009 | Lempiö et al. |
| 7,639,138 B2 | 12/2009 | Chang |
| 7,705,728 B2 | 4/2010 | Mock et al. |
| 7,768,393 B2 | 8/2010 | Nigam |
| 7,805,382 B2 | 9/2010 | Rosen et al. |
| 7,880,613 B1 | 2/2011 | Maeng |
| 7,924,141 B2 | 4/2011 | Tuttle |
| 7,929,951 B2 | 4/2011 | Stevens |
| 8,058,988 B1 * | 11/2011 | Medina, III ........... G08B 21/24 340/539.1 |
| 8,063,789 B2 | 11/2011 | Kaufmann |
| 8,081,072 B2 | 12/2011 | Scalisi et al. |
| 8,094,011 B2 | 1/2012 | Faris et al. |
| 8,130,096 B2 | 3/2012 | Monte et al. |
| 8,144,015 B2 | 3/2012 | Burket et al. |
| 8,195,203 B1 | 6/2012 | Tseng |
| 8,280,351 B1 | 10/2012 | Ahmed et al. |
| 8,295,483 B2 | 10/2012 | Kageyama |
| 8,299,920 B2 | 10/2012 | Hamm et al. |
| 8,310,379 B2 | 11/2012 | Johnson |
| 8,328,092 B1 | 12/2012 | Robinson et al. |
| 8,385,883 B2 | 2/2013 | Rajan et al. |
| 8,395,968 B2 | 3/2013 | Vartanian et al. |
| 8,421,619 B2 | 4/2013 | Scalisi et al. |
| 8,427,969 B1 | 4/2013 | Juillard |
| 8,456,329 B1 | 6/2013 | Tran et al. |
| 8,502,900 B2 | 8/2013 | Fujino et al. |
| 8,506,524 B2 | 8/2013 | GråSkov et al. |
| 8,570,373 B2 | 10/2013 | Variyath et al. |
| 8,577,392 B1 | 11/2013 | Pai et al. |
| 8,604,925 B2 | 12/2013 | Monte et al. |
| 8,611,321 B2 | 12/2013 | Herrala et al. |
| 8,620,343 B1 | 12/2013 | Lau et al. |
| 8,620,841 B1 | 12/2013 | Filson et al. |
| 8,630,699 B2 | 1/2014 | Baker et al. |
| 8,633,817 B2 | 1/2014 | Khorashadi et al. |
| 8,665,784 B2 | 3/2014 | Kang et al. |
| 8,676,182 B2 | 3/2014 | Bell et al. |
| 8,761,804 B2 | 6/2014 | Johnson |
| 8,803,659 B2 | 8/2014 | Hill |
| 8,810,392 B1 | 8/2014 | Teller et al. |
| 8,812,028 B2 | 8/2014 | Yariv et al. |
| 8,839,386 B2 | 9/2014 | Gilboy |
| 8,862,378 B2 | 10/2014 | Curatolo et al. |
| 8,869,248 B2 | 10/2014 | Moosavi et al. |
| 8,989,096 B2 | 3/2015 | Chhabra et al. |
| 9,007,264 B2 | 4/2015 | Riley et al. |
| 9,024,749 B2 | 5/2015 | Ratajczyk |
| 9,043,433 B2 | 5/2015 | Backholm et al. |
| 9,113,300 B2 | 8/2015 | Marti et al. |
| 9,174,123 B2 | 11/2015 | Nasiri et al. |
| 9,196,139 B2 | 11/2015 | Gutierrez et al. |
| 9,253,752 B2 | 2/2016 | Lee et al. |
| 9,277,386 B1 | 3/2016 | Masiero et al. |
| 9,283,847 B2 | 3/2016 | Riley, Sr. et al. |
| 9,297,882 B1 | 3/2016 | Bhatia |
| 9,357,348 B2 | 5/2016 | Evans et al. |
| 9,392,404 B2 | 7/2016 | Daoura et al. |
| 9,392,405 B1 | 7/2016 | Auvenshine et al. |
| 9,525,969 B2 | 12/2016 | Evans et al. |
| 9,525,970 B2 | 12/2016 | Farley et al. |
| 9,654,916 B2 | 5/2017 | de la Broise |
| 9,665,913 B2 | 5/2017 | Loutit |
| 9,685,066 B2 | 6/2017 | Vega et al. |
| 9,699,612 B2 | 7/2017 | Evans et al. |
| 9,710,821 B2 | 7/2017 | Heath |
| 9,774,410 B2 | 9/2017 | Daoura et al. |
| 9,794,898 B1 | 10/2017 | Chapiewski |
| 9,813,992 B2 | 11/2017 | Peinhardt et al. |
| 9,820,106 B2 | 11/2017 | Farley et al. |
| 9,900,119 B2 | 2/2018 | Daoura et al. |
| 9,955,305 B2 | 4/2018 | de Barros Chapiewski et al. |
| 9,961,498 B2 | 5/2018 | Evans et al. |
| 9,965,941 B2 | 5/2018 | de Barros Chapiewski et al. |
| 9,989,626 B2 | 6/2018 | Sumiyoshi et al. |
| 10,008,097 B1 | 6/2018 | Kumar et al. |
| 10,021,516 B2 | 7/2018 | Farley et al. |
| 10,063,331 B2 | 8/2018 | Daoura et al. |
| 10,102,734 B2 | 10/2018 | Kumar et al. |
| 10,111,032 B2 | 10/2018 | Vega et al. |
| 10,361,800 B2 | 7/2019 | Daoura et al. |
| 10,389,459 B2 | 8/2019 | Daoura et al. |
| 10,580,281 B2 | 3/2020 | Daoura et al. |
| 10,937,286 B2 | 3/2021 | Daoura et al. |
| 2002/0070861 A1 | 6/2002 | Teller |
| 2003/0047530 A1 | 3/2003 | Durbin |
| 2003/0095032 A1 | 5/2003 | Hoshino et al. |
| 2003/0210143 A1 | 11/2003 | Haddad |
| 2003/0235172 A1 | 12/2003 | Wood |
| 2004/0021569 A1 | 2/2004 | Lepkofker et al. |
| 2004/0174264 A1 | 9/2004 | Reisman et al. |
| 2004/0192352 A1 | 9/2004 | Vallstrom et al. |
| 2004/0198389 A1 | 10/2004 | Alcock et al. |
| 2005/0068172 A1 | 3/2005 | King |
| 2005/0134459 A1 | 6/2005 | Glick et al. |
| 2005/0139686 A1 | 6/2005 | Helmer et al. |
| 2005/0200478 A1 | 9/2005 | Koch et al. |
| 2006/0046709 A1 | 3/2006 | Krumm et al. |
| 2006/0158310 A1 | 7/2006 | Klatsmanyi et al. |
| 2006/0214855 A1 | 9/2006 | Harada et al. |
| 2006/0250255 A1 | 11/2006 | Flanagan |
| 2007/0070818 A1 | 3/2007 | Inomata et al. |
| 2007/0106775 A1 | 5/2007 | Wong |

(56) References Cited

U.S. PATENT DOCUMENTS

| | | |
|---|---|---|
| 2007/0167175 A1 | 7/2007 | Wong et al. |
| 2007/0194913 A1 | 8/2007 | Yokoshima et al. |
| 2007/0229350 A1 | 10/2007 | Scalisi et al. |
| 2007/0247307 A1 | 10/2007 | Riep |
| 2008/0062120 A1 | 3/2008 | Wheeler et al. |
| 2008/0079581 A1 | 4/2008 | Price |
| 2008/0104649 A1 | 5/2008 | Naaman et al. |
| 2008/0143516 A1 | 6/2008 | Mock et al. |
| 2008/0172173 A1 | 7/2008 | Chang et al. |
| 2008/0174425 A1 | 7/2008 | Torning |
| 2008/0287143 A1 | 11/2008 | Banks et al. |
| 2009/0002188 A1 | 1/2009 | Greenberg |
| 2009/0058663 A1 | 3/2009 | Joshi et al. |
| 2009/0121930 A1 | 5/2009 | Bennett et al. |
| 2010/0080175 A1 | 4/2010 | Kang et al. |
| 2010/0130167 A1 | 5/2010 | Bennett et al. |
| 2010/0164715 A1 | 7/2010 | Buller et al. |
| 2010/0178913 A1 | 7/2010 | Herbert et al. |
| 2010/0273452 A1 | 10/2010 | Rajann et al. |
| 2010/0283600 A1 | 11/2010 | Herbert et al. |
| 2011/0074587 A1 | 3/2011 | Hamm et al. |
| 2011/0140884 A1 | 6/2011 | Santiago et al. |
| 2011/0177790 A1 | 7/2011 | Monte et al. |
| 2011/0254760 A1 | 10/2011 | Lloyd et al. |
| 2011/0263331 A1 | 10/2011 | Koski et al. |
| 2012/0007713 A1 | 1/2012 | Nasiri et al. |
| 2012/0052870 A1 | 3/2012 | Habicher |
| 2012/0086574 A1 | 4/2012 | Blumel et al. |
| 2012/0122480 A1 | 5/2012 | Scalisi et al. |
| 2012/0154115 A1 | 6/2012 | Herrala |
| 2012/0186312 A1 | 7/2012 | Lowder et al. |
| 2012/0309408 A1 | 12/2012 | Marti et al. |
| 2012/0309422 A1 | 12/2012 | Lewis-Evans et al. |
| 2012/0322380 A1 | 12/2012 | Nannarone et al. |
| 2013/0002481 A1 | 1/2013 | Solomon |
| 2013/0069782 A1 | 3/2013 | Duggal et al. |
| 2013/0103606 A1 | 4/2013 | Holliday |
| 2013/0109427 A1 | 5/2013 | Matus |
| 2013/0159350 A1 | 6/2013 | Sankar et al. |
| 2013/0159825 A1 | 6/2013 | Nishio et al. |
| 2013/0166198 A1 | 6/2013 | Funk et al. |
| 2013/0179110 A1 | 7/2013 | Lee |
| 2013/0210360 A1 | 8/2013 | Ljung et al. |
| 2013/0214926 A1 | 8/2013 | Huang |
| 2013/0274587 A1 | 10/2013 | Coza et al. |
| 2013/0274954 A1 | 10/2013 | Jordan, Jr. et al. |
| 2014/0031895 A1 | 1/2014 | Rahimi et al. |
| 2014/0049376 A1 | 2/2014 | Ng |
| 2014/0062695 A1 | 3/2014 | Rosen et al. |
| 2014/0073262 A1 | 3/2014 | Gutierrez et al. |
| 2014/0085089 A1 | 3/2014 | Rasband et al. |
| 2014/0099921 A1 | 4/2014 | Weiss |
| 2014/0135042 A1* | 5/2014 | Buchheim ............... G01S 1/725 455/566 |
| 2014/0162693 A1 | 6/2014 | Wachter et al. |
| 2014/0213301 A1 | 7/2014 | Evans et al. |
| 2014/0228783 A1 | 8/2014 | Kraft |
| 2014/0274135 A1 | 9/2014 | Edge et al. |
| 2014/0274136 A1 | 9/2014 | Edge et al. |
| 2014/0279435 A1 | 9/2014 | Holman et al. |
| 2014/0297900 A1 | 10/2014 | Herbert et al. |
| 2014/0324585 A1 | 10/2014 | Mederos |
| 2014/0329460 A1 | 11/2014 | Loutit |
| 2014/0369695 A1 | 12/2014 | D'Andrade et al. |
| 2014/0378066 A1 | 12/2014 | Liu et al. |
| 2015/0005011 A1 | 1/2015 | Nehrenz et al. |
| 2015/0057518 A1 | 2/2015 | Lebel et al. |
| 2015/0099472 A1 | 4/2015 | Ickovic |
| 2015/0112264 A1 | 4/2015 | Kamen et al. |
| 2015/0168173 A1 | 6/2015 | Lewis-Evans et al. |
| 2015/0235120 A1 | 8/2015 | Warren |
| 2015/0296477 A1 | 10/2015 | Pan et al. |
| 2015/0356848 A1 | 12/2015 | Hatch |
| 2016/0100368 A1 | 4/2016 | Sharma et al. |
| 2016/0262082 A1 | 9/2016 | Flynn et al. |
| 2016/0335878 A1 | 11/2016 | Steven |
| 2017/0019755 A1 | 1/2017 | Thacher et al. |
| 2021/0049877 A1 | 2/2021 | Daoura et al. |

FOREIGN PATENT DOCUMENTS

| | | |
|---|---|---|
| WO | 2013188374 A2 | 12/2013 |
| WO | 2014042507 A1 | 3/2014 |

OTHER PUBLICATIONS

Boehret, "TrackR vs. Tile: The Lost-and-Found Face-Off", Recode, Apr. 1, 2018, pp. 1 through 4, www.vox.com/2015/4/1/11560992/trackr-vs-tile-the-lost-and-found-face-off.

Frank, et al., "The Sensor Internet at Work: Locating Everyday Items Using Mobile Phones,", 2007, 26 pages.

Haartsen, "Bluetooth—The universal radio interface for ad hoc, wireless connectivity", from No. 3, 1998 edition of Ericsson Review journal (8 pages).

Stern, "Finding the Best Lost-Item Trackers: Tile, TrackR and Duet Reviewed", WSJ Message, Jun. 17, 2014, pp. 1 through 6, https://www.wsj.com/articles/finding-the-best-lost-item-trackers-tile-trackr-and-duet-reviewed-1403046981.

The Tile App—Item Finder for Anything, Photo, Facebook, Aug. 8, 2013.

Trackr, "Find lost keys, wallets, phones and more with TrackR pixel", at least as early as Nov. 4, 2018, pp. 1 through 9, TrackR, http://www.thetrackr.com/>.

Trackr, "How it works", retrieved from the internet Sep. 15, 2020, pp. 1 through 7, TrackR, https://secure.thetrackr.com.

U.S. Patent and Trademark Office, "Advisory Action", U.S. Appl. No. 15/959,250, filed Jun. 25, 2019, pp. 1 through 3, Published: U.S.

U.S. Patent and Trademark Office, "Final Office Action", U.S. Appl. No. 14/301,236, filed Mar. 14, 2018, pp. 1 through 25, Published: U.S.

U.S. Patent and Trademark Office, "Final Office Action", U.S. Appl. No. 14/301,236, filed Oct. 21, 2016, pp. 1 through 23, Published: U.S.

U.S. Patent and Trademark Office, "Final Office Action", U.S. Appl. No. 15/959,250, filed Feb. 27, 2019, pp. 1 through 7, Published: U.S.

U.S. Patent and Trademark Office, "Final Office Action", U.S. Appl. No. 15/959,250, filed Feb. 27, 2020, pp. 1 through 23, Published: U.S.

U.S. Patent and Trademark Office, "Interview Summary", U.S. Appl. No. 15/959,250, filed Aug. 23, 2019, pp. 1 through 3, Published: U.S.

U.S. Patent and Trademark Office, "Notice of Allowance", U.S. Appl. No. 14/301,236, filed Nov. 1, 2019, pp. 1 through 24, Published: U.S.

U.S. Patent and Trademark Office, "Notice of Allowance", U.S. Appl. No. 14/967,339, filed Jun. 14, 2017, pp. 1 through 5, Published: U.S.

U.S. Patent and Trademark Office, "Notice of Allowance", U.S. Appl. No. 15/681,806, filed Dec. 21, 2017, pp. 1 through 10, Published: U.S.

U.S. Patent and Trademark Office, "Notice of Allowance", U.S. Appl. No. 15/863,731, filed Jul. 19, 2018, pp. 1 through 5, Published: U.S.

U.S. Patent and Trademark Office, "Notice of Allowance", U.S. Appl. No. 15/959,249, filed Mar. 1, 2019, pp. 1 through 24, Published: U.S.

U.S. Patent and Trademark Office, "Notice of Allowance", U.S. Appl. No. 15/959,250, filed Jun. 30, 2020, pp. 1 through 5, Published: U.S.

U.S. Patent and Trademark Office, "Notice of Allowance", U.S. Appl. No. 15/959,250, filed Aug. 6, 2019, pp. 1 through 5, Published: U.S.

U.S. Patent and Trademark Office, "Notice of Allowance", U.S. Appl. No. 15/959,250, filed Oct. 21, 2020, pp. 1 through 10, Published: U.S.

(56) References Cited

OTHER PUBLICATIONS

U.S. Patent and Trademark Office, "Notice of Allowance", U.S. Appl. No. 16/048,316, filed Jan. 9, 2019, pp. 1 through 9, Published: U.S.
U.S. Patent and Trademark Office, "Notice of Allowance", U.S. Appl. No. 16/048,316, filed Mar. 28, 2019, pp. 1 through 24, Published: U.S.
U.S. Patent and Trademark Office, "Notice of Allowance", U.S. Appl. No. 16/747,458, filed Dec. 28, 2020, pp. 1 through 30, Published: U.S.
U.S. Patent and Trademark Office, "Office Action", U.S. Appl. No. 14/301,236, filed Feb. 12, 2016, pp. 1 through 21, Published: U.S.
U.S. Patent and Trademark Office, "Office Action", U.S. Appl. No. 14/301,236, filed Mar. 8, 2019, pp. 1 through 46, Published: U.S.
U.S. Patent and Trademark Office, "Office Action", U.S. Appl. No. 14/301,236, filed Jul. 14, 2017, pp. 1 through 19, Published: U.S.
U.S. Patent and Trademark Office, "Office Action", U.S. Appl. No. 14/967,339, filed Oct. 20, 2016, pp. 1 through 15, Published: U.S.
U.S. Patent and Trademark Office, "Office Action", U.S. Appl. No. 15/681,806, filed Oct. 10, 2017, pp. 1 through 9, Published: U.S.
U.S. Patent and Trademark Office, "Office Action", U.S. Appl. No. 15/863,731, filed Feb. 8, 2018, pp. 1 through 6, Published: U.S.
U.S. Patent and Trademark Office, "Office Action", U.S. Appl. No. 15/959,249, filed Jun. 1, 2018, pp. 1 through 13, Published: U.S.
U.S. Patent and Trademark Office, "Office Action", U.S. Appl. No. 15/959,250, filed Jun. 14, 2018, pp. 1 through 17, Published: U.S.
U.S. Patent and Trademark Office, "Office Action", U.S. Appl. No. 15/959,250, filed Nov. 18, 2019, pp. 1 through 22, Published: U.S.
U.S. Patent and Trademark Office, "Office Action", U.S. Appl. No. 16/747,458, filed Apr. 17, 2020, pp. 1 through 13, Published: U.S.

\* cited by examiner

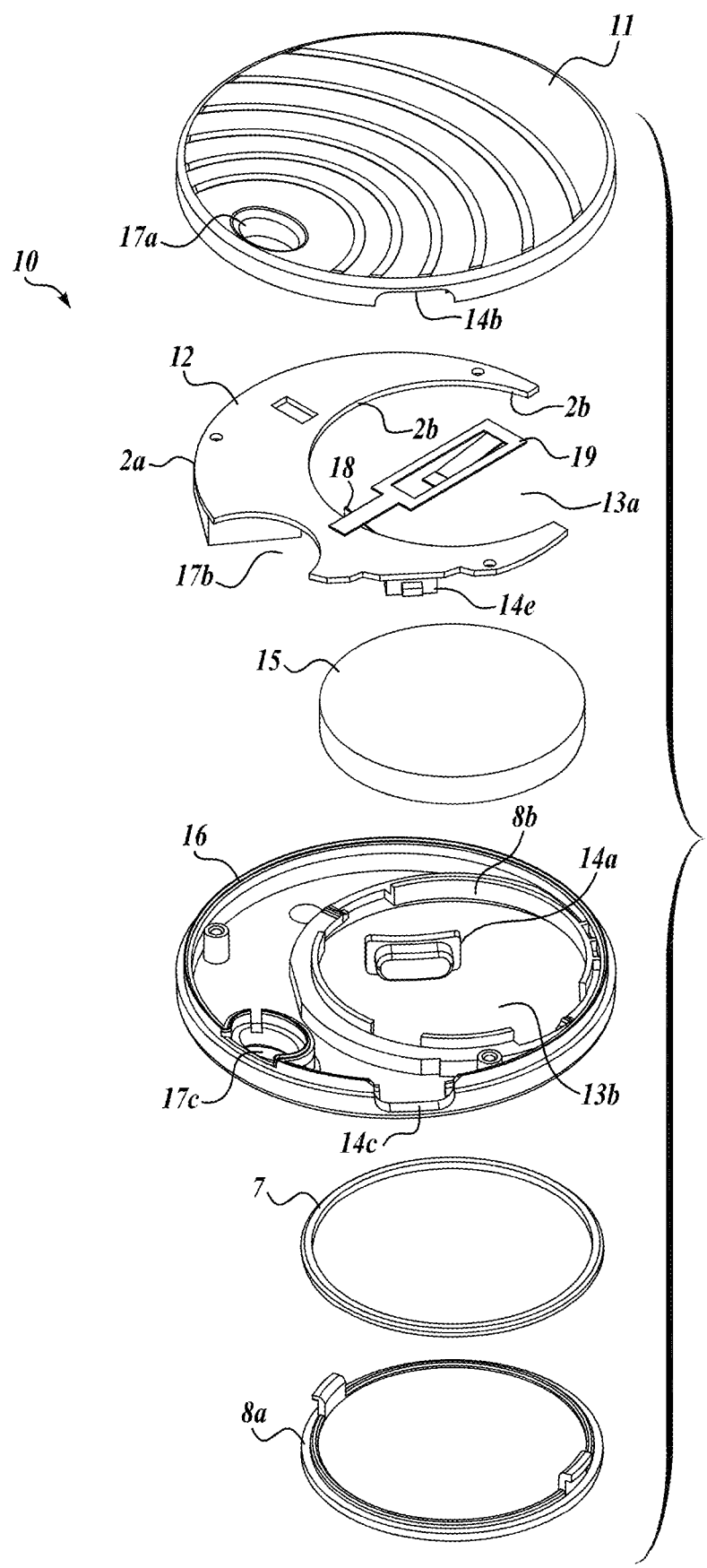

BT SIG FORMAT

BT INQUIRY PACKET (ID PACKET)

BT POLL or NULL PACKET

BT FSH PACKET

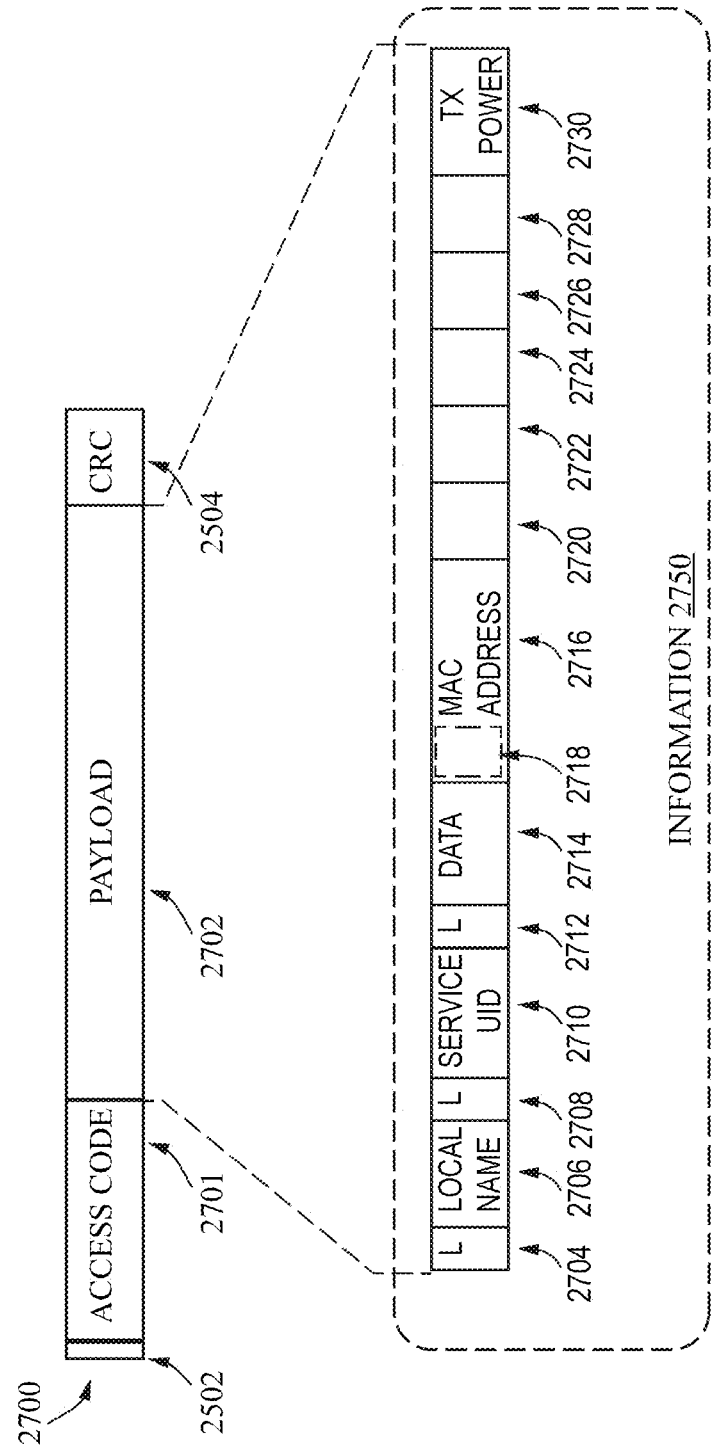

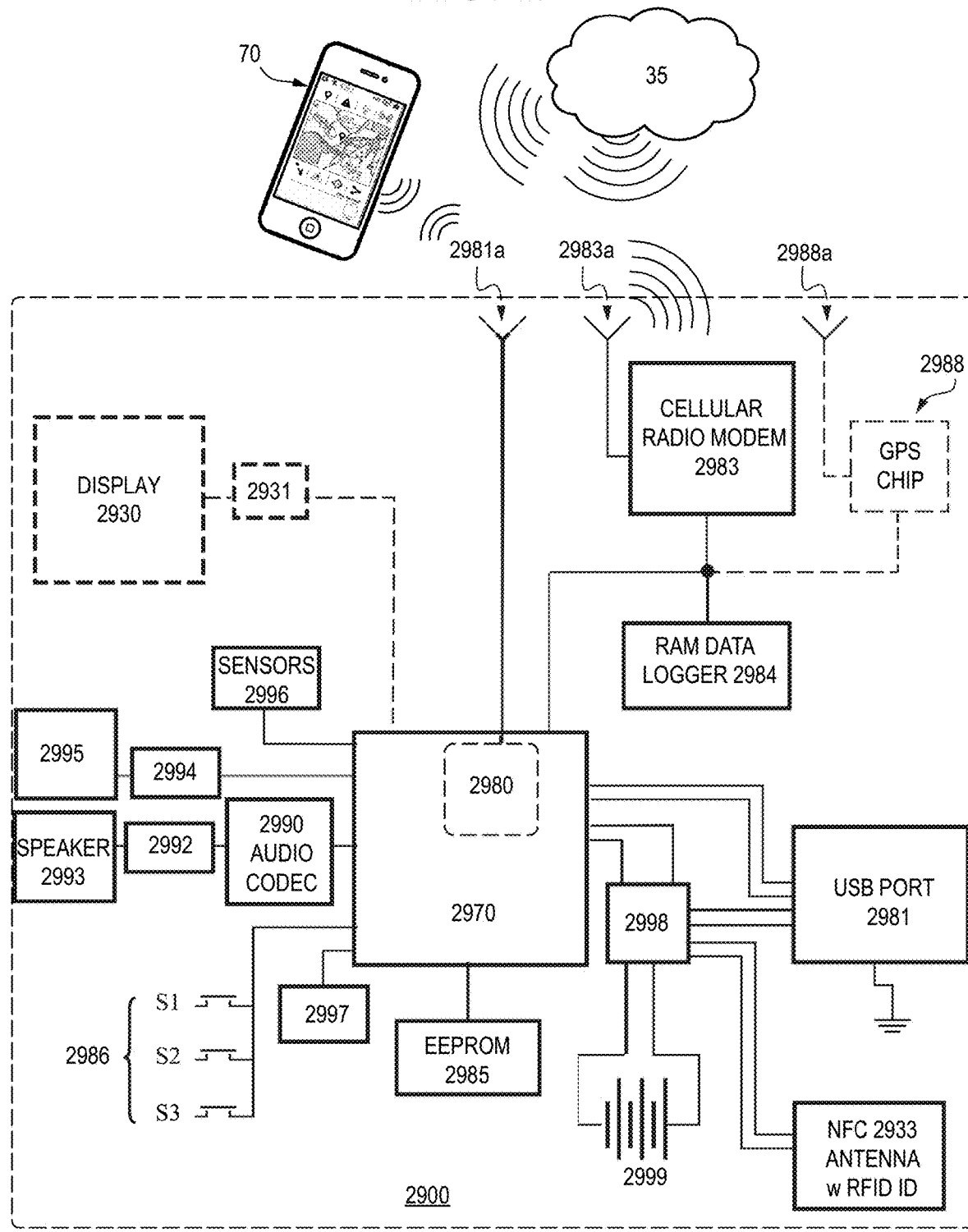

3220

LOG OF RADIO CONTACT RECORDS

FIG. 35

NEW IN →

RADIO CONTACT RECORDS

| TIME STAMP | MAC/UUID ADDRESS | RSSI PRO | LOCATION | DATA1 | DATA2 |
|---|---|---|---|---|---|
| 100 | XXX | 021 | 90.01 | | |
| 110 | XXX | 021 | 90.01 | | |
| 120 | 001 | 080 | 90.01 | AAA | XYZ |
| 130 | XXX | 021 | 90.01 | | |
| 140 | 001 | 080 | 90.01 | BBB | XYZ |
| 150 | XXX | 033 | 90.01 | XXX | XXX |
| 160 | XXX | 022 | 90.01 | XXX | XXX |
| 170 | 001 | 080 | 90.00 | BBB | XYZ |
| 180 | XXX | 042 | 89.88 | | |
| 190 | 003 | 055 | 88.33 | XXX | XYZ |
| 200 | 002 | 045 | 88.33 | ABC | QRT |
| 210 | XXX | 044 | 88.18 | BBB | XYZ |
| 220 | XXX | 038 | 87.01 | | |
| 230 | 001 | 080 | 84.93 | BBB | CDE |

↓ OLD OUT

TRACKING DEVICE SYSTEMS

CROSS REFERENCE TO RELATED APPLICATIONS

This application is a Continuation-in-Part of U.S. patent application Ser. No. 16/747,458, filed 20 Jan. 2020, which is a Continuation-in-Part of U.S. patent application Ser. No. 14/301,236, filed 10 Jun. 2014, now U.S. patent Ser. No. 10/580,281. This application is a Continuation-in-Part of U.S. patent application Ser. No. 16/207,192 filed 2018 Dec. 3, which is a Continuation-in-Part of U.S. patent application Ser. No. 15/853,917, filed 25 Dec. 2017, now U.S. Pat. No. 10,424,189, which is a Continuation of U.S. patent application Ser. No. 14/301,250, filed 10 Jun. 2014, now U.S. Pat. No. 9,892,626.

This application is further related to U.S. patent application Ser. No. 14/820,475 filed 6 Aug. 2015, now U.S. Pat. No. 9,392,404; to U.S. patent application Ser. No. 14/301,213, filed 10 Jun. 2014, now U.S. Pat. No. 9,564,774; to U.S. patent application Ser. No. 16/575,315, filed 18 Sep. 2019, now U.S. patent Ser. No. 10/546,228; to U.S. patent application Ser. No. 15/180,080 filed 12 Jun. 2016, now U.S. Pat. No. 9,961,523; to U.S. patent application Ser. No. 15/924,248 filed 18 Mar. 2018, now U.S. Pat. No. 10,638,401; to U.S. patent application Ser. No. 14/967,339 filed 13 Dec. 2015, now U.S. Pat. No. 9,774,410; to U.S. patent application Ser. No. 15/681,806 filed 21 Aug. 2017, now U.S. Pat. No. 9,900,119; to U.S. patent application Ser. No. 15/863,731 filed 5 Jan. 2018, now U.S. Pat. No. 10,063,331; to U.S. patent application Ser. No. 15/959,249, filed 22 Apr. 2019, now U.S. Pat. No. 10,361,800; to U.S. patent application Ser. No. 15/959,250 filed 22 Apr. 2018, now U.S. patent Ser. No. 10/937,286; to U.S. patent application Ser. No. 16/575,315, filed 18 Sep. 2019; to U.S. patent application Ser. No. 16/950,666, filed 17 Nov. 2020; and to U.S. patent application Ser. No. 17/163,403, filed 30 Jan. 2021. All said related applications are incorporated in full herein by reference for all that they teach.

BACKGROUND

This invention is in the field of wireless electronic radiotags and networks.

There are wireless devices and systems for tracking objects, pets and individuals. For example, radio frequency identification (RFID) tags have long been used to track objects, pets, cattle, and hospital patients. A reader generates an electromagnetic field in the tag and that field powers a small transmitter in the tag that emits a signal with the identity of the tag. The reader picks up the tag's radio waves and interprets the frequencies as meaningful data. RFID tags require close proximity between the reader and the tag and such systems are often limited to generating only identity information and do not provide information about the motion, heading, time, temperature or other environmental characteristics in the vicinity of the tag.

There are systems with sensors attached to clothing or objects for monitoring the physical activity of those wearing the clothing of the motion of the object. See, for example, Pub. No. US 2013/0274587. It has sensor and transmitter to send information about the motion of the object and the temperature sensed by the object. A base station uses GPS or triangulation to identify the location of the object. Although the monitoring system may have one or more alerts, no alerts are provided on the sensors on the clothing of the users.

Other tracking systems use tracking sensors with built-in GPS systems and transceivers for establishing wireless communication with a network. One such system is found in U.S. Pat. No. 8,665,784. However, the power required to operate a GPS system often rapidly drains the battery of such tracking sensors or requires the sensors to have a relatively large package, which is not readily attached to small objects, pets or people.

The prior art solutions do not address the problem of finding small, lost objects in within a room or house as well as at a distance. Known solutions are not compatible or cost effective for individuals. Large sensors that require recharging many batteries impose too high a level of maintenance on an individual. None of the above solutions will find a small sensor that may be hidden in drawer or under a pillow. They do not provide control apparatus for commanding the sensor to emit an audible or visual alert. The prior art shown above is silent regarding the problems of pairing sensors with location, remote controlling a sensor, and using a sensor to remote control a sensor control device over a network, for example.

SUMMARY

This summary is provided to introduce a selection of concepts that are then further described in the Detailed Description. This summary is not intended to be used as an aid in determining the scope of the claimable subject matter.

Embodiments of the "tracking devices" (also termed "radiotags") of the invention are configurable by an individual user to help track or find lost objects and monitor pets and to monitor the activities of small children or hospital patients as part of a lost-and-found radio system. The terms "tracking device" and "radiotag" may be used interchangeably to indicate a radio locator device that is attachable to an asset, person or pet in need of location and tracking services. The system is a comprehensive solution to locate, monitor and track missing pets, people, luggage, inventory, tools and items of interest. In some embodiments, tracking devices incorporate various sensors and control mechanisms that make the tracking devices a versatile multi-function device which can remotely control other devices such as smartphones, tablets, or computers. The device is instrumental in shaping and creating a market for the "internet of things" by allowing a user or network of users to seamlessly share sensor data while providing a regional or global picture of environmental conditions such as temperature, movement, trends in a particular area or simply a collaborative picture of all dogs active in a particular city at a specific time. The tracking device has a speaker and a light emitting diode. A control apparatus is associated with the tracking device. The control apparatus may command the tracking device to emit an alert, including a buzz or flashing light. If a tracked object is inside a drawer or under a pillow, the person searching for the object will hear the buzz or see the flashing light. The control apparatus may also set its own alerts to trigger based upon the distance between the tracking device and the control apparatus. Alerts can be based upon pairing the location of the tracking device to the alert so that alerts are only provided at predetermined locales and/or predetermined times.

Embodiments of the tracking devices conserve power and space. The electronics of the tracking device may be carried on a crescent-shaped printed circuit board that partially encircles a battery. Encircling the battery with the printed circuit board reduces the thickness of the tracking device. Top and bottom covers enclose the printed circuit board and the battery. One cover has an opening to access the battery. In some embodiments the battery may be wirelessly recharged with inductive or solar powered chargers.

The electronics include a Bluetooth low energy transmitter that has enough computing power to control sensors and the tracking device. A ceramic antenna further conserves space. In some embodiments the sensors include a multi-axis sensor such as a nine-axis motion sensor, a heading sensor with magnetic compass and multiaxis gyroscope, or a temperature sensor. Embodiments may omit GPS sensing circuitry and rely on the GPS circuitry in control devices. Other embodiments include GPS circuitry. Using one or more programs in a control apparatus, a tracking device can be set to trigger one or more alerts depending upon the distance between the tracking device and the control apparatus.

There are multiple network embodiments for the tracking devices. In a local network a hub communicates with local tracking devices and relays their sensor outputs to a cloud/internet site. Multiple hubs can form a wider area network that allows the hubs to communicate with each other and triangulate the approximate position of each tracking device. In a still wider area network, tracking devices anywhere in the world can be monitored by position, time of day, motion and any other characteristic or parameter sensed by a tracking device.

The tracking devices are assigned to an owner-user who may grant privileges to others for using the devices of the owner. The owner-user may also have shared privileges with tracking devices of other users. Objects lost anywhere in the world may be located by using position data provided by other control devices that carry the control program and are registered to the cloud/internet site.

The embodiments described herein provide a computer program that is installed on a control apparatus. The computer program enables the control apparatus to detect tracking devices within range of the control apparatus and acquire control of the tracking device unless another control apparatus already controls the device. The control apparatus may also release from its control one or more selected tracking devices. The control program also allows the user to keep private the information of the tracking device. Once set to private, only the control apparatus or other designated apparatuses or individuals will have access to data from the tracking device.

The control program allows the user of the user to select at least one alert. The control device or the tracking device or both may generate the alerts. In order to trigger the alert, the tracking device broadcasts a beacon signal via a Bluetooth transceiver. The signal strength of the beacon signal received by the control apparatus is representative of the distance or range between the control apparatus and the tacking apparatus. The signal strength is considered a condition for a distance alert. If a control apparatus suddenly receives a beacon signal of a controlled tracking device, the control apparatus may indicate the device has returned to a location proximate the control apparatus. Likewise, failure to detect a beacon signal of a controlled tracking device indicates the device is outside the range of the control apparatus. The relative strength of the beacon signal is proportional to the proximity between the control apparatus and the controlled tracking device.

The control apparatus or the tracking device or both may monitor other conditions. Each other condition and combinations of two or more conditions may be paired or otherwise associated with each other to provide multiple conditions for triggering an alert. In addition to the range signal beacon, the tracking device may carry one or more sensors and each sensor may output one or more signals representative of other conditions monitored by the sensors. Other conditions include and are not limited to motion of the sensor in any direction or in a particular direction; temperature and other signals representative of time, the geographic location of the tracking device or both, motion and other physical, biological or chemical conditions being monitored by sensors. As such, each condition monitored may be associated or paired with any other one or more conditions to provide multiple conditions that must be met to trigger an alert.

The beacon signal includes the identification information for the tracking device and a signal representative of the status of the charge of the battery, and is broadcast as a bitstream containing bits in fields or frames having a defined format. The program displays both the range and battery status information. As explained above, the location of the tracking device may be detected by other control devices, which may assist the owner in locating a lost tracking device. Accordingly, the control apparatus, if associated with network of other control apparatuses, may acquire information about the location of a tracking device remote from the other networked control apparatus. The control program provides a feature for selecting a map displaying the remote location of each tracking device controlled by the control apparatus.

In other embodiments the control program allows the control system to remotely control operation of the tracking device or allow the tracking device to remotely control the control apparatus or both. The control program enables the control apparatus to activate an audible or visual alarm or both by selecting a corresponding alarm button shown on a display of the control program. The control program allows the control apparatus to allow one of more of its operations to be controlled by the tracking device. The control program permits the user to set the multi-function button on the tracking device to operate a camera, an email or a text messaging system of the control apparatus. In addition, the multi-function button may be programmed with the control program to activate an audible alarm on the control apparatus. For example, pressing the multi-function button may cause a smartphone control apparatus to emit a distinctive sound.

In yet other instances, the control program may be configured to allow the user to define groups of objects (each having a tracking device) and to find or track those objects as a group. In selected instances, the control program may be configured to track objects leaving a geofenced area with other users. And in some instances the message traffic may be repurposed for orientation purposes.

The embodiments described herein provide a computer program that is installed on a cloud host. The cloud host is a server or servers having an IP address and is accessible via a packet data environment. The cloud host includes programs and databases designed to implement lost-and-found location and tracking services.

BRIEF DESCRIPTION OF THE DRAWINGS

The teachings of the inventive art disclosed here are more readily understood by considering the drawings in conjunction with the written description including the claims, in which:

FIG. 1C is an exploded top-to-bottom perspective view of an assembly for a tracking device showing a covers on opposite sides of a printed circuit board (PCB), battery next to an opening in the PCB and a battery connector on one of the covers.

FIG. 27 is a view of the structure of a proprietary inquiry response packet

FIG. 29 is a schematic of an embodiment of an XCB device.

FIG. 35 is a view of a rolling memory stack containing radio contact records.

DETAILED DESCRIPTION

While exemplary embodiments have been illustrated and described, it will be appreciated that various changes can be made therein without departing from the spirit and scope of the invention.

Figure 1A:
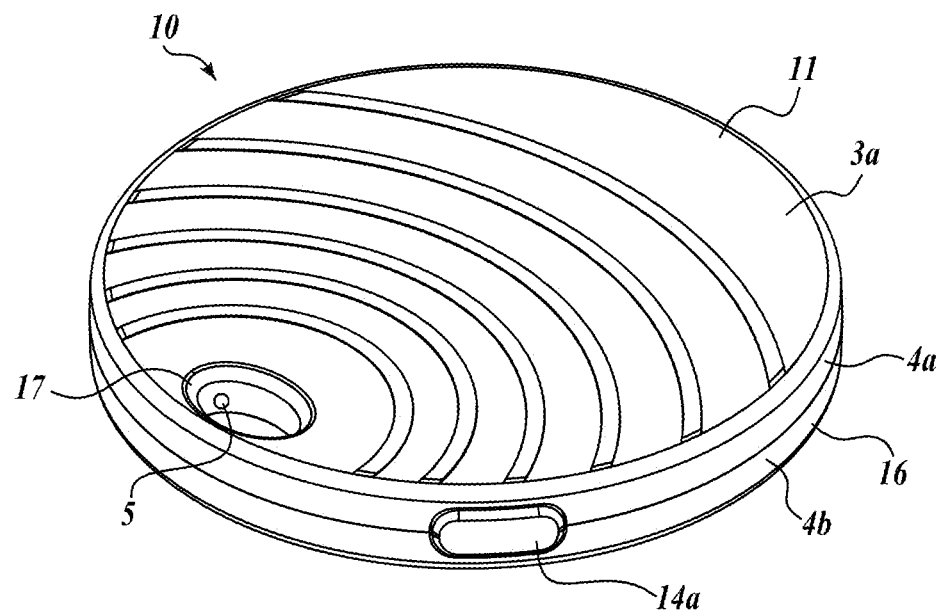
FIG. 1A is a perspective view of the top of a first tracking device.
Figure 1B:
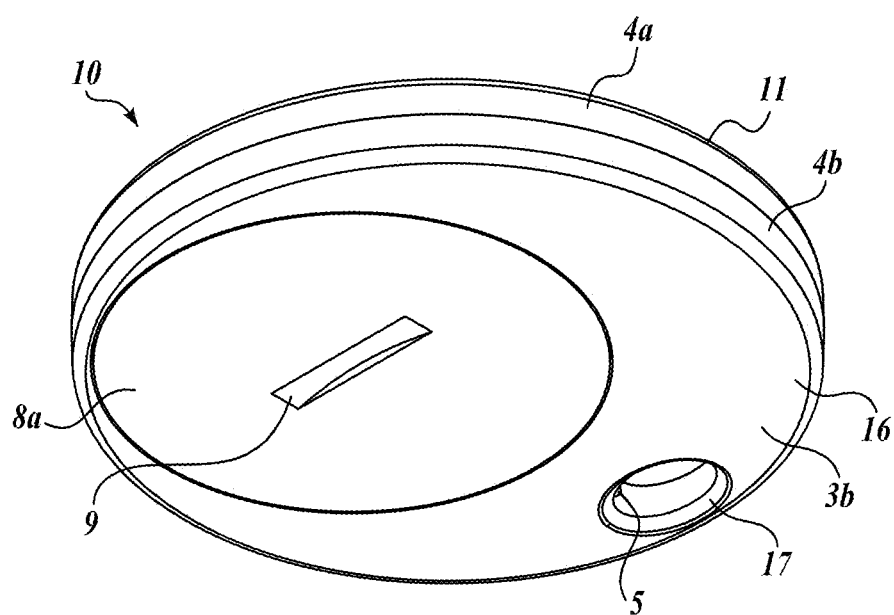
FIG. 1B is a reverse perspective view of the tracking device shown in FIG. 1A.

One embodiment of a tracking device 10 is shown in FIGS. 1A, 1B. The tracking device 10 is an assembly having outside covers 11, 16. The covers are made of glass filled acrylonitrile butadiene styrene (ABS) thermoplastic which is light in weight, can be injection molded and is resistant to impact, heat, water, acids, alkalis, alcohols and oils. The covers 11, 16 have circular-shaped bodies 3a, 3b, each with an annular wall 4a, 4b. The covers also form a through-hole 17 for receiving a cord or chain to attach the tracking device to an object, a pet or the clothing of a person.

Figure 1D:
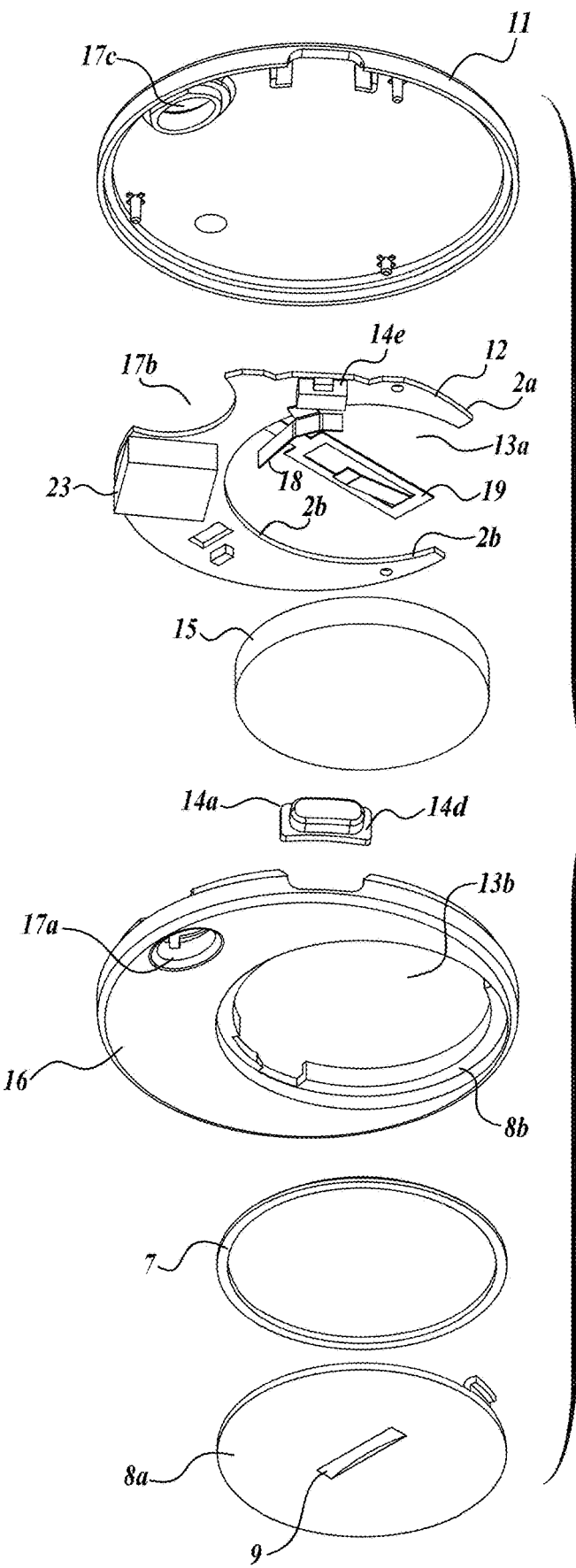
FIG. 1D is a reverse exploded perspective view of the tracking device shown in FIG. 1C.

Turning to FIGS. 1C, 1D, the covers 11, 16 enclose a printed circuit board (PCB) 12 and a battery 15. The PCB 12 has a crescent-shaped body with an outer edge 2a having a radius of curvature slightly smaller than the radius of curvature of the covers 11, 16 and an inner edge 2b with a smaller radius of curvature. Two circular arcs of different diameters thus define the crescent shape of the PCB 12. The PCB 12 has an opening 13a for receiving a circular battery 15.

The diameter of the battery 15 is smaller than the diameter of opening 13a in the PCB 12. The battery 15 has one terminal on its surface and another terminal on its edge.

The edge of the battery engages a conductive edge connector 18 on the inner edge 2b of the PCB 12. Another conductor has a spring-biased body 19 that extends from the PCB 12 toward the middle of a surface of the battery 15. The battery 15 is held in the opening 13a, 13b between the two covers 11, 16 and against the conductive edge connector 18 on the inner edge 2b of the PCB 12. Cover 11 has a ripple wave design on its surface.

Figure 1E:
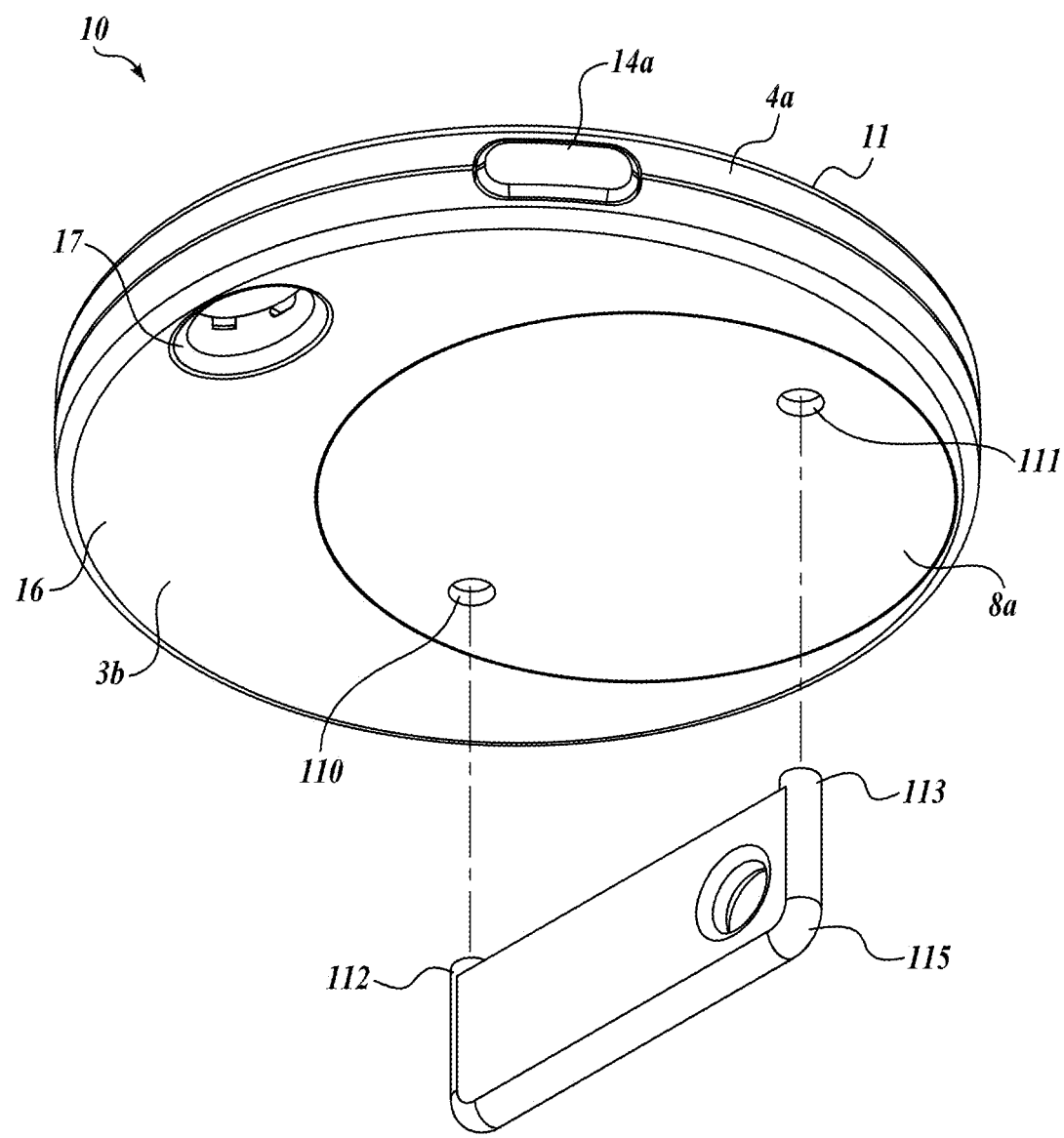
FIG. 1E is a view of an alternate battery cover.

Cover 16 has an opening 13b sufficient to receive the battery 15. A threaded battery cover 8a, a matching threaded annular wall 8b and an O-ring 7 secures battery 15 in the openings 13a, 13b. A detent 9 in the surface of the battery cover 8a receives an opening tool, such a screwdriver or the edge of a coin (not shown). Inserting the tool in the detent and rotating the cover 8a open the cover to access the battery. In an alternate embodiment as shown in FIG. 1E, the slot 9 is replaced by two spaced-apart holes 110, 111. A key 115 has two prongs 112, 113 that fit into the spaced-apart holes and allow a user to apply torque to the cover 8a to open it and remove the battery 15.

The tracking device is assembled by inserting a PCB 12 with component circuitry on the inside surface of cover 16. The other cover 11 is placed on top of cover 16 to define a cavity that holds the battery 15 and the PCB 12. The two covers are ultrasonically sealed to resist water or other materials from entering the device 10. A battery is inserted through opening 13b in cover 16 and the battery cover 8a engages the O-ring 7 and the threaded wall 8b. Cover 8a rotates in opposite directions to close or open. By encircling the battery with the PCB 12, the PCB does not increase the thickness of the assembly that is determined only by the covers 11, 16 and the thickness of the battery 16. Some embodiments are 5 mm thin and 40 mm in diameter. Unlike other devices that use batteries, the PCB does not contribute to the thickness of the device 10 because the battery 15 does not rest on the PCB 12 but is partially encircled by the opening 13c in the PCB 12.

A multi-function button 14a extends from an opening defined by half-oval walls 14b, 14c in the sidewall of the junction of the annular walls 4a, and 4b. In one embodiment there is a single multi-function rubber button 14a that extends from the edge of the device. Button 14a is held in place by wall edges 14b, 14c that overlap surface 14d to hold the rubber button 14a inside the covers 11,16. The rubber button is aligned with a mechanical button 14e that is attached to the PCB 12 and coupled to core device 21. The covers 11, 16 and the PCB 12 have aligned openings 17a, 17b, 17c that create an external key ring hole 17 for holding a key ring, a carrying chain or cord. As will be explained below, the component circuitry has a speaker for sounding one or more alarms. The edge of the covers defines a key ring hole 17 that has on or more small holes that may be sealed. In those embodiments a removable rubber plug 5 is inserted into the hole to prevent moisture and water from entering the cavity holding the component circuitry 20. As an alternative, a larger rubber plug could fill the entire keyhole opening 17 or at least cover the annular inner surface of the keyhole.

Figure 2A:
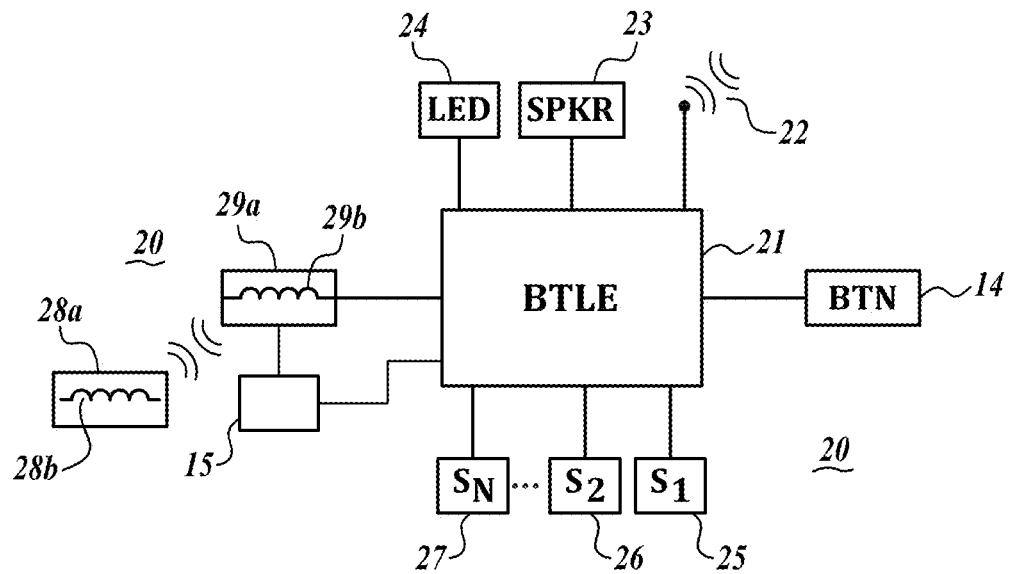
FIG. 2A is block diagram of elements on the PCB.

FIG. 2A shows the component circuitry 20 of the PCB 12, including a Bluetooth low energy (BTLE) core device 21. The core device 21 includes a transceiver for sending and receiving information signals and control signals. The core device also includes a microprocessor, read only memory and random access memory sufficient to enable the core device 21 control the other components on the PCB 12. In a further embodiment, a permanent or removable memory device is added to the device. The memory may be added through another side hole similar to the side hole formed by walls 14b, 14c that hold the rubber button 14d in place. The memory device could be inserted or removed through the second sidewall hole and a rubber stopper, similar to rubber button 14a, would seal the opening second sidewall hole. The memory device may hold information sensed by the sensors.

The core device 21 is assigned a unique identification code known to the user and the core device broadcasts the code at periodic intervals. The maximum range of the core device 21 is approximately 300 feet. Broadcasts are made using a ceramic antenna 22. The ceramic antenna saves space. A typical ceramic antenna may take up only 20% of the space occupied by a trace antenna, thereby contributing to the overall small size of tracking device 10.

The core device 21 controls a speaker 23 and a light emitting diode (LED) 24. The speaker 23 and the LED 24 provide alarms for the tracking device 10. The cover 11 is thin enough to allow light to pass through. In alternate embodiments, a clear or highly translucent window is provided in the cover 11 above the LED 24.

The core device 21 is connected to one or more sensors 25, 26 or any number of sensors 27. The sensors in some embodiments sense physical parameters experienced by the tracking device 20, including and not limited to displacement, motion, acceleration, electromagnetic radiation, radioactivity, temperature, sound, pressure and other physical parameters. In some embodiments, a sensor 25 is a combined 9-axis motion sensor and temperature sensor. The sensor 25 has an accelerometer, gyroscope, and magnetometer for each axis. The information output by the 9-axis sensor enables the receiver to track the position of the tracking device from one location to another location. The motion of the tracking device can be monitored continuously as long as a receiver is close enough to record the motion output information of the 9-axis sensor 25. As an alternative, the information may be stored in the memory.

A multi-function button 14a is operable to perform one of more functions described in more detail below. The single button 14a on the tracking device 10 and one or more control programs resident on a control apparatus 37 (see FIG. 3) operate together to set one or more alarms, pair triggers and remotely control operations of the control apparatus 37. Those skilled in the art understand that a control apparatus may be any electronic device with processor, memory and communication ability including and not limited to a smartphone, a smartwatch, a desktop computer, a laptop or notebook computer, a tablet computer, a personal digital assistant, or any equivalent device that can store and hold programs and data, execute programs, receive and/or transmit information and commands via wired or wireless channels of communication.

Some embodiments of the invention are equipped with rechargeable batteries that may be recharged via a wireless or wired recharging apparatus or a solar recharging apparatus. Wireless chargers, also known as induction chargers, typically place one coil in a charging device or pad that is connected to an AC power source and another (receiver) coil inside the device with a rechargeable battery. As shown in FIG. 2A, a transmitter module 28a has a transmitter coil 28b that produces a time-varying electromagnetic field that is coupled to a receiver coil 29b of a receiver module 29a on the PCB 12. The receiver module 29a also includes circuitry to convert AC voltage and current to DC voltage and current. The core device 21 controls operations of the receiver module 29a and turns it on and off to recharge the battery 15 as needed. Transmitter and receiver modules are available from a number of integrated device manufacturers.

Other embodiments of the invention may have wired rechargers. These are well known devices and may be incorporated into tracking devices 10 by providing a suitable port (not shown) to receive power from an external power source. However, such external ports provide openings in the covers 11, 16 where water or other fluids may gain entry to the cavity holding the PCB 12 and its component circuitry 20.

Figure 2B:
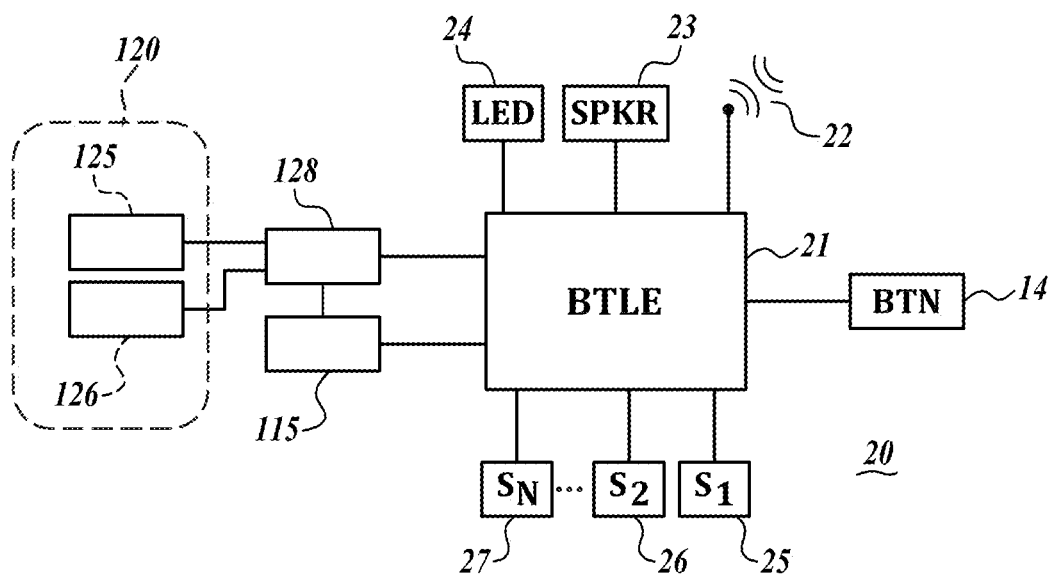
FIG. 2B is a partial schematic of an alternative charging system.

Still other embodiments may have solar recharging systems such as shown in FIG. 2B. One such solar recharging system 120 has one or more solar cells 125, 126 located on respective covers 11, 16 and connected to a battery regulator circuit 128 and rechargeable battery 115. Core device 21 is connected to the regulator circuit 128 and battery 115. The core device 21 uses the solar current to know whether the tracking device is in available light or not. In that way, the solar cells provide a dual role by acting as light sensors. This allows further flexibility by pairing any other sensed parameter to the presence or absence of light. The amount of current generated by the solar cells 125, 126 indicates the intensity of light received by the tracking device 10.

Other embodiments of the tracking device have circuitry for harvesting RF power to charge the battery 115. At http://www.hindawi.com/journals/apec/2010/591640/there is described an RF harvester having a GMS antenna, one or more resonant circuits, boosters, peak detectors and an adder. The circuitry contains passive components and is designed to have tuned circuits at known frequencies of cell phone towers (960 MHz) and Bluetooth devices (2.4 GHz). The boosters are Villard voltage multipliers. Reported test results show the RF harvester located within 500 meters of a cell tower was capable of generating 158 nW and successfully operated a calculator and a light emitting diode.

Figure 3:
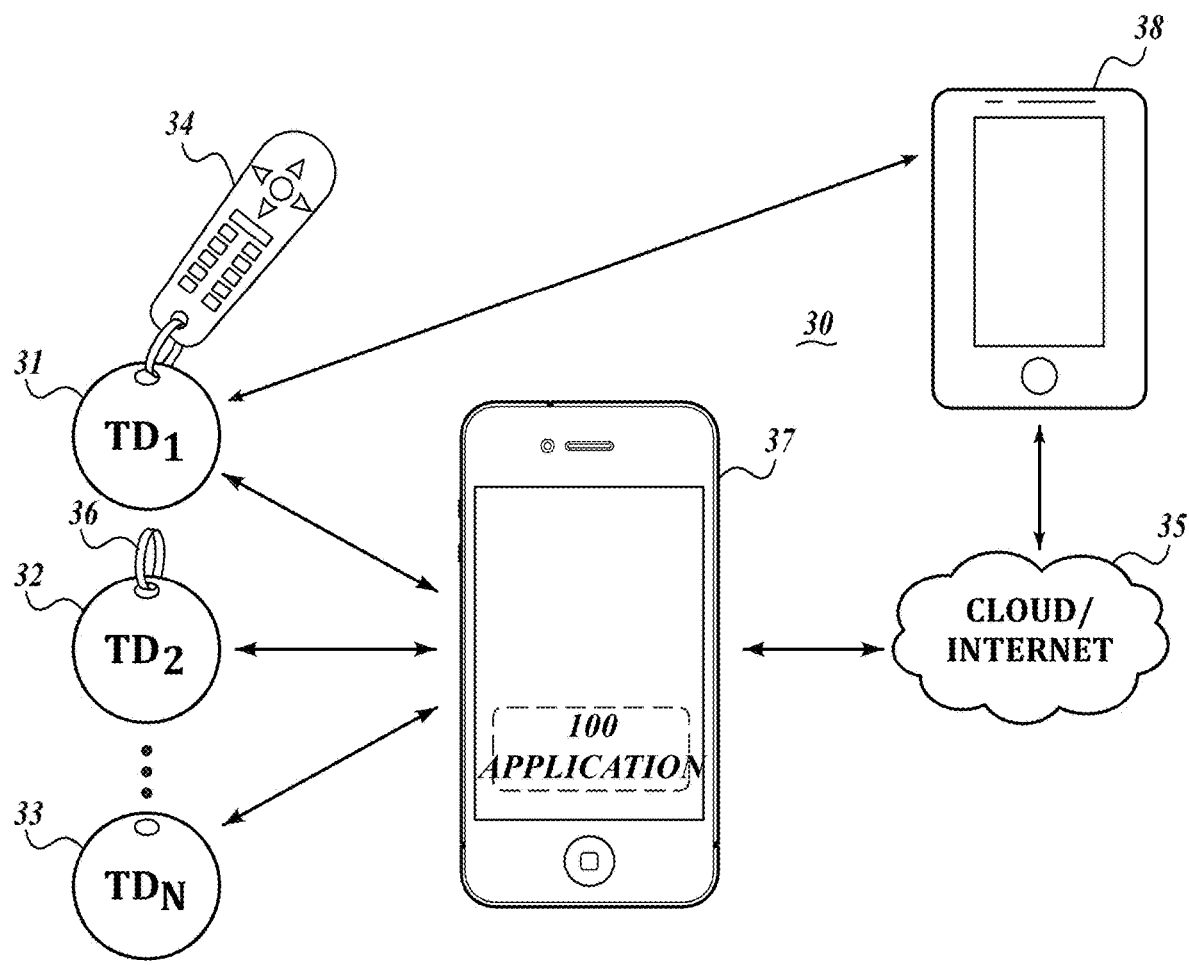
FIG. 3 is a view of the basic tracking system.

Turning to FIG. 3, an embodiment of a first system 30 is shown. The system includes tracking devices $TD_1$ 31, $TD_2$ 32, ... $TD_N$ 33. Each tracking device 10 is paired with a control apparatus 37 which may be a computer, a tablet, a smartphone or a smartwatch, for example. The control apparatus 37 has a transceiver for establishing a wireless connection to the cloud/internet 35. In this patent a symbolic cloud and the reference number 35 are metaphors for the internet itself, for local area networks, for wide area networks and for individual sites on the internet where users may store and retrieve programs and data. Control apparatus 37 may create one or more alerts based upon the relative location between the control apparatus 37 and tracking devices 31-33 and information detected by the sensors 27 in the devices. The system 30 may be used to find a lost object attached to a tracking device 10, set an alert for when an object, pet or person bearing a tracking device 10 moves into or out of one or more predetermined ranges, and pair alerts with locations or motions of the tracking device 10. The owner-user may share with others information transmitted by the tracking devices 31-33 and control of devices 31-33.

Accordingly, another user with a control apparatus 38 may use the same tracking devices 31-33 to establish alerts on the control apparatus 38 that are different from those of the alerts created by control apparatus 37.

Remote controls for television sets are frequently lost. The system 30 solves the problem of finding a lost remote control or other object 34. A tracking device 31 is attached to a remote control or object 34. Any suitable means for attaching is acceptable including hook-and-loop fasteners or adhesives that attach to the object 34 and the tracking device 31. Other attachment means include a chain or cord for attaching the object 34 via a key ring hole. The control apparatus 37 has a program 100 that provides a control menu associated with the tracking device 31. The tracking device 31 has a speaker 23 and an LED 24 that operate upon commands received from the control apparatus 37. The control apparatus 37 sends a suitable signal to the core device 21 to cause the speaker 23 to generate a distinctive sound, such as a buzz or ring, and to operate the LED 24 in a flashing mode, or both, in order to locate the object 34.

The system 30 may also monitor when an object, pet or person enters or leaves a predetermined range with respect to the control apparatus 37. For example, another tracking device 32 has a cord or chain 36 connecting via a key ring hole to and object, a collar of a pet, to an article of a person's clothing, surrounding a wrist of a small child or an Alzheimer patient. The control apparatus 37 sets one or more alerts depending upon the distance between the control apparatus 37 and the tracking device 32. If a parent were shopping with a small child, the parent may program the control apparatus 37 to issue one or more alerts depending upon the distance between the child wearing tracking device 32 and parent carrying the control apparatus 37. If the child and parent became separated by a first predetermined distance, such as 10-15 feet, the control apparatus would emit a first alert, such as one of the many sounds or vibration patterns that are included on a smartphone. If the separation becomes larger, such as 30-50 feet, a second alert would occur with a different sound and/or vibration. A third alert could be provided when the tracking device 32 lost radio contact with the control apparatus 37.

The system 30 may remind a user to take along key personal items before leaving a predetermined location. Tracking devices 33 could be attached to a key ring, a laptop or tablet computer, a brief case, a purse, a wallet, luggage, a backpack or other personal items. A user may carry the tracked items during travel from one place to another. If the user departs a location and forgets the tracked item, an alert would sound on the control apparatus 37 to advise the user he or she forgot the tracked item. Such alerts may be paired to specific locations to that they are only triggered when and where the user wants.

The core device 21 of each tracking device 31 has a clock. The beacon signal and any signal from a sensor may include the time the signal is sent. The clock also may be used to extend the life of the battery 15. The control apparatus 37 may set the tracking device to a power savings mode where its broadcast signal is only active for a short period of time compared to the intervals between activation. The core device also tracks time and any alert may be paired to one or more chosen times or day, week, month or year.

The system 30 may also alert user when an item has returned. For example, assume the tracking device 32 is attached to an automobile operated by another member of the user's household. When the driver of that automobile returns home, the tracking device will trigger an alert in the control apparatus 37 to alert the user that the automobile bearing the tracking device 32 has returned within range of the control apparatus 37.

The tracking devices 33 may have their alerts paired to one or more locations. For example, if a user places tracking device 32 on a brief case or backpack, the user has little need to be warned of leaving the vicinity of the briefcase or backpack when the user is at home or at work. Those locations may be excluded from alerts and all other locations could be active. This embodiment would be especially for commuters who take a train or bus. The alarm could sound if the commuter moves more than 10 feet from the tracking device on the briefcase or backpack.

Among the numerous options available to the user is the option to have one or more alerts activated on the control device 37, the tracking device 32 or both. Recall that some embodiments include a 9-axis motion and temperature sensor 25. Sensor readings are transmitted by core device 21 and received and recorded by the control apparatuses 37, 38 and any other control apparatus with permission to control the tracking device 31. So long as the tracking device 31 is within range of at least one control apparatus, the GPS location of the apparatus and the motion of the tracking device 31 can be viewed on line in real time or at a later time by other users, such as 38. In one embodiment a tracking device 31 is fixed to a snowboard and the snowboarder carries a control apparatus 37 that continuously receives the motion data from tracking device 31.

All travel of the snowboard, including vertical travel up ramps and acrobatic flips and turns of the snowboarder will be sensed by the 9-axis sensor and sent to the first control apparatus 37. That apparatus can be set to record the information received from the tracking device 31 or to continuously transmit the information to the cloud/internet 35.

Another feature of each tracking device is the ability of the owner of the device to share device information or control or both with others. For example, a remote user with control apparatus 38 and with shared privileges may access the cloud/internet 35 and use the recorded motion information to drive a display showing an icon moving in accordance with the same motion as the tracking device 31. In some embodiments the shared users are designated as "friends" of one or more tracking devices that are generally under the control of the owner of the tracking device. As will be explained later, an owner may voluntarily transfer control of a tracking device to another authorized user or simply relinquish control of a tracking device to any other authorized user who is or passes within range of the relinquished tracking device. An authorized user is, at a minimum, a user who has a control apparatus with a copy of an operating program for controlling tracking devices. In other embodiments authorized users are registered with a central user site that may be accessed through the Internet.

Embodiments with the 9-axis motion sensor may be used to pair location, time, direction, and position, velocity and acceleration in each of three axes of motion. For example, a user could set an alert to show whether the speed of a tracking device 31 exceeded a threshold of 10 miles per hour in the time between 10 AM to 11 AM on Aug. 4, 2014, when the temperature was between 75-85° F. while traveling north)) (0-90° within the city limits of Seattle, Wash. As such, motion, time, heading and location may all be paired together or in any combination of one or more types of sensed information to set an alert.

The pairing of tracking device 31 with a smartphone having GPS has endless possibilities. Motion data can be configured to user-defined alerts that include activating the speaker and LED 24. For instance, if a user was jogging and his speed dropped below a threshold, the speaker 23 on the tracking device 10 would buzz. In another embodiment the tracking device 10 monitors temperature outdoors, and buzz from speaker 23 could warn the user when the temperature dropped below a level that would harm outdoor plants. In some embodiments the 9-axis sensor enables the system 30 to control functions of the control apparatus 37. A control program 100 installed on the control apparatus 37 records motion of the tracking device 31 and associates the recoded motion with a function of the control apparatus 37. With the control program 100 open, control apparatus 37 records a motion or set of motions of the tracking device 32. The user then associates the recorded motion of set of motions with a function provided on the control apparatus. Such functions include triggering an alert on the control apparatus 37 when the tracking device 32 moves in any direction, taking a picture with the control apparatus 37 in response to a first predetermined motion or first combination of motions of the tracking device 32, placing a phone call from the control apparatus (smartphone) 37 in response to another motion or another combination of motions of the tracking device 32, sending an email or text message from the control apparatus 37 in response to a third motion or third combination of motions of the tracking device 32. For example, the sensor 25 could be attached to a door or a window and any movement of the door or window would set off an audible or visual alarm on the control apparatus 37. A combination of motions such as shaking the tracking device 32 up and down could command the control apparatus 37 to take a picture. Moving the tracking device 32 left and right could command the control device 37 to send a message (email or text) to one or more addressees with a predetermined announcement, such as, a reminder to take medication. A user may map out specific locations, click the button and the tracking device 32 will save the place of interest. For example, a surveyor could walk a specific path, and mark specific points of interest such as corners of a road, or edges of a hill. The geographic properties of each point of interest would be saved and mapped out. Thus, the tracking device 10 has uses in the fields of gardening, home security, child monitoring, health/fitness, sports applications, navigation, commercial and industrial monitoring and safety appliances.

Figure 4:
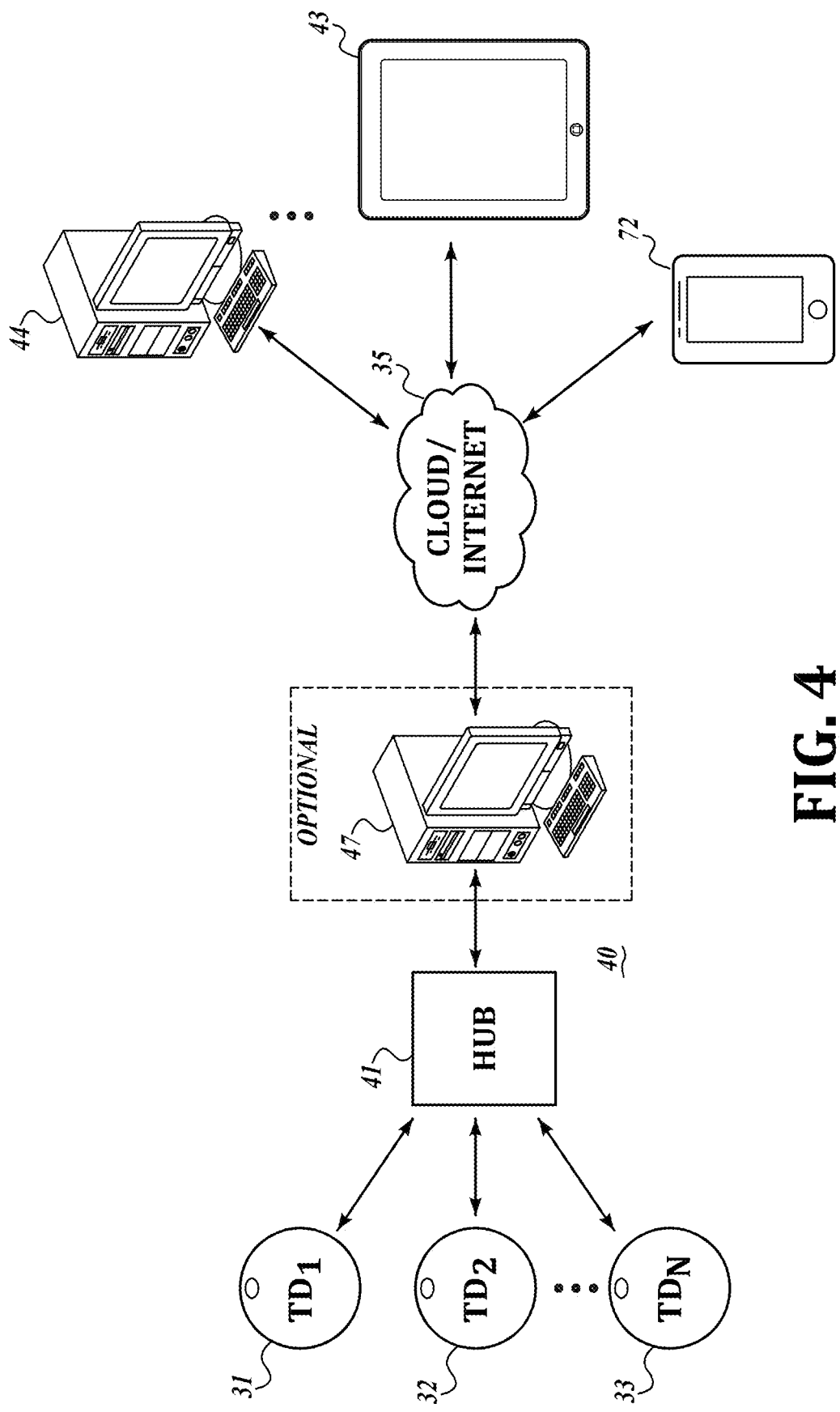
FIG. 4 is a view of a single hub (hive) tracking system.

Turning to FIG. 4, a first network 40 has tracking devices TD1-TDN, 31-33 that are in wireless communication with a hub 41. The hub 41 may be connected to a gateway system 47 that in turn is connected to the cloud/internet 35. In some embodiments of the first network 40, the hub 41 is directly connected to communicate with the cloud/internet 35. The hub 41 listens for signals from the tracking devices 31-33. The hub has Bluetooth or other wireless communication apparatus and can sense the range of each tracking device within its effective field. Upon receiving signals from one or more tracking devices, the hub relays information associated with the tracking devices to the cloud/internet site 35. Likewise, the hub 41 may send control information received from the cloud/internet site 35 to each or all the tracking devices 31-33.

Each tracking device 31-33 and the cloud/internet 35 associated with the devices has an owner and may have one or more shared users. As used in this patent, the term "owner" applies to a user of a tracking device 10 who has primary control over the tracking device 10 and the cloud/internet 35 associated with the tracking device. The embodiment envisions local, regional, national and international networks 43-44 within the scope of cloud/internet 35. It also envisions registered owner-users of tracking devices and others register users with one or more dedicated cloud/internet sites 35 for collecting information about tracking devices 10. An owner-user may grant one or more privileges to others, known as "friends", allowing the other users some or all access or control of the owner's tracking devices and owner's account on the cloud/internet site 35. For example, one owner-user may give a friend a privilege to view all data on the cloud/internet site 35 or view data only associated with one or more tracking devices chosen by the owner-user for sharing. Even when the owner permits other users to see the data, some data may be marked "private" and excluded from the view of the shared user. An owner may also permit other users to control one, more, or all functions of individual tracking devices of the owner. An owner may also allow device data to be posted publicly, so that any user can view the data.

The friend feature solves a potential problem of locating lost tracking devices. If a friend finds a lost item of owner, the friend may discretely notify the owner that the friend has found the lost tracking device (and the object attached to the device) by calling the owner or sending the owner an email or text message that the friend found the tracking device at a particular location and time. The email could include a map with a pin showing the location.

In an alternative friend-based scenario, assume a user of control apparatus 42 who was granted privileges for the lost device 32 by its owner detects the lost device. The owner sees on the database that the user of control apparatus 42 is close to the lost device 32 and also has privileges for the lost device 32. The owner may contact the user of control apparatus 42 via telephone or email and ask the user to find the lost device 32 by initiating a sound or light alert on the device 32.

Shared use has a number of advantages. For example, assume the owner of the device 31 is away from home and receives a call from a member of his family asking for help finding a lost remote control attached to tracking device 31. The owner could log into the cloud/internet and send a suitable command to the tracking device 31 to operate its speaker 23 and LED 24. If the owner had shared control of the tracking device with other family members, then the shared user could send the command to generate an alarm without contacting the owner.

The embodiment of first network 40 helps integrated multiple tracking devices 31-33 and Bluetooth devices. A control apparatus 37 (e.g. smartphone) does not have to control the tracking devices. Instead, all tracking devices 10 for an owner are registered in the hub 41 where each can be securely accessed from a smartphone or other control apparatus anywhere in the world. The registered tracking devices can be used for home security, automation, or playing games with friends across the world.

Figure 5:
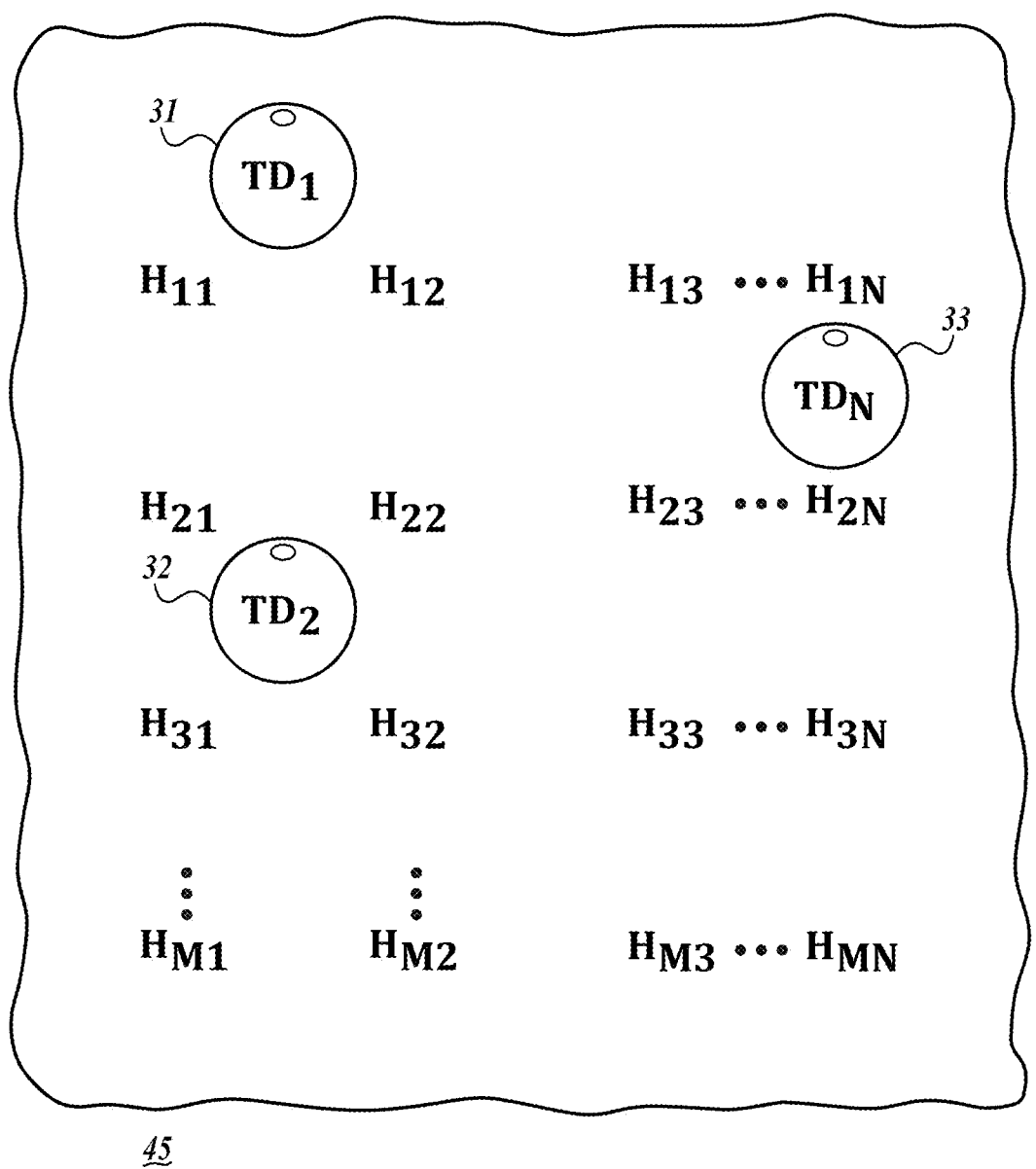
FIG. 5 is a partial view of a multi-hub tracking system.

A second, wider area network embodiment 45 is shown in FIG. 5. There are a plurality of hubs H11, H12, H21, . . . H1N, HMN distributed over a predetermined area, such as a warehouse, college campus, hospital, airports, and offices. In a warehouse, tracking devices 31-33 are attached to stored items and any particular stored item can be immediately located by triangulating its position from the range signals detected by the hubs. On a college campus, the tracking devices could locate a lost smartphone, computer or book. In hospitals and offices the tracking devices could be attached to files so that anyone could find a desired file by accessing the cloud/internet 35.

Figure 6:
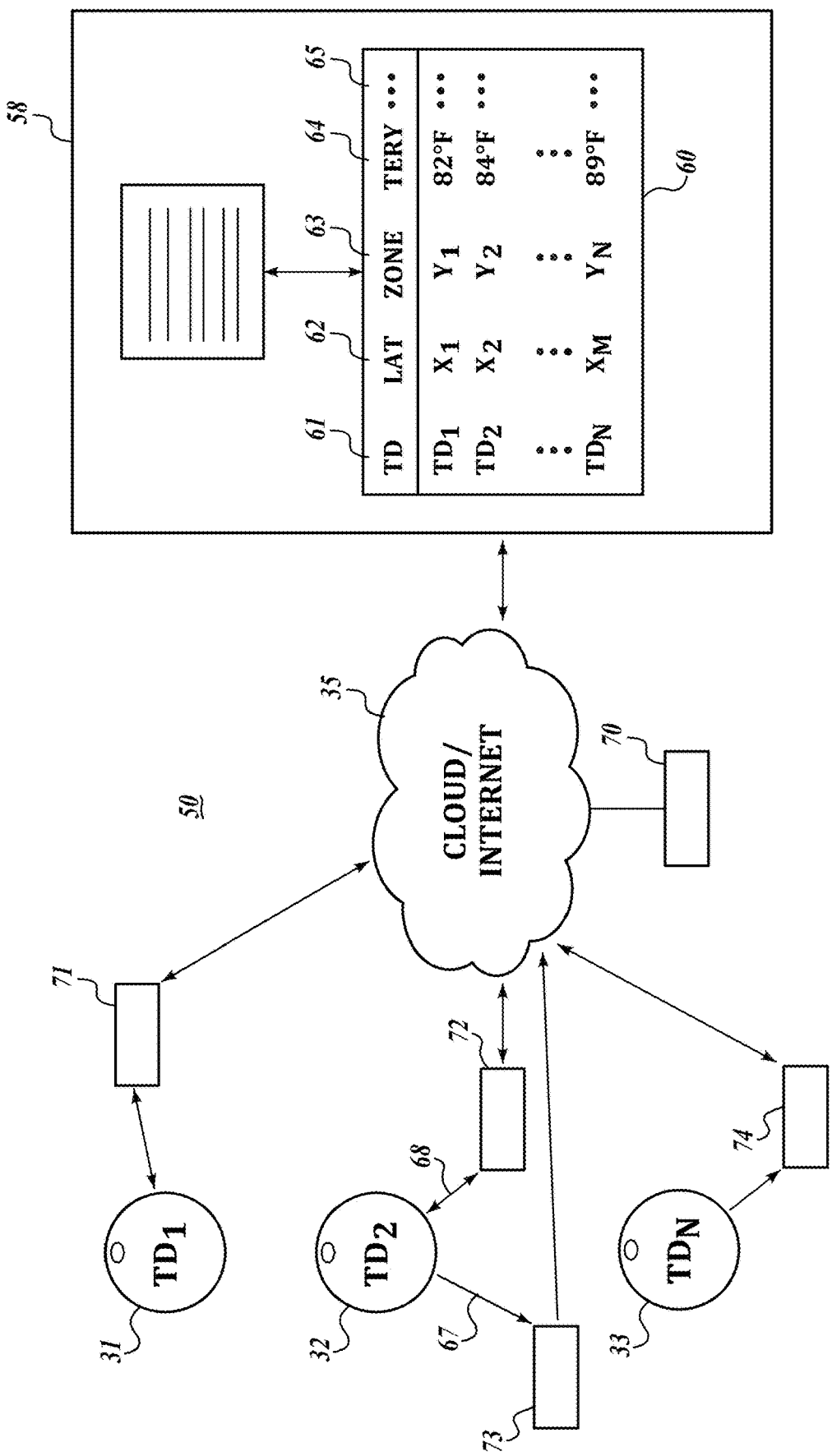
FIG. 6 is a view of a wide area location system for finding lost tracking devices or monitoring multiple sensors in tracked devices.

A third network embodiment 50 is shown in FIG. 6. An owner of multiple tracking devices 31, 32, 33 operates a networked control apparatus 70 that has two-way communication via cloud/internet 35 with the tracking devices 31, 32, 33. A server 58 is also in two-way communication with the cloud/internet 35. The server 58 includes one or more databases 60 that keep records on owners, users and each tracking device. For user of the network 50, the database 60 would show the devices owned by the user or those devices for which the user had granted or received one or more privileges or are marked for public access, the identity 61 of each device that is owned or subject to a privilege granted or received, the information 62, 63, 64, 65 reported by each sensor of each device, including and not limited to the time the information was received and the location of the control apparatus that receives the information. At any time the owner 70 of the tracking devices 31-33 may view the historic information on the location and sensors of each tracking device of the owner, including the last known location of the tracking device and when the last known location was recorded in the database 60.

The owner's control apparatus 70 may be beyond the range of the transceivers in core devices 21 of the tracking devices. A number of other control devices 71-74 may be within range of one or more of the transceivers 21 in the tracking devices. Each tracking device uses its core device transceiver 21 to broadcast a periodic beacon signal with information including the identity of the tracking device and information from the sensors 25-27 of the respective tracking devices. Each control apparatus 71-74 receives the beacon broadcast 68 and relays the information in the broadcast in a transmission to a designated host on the cloud/internet 35, including the GPS location of the control apparatus. The control apparatuses 71-74 do not need permission from the owner of the tracking devices to receive and forward the identity and sensor information. As long as the control program 100 for tracking devices is running, each control apparatus will receive the beacon signal from the tracking devices. No permission is required to receive the beacon signal. The control apparatus may add a location and/or a time stamp, and other information, to a "record" of the transmission from the tracking device before forwarding the record to the cloud host. The retransmission of beacon information by the control apparatuses 71-74 imposes no hardship on them because each one likely transmits its own beacon signal to a cellular phone network or a local or wide area network.

The third network embodiment 50 may be used to locate misplaced items that are beyond the range of a control apparatus. An owner may access the database 60 and mark one or more of the owned devices as "lost." Assume that device 32 is owned by the operator of control apparatus 70 and is attached to a tablet computer (not shown). Assume another user carries control apparatus 73 and has no shared privileges for tracking device 32. Nevertheless, when control apparatus 73 passes within range of the beacon signal 67 from tracking device 32, the identity of the lost device 32 and its approximate GPS location will be relayed via control apparatus 73 to the cloud/internet 35 and recorded on the database 60. That allows the owner to know the general location of the lost device 32. The approximate location can be displayed on a suitable application such as Google Maps, or MapQuest to provide the owner with local streets or landmarks where he may physically search for the lost device.

The database has numerous uses. Tracking devices 33 may be distributed over a large geographic area where each tracking device is in communication with a hub, such as shown in FIG. 5. The tracking devices may be located at one or more known locations or the hubs may provide GPS data. The sensors on the tracking devices could report their temperatures, air pressure, humidity, and other environmental characteristics via the hubs to provide data for a database 60 of the variable environmental characteristics of the geographic area.

There is a virtually unlimited number of sensors that can be used to provide trigger signals and a similar unlimited of responses or alerts that may be given in response to the trigger signals. Each tracking device has a button 14a and may have one or more sensors 25-27. The button and each sensor may generate a trigger signal. Trigger signals may be combined in any number of combinations and/or sequences of trigger signals to generate particular trigger signals depending upon the occurrence of predetermined combinations and/or sequences of trigger signals. The tracking devices and control apparatuses may also generate one or more responses or alerts upon receipt of trigger signals and combinations thereof.

Button 14a may be pressed one or more times to generate one or more button trigger signals. Two or more sequential pressings of the button 14a are an alternate trigger signal. The button switch may be held down to generate a long duration trigger signal or promptly released to generate a short trigger signal. A combination of long and short duration signals may also be used as a trigger signal.

For embodiments having a 9-axis sensor, any motion or combination and/or sequence of specific types of motion may be used to generate trigger signals. For example, when a tracking device 31 is used to secure a door or a window, any motion of the sensor may be a trigger signal. In other embodiments, specific user-defined spatial displacements are received and stored in the control apparatus as trigger signals for a response. For example, moving a tracking device left to right, shaking the tracking device up and down, moving the tracking device to define a letters, such as the letter "L", or moving the tracking device to define a shape such as a circle or square, are but a few custom motions. The shapes and letters could be paired with a click of the button 14*a* to indicate the start of a motion and second click when the custom motion is completed. The control apparatus would remember the click to start and stop and the motion between clicks.

Range is another trigger for the tracking devices. On the control apparatus the user may define one or more ranges for generating responses including alerts. One potential use is keeping a parent advised of the relative location of a child while shopping in a store. Different responses or alerts could be given at different ranges as the distance between the child and the parent varies. In the hive system of FIGS. 4 and 5, a trigger may be given when a tracking device leaves or enters the hive.

Location is a still another trigger. In some embodiments, the tracking device may carry its own GPS device and broadcast its latitude and longitude coordinates. In other embodiments, the tracking device may rely upon the GPS coordinates of any control apparatus that participates in systems such as shown in FIGS. 4-6 and is within range of any tracking device. In still other embodiments, the location of one control apparatus 37 may be paired with the range of one tracking device. For example, in the basic system shown in FIG. 4 control apparatus 37 provides the location of the control apparatus using its GPS function and pairs that location with the range between the control apparatus 37 and the tracking device 31. A user can have an alert triggered when the distance between the control apparatus 37 and the tracking device 31 exceeds a predetermined distance selected by the operator of the control apparatus 37. A user can also set an alert that is only active at a "home" location to remind the user to take a laptop to which the tracking device 31 is fixed when the user leaves home. However, if the location were different from the "home" location, no alert would be given.

Time is another trigger signal. As explained above, time of day may be combined with other trigger signals to enable or disable one or more alerts, such as enabling a motion alert during the night but disabling the alert during the day. Date may also be used as a trigger condition.

Other trigger signals and their combinations and/or sequences are possible with added sensors. The tracking devices of the embodiments of the invention may use any of a vast number of sensors including and not limited to sensors for motion. Distance, velocity and acceleration, temperature, pressure, magnetic fields, gravity, humidity, moisture, vibration, pressure, light, electrical fields, ionizing and non-ionizing radiation, cosmic rays, and other physical aspects of the external environment; analytes for chemical or biological substances including and not limited to sensors for detecting toxic compositions such as carbon monoxide, carbon dioxide, methane, and other hazardous or poisonous components. The tracking devices may be worn as badges by personnel to detect ambient analytes and physical parameters. The data collected by the tracking device may be sent to the data collection center 58 where others can analyze it and provide responses or alerts to the personnel wearing the tracking devices.

The control apparatus has a program (for example an "application") that allows the user to create custom trigger signals including combinations and/or sequences of individual trigger signals. The control apparatus, the tracking device or both may generate one or more responses to a trigger signals or a combination of trigger signals. The tracking device, the control apparatus or both may give responses or alerts.

Thus with more generality, the control apparatus is enabled to create conditional rules, each conditional rule comprising two parts in "IF/THEN" logical order, in which beacon signal information can be assessed in an "IF" process and assigned a truth value, and according to the truth value, a command associated as the "THEN" part of the conditional rule can be executed. In some instances, a simple sensor output broadcast from the radio tracking device will trigger execution of some control apparatus function. In other instances, the control apparatus or an associated cloud host and network may cause a remote device to execute a function. In yet other instances, the control apparatus may compare one sensor output with another sensor output and cause a function to be executed if the comparison meets or deviates from a specified value. The sensor outputs need not be parametric. A non-parametric sensor such as a button press ("switch input") may also be evaluated as part of rules-based conditional execution of functions. And in some instances, other information, such as date, time, location, and so forth, may be factored into the conditional rule. That other information may be found in the control apparatus or in a host system (such as a "cloud host") in operative communication with the control apparatus. The functions triggerable when a conditional rule is satisfied, broadly, include alerts, notifications, and command execution of functions by any of a control apparatus, a remote device, or in some instances, execution of a function by the tracking device, such as actuation of an alarm display by the tracking device. In another example, when the conditions of a conditional rule are met by information contained in a radio-beacon broadcast, then a friend's control apparatus may execute a display notification or sound an alarm, for example. Thus the examples provided here are for illustration, but do not limit the possibilities achievable by the capacity to write customized conditional rules having a trigger condition (IF) and an executable (THEN) that some component of the system will execute when the trigger condition is recognized in a radio transmission.

The foregoing embodiments of tracking devices provide audible and visual alerts, but could also vibrate the tracking device upon receipt of a command or trigger signal. In the embodiments described above the tracking devices and the control apparatus may establish a remote control system between themselves to cause one of the system components to execute a function upon receipt of a predetermined command or trigger signal from the other component. For example, a custom motion trigger signal of the tracking device may remotely control the control apparatus to take a picture, send a message via email of SMS, make a phone call to a predetermined party, and combinations thereof such as take and send a picture to a predetermined party or group of predetermined recipients.

Figure 7:
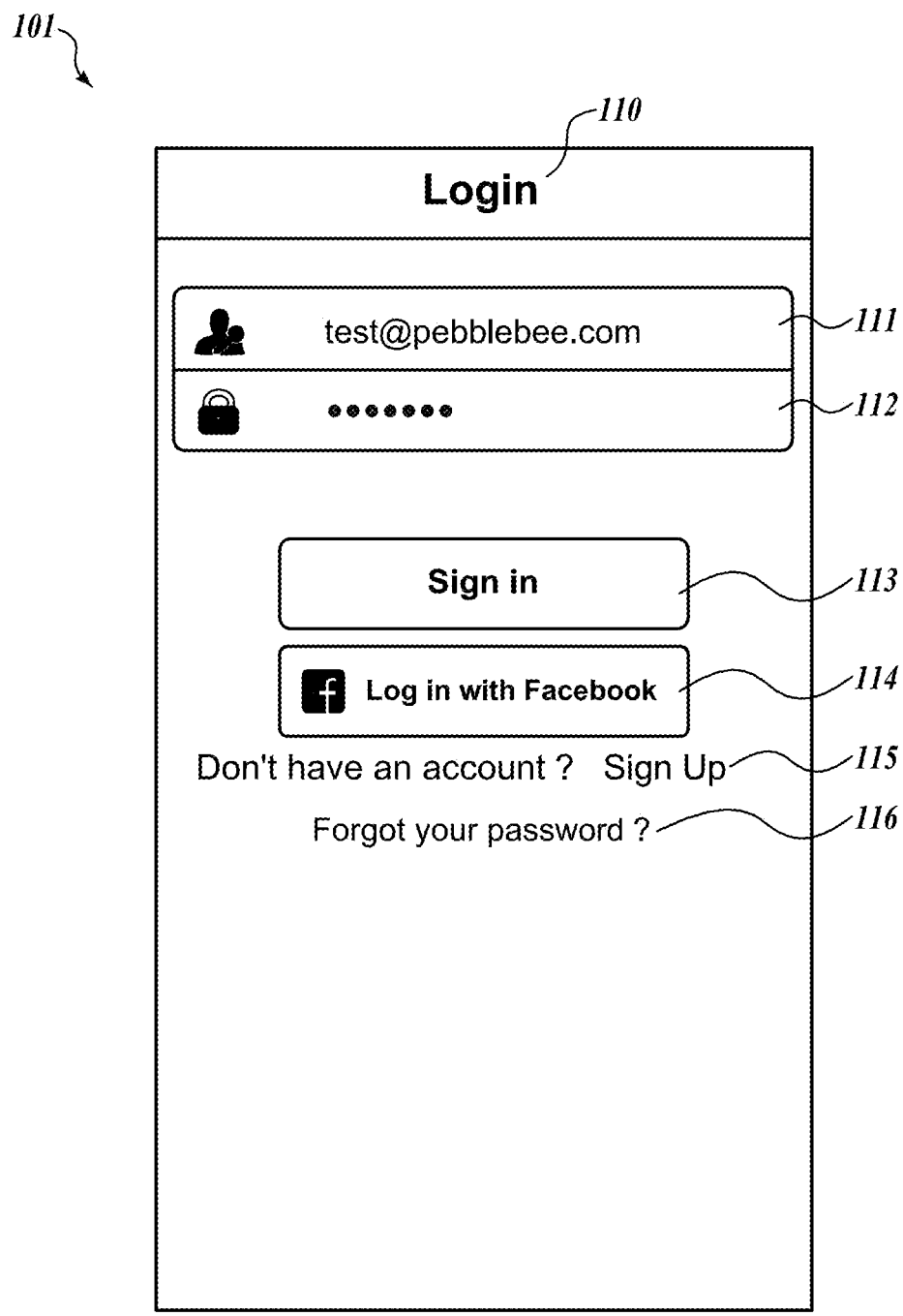
FIG. 7 is a view of screenshot 101 of a control program.

The control program 100 is shown by means of screenshots 101-109 and FIGS. 7-15. Turning to FIG. 7, screenshot 101 shows a login screen for the control program. The login screen has a legend "Login" in banner 110. Below the banner are two rows 111, 112 for a user's email address or user name and password, respectively. In row 113, the user may sign in via the indicated website pebblebee.com or, in the alternative, login through Facebook using the button on row 114.

Rows 115 and 116 allow the user to set up an account or recover a forgotten password.

Figure 8:
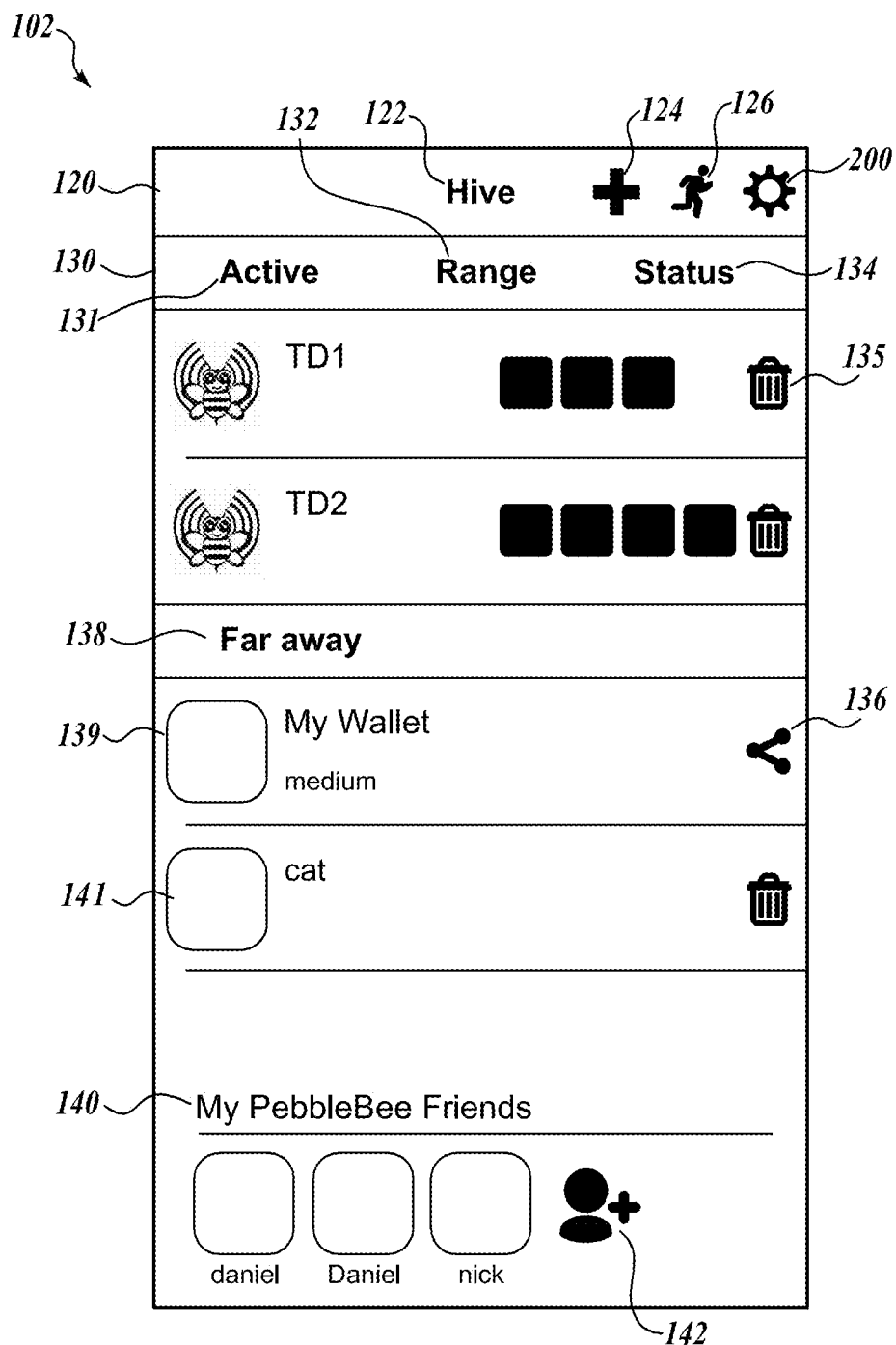
FIG. 8 is a view of screenshot 102 of a control program.

Turning to FIG. 8, and screenshot 102, the user is presented with an image of a hive 122 of tracking devices. A hive is a group of tracking devices owned or controlled by a user of the program. In the top banner 120, there are control buttons 124, 126, and 200, respectively, for enabling the control apparatus to receive and send Bluetooth transmissions, release one or more of the tracking devices from the hive, and set general settings for the tracking devices. Banner 130 defines columns for active devices 131, their range 132, and status 134. For example, tracking device TD1 has a range indicated by three squares and a status showing a can 135. The can 135 indicates that the device is under control but may be released if so desired. In the next row, another tracking device TD2 is closer as shown by the four status squares, and it is also under control as shown by the can 135.

In the hive, there are several more devices, which are located far away. See the Far Away banner 138. Far away devices include a device identified as My Wallet 139, and another device identified as cat 141. Note that My Wallet has a Y-shaped symbol 136 to indicate that the tracking device on the wallet is shared with another user. Near the bottom of the screenshot, a banner 140 shows Friends. A friend is any other user who has some control over one or more of the tracking devices. The symbol 142 indicates a button that may be pressed to add additional friends. To the left of the symbol 142 are shown existing friends.

Figure 9:
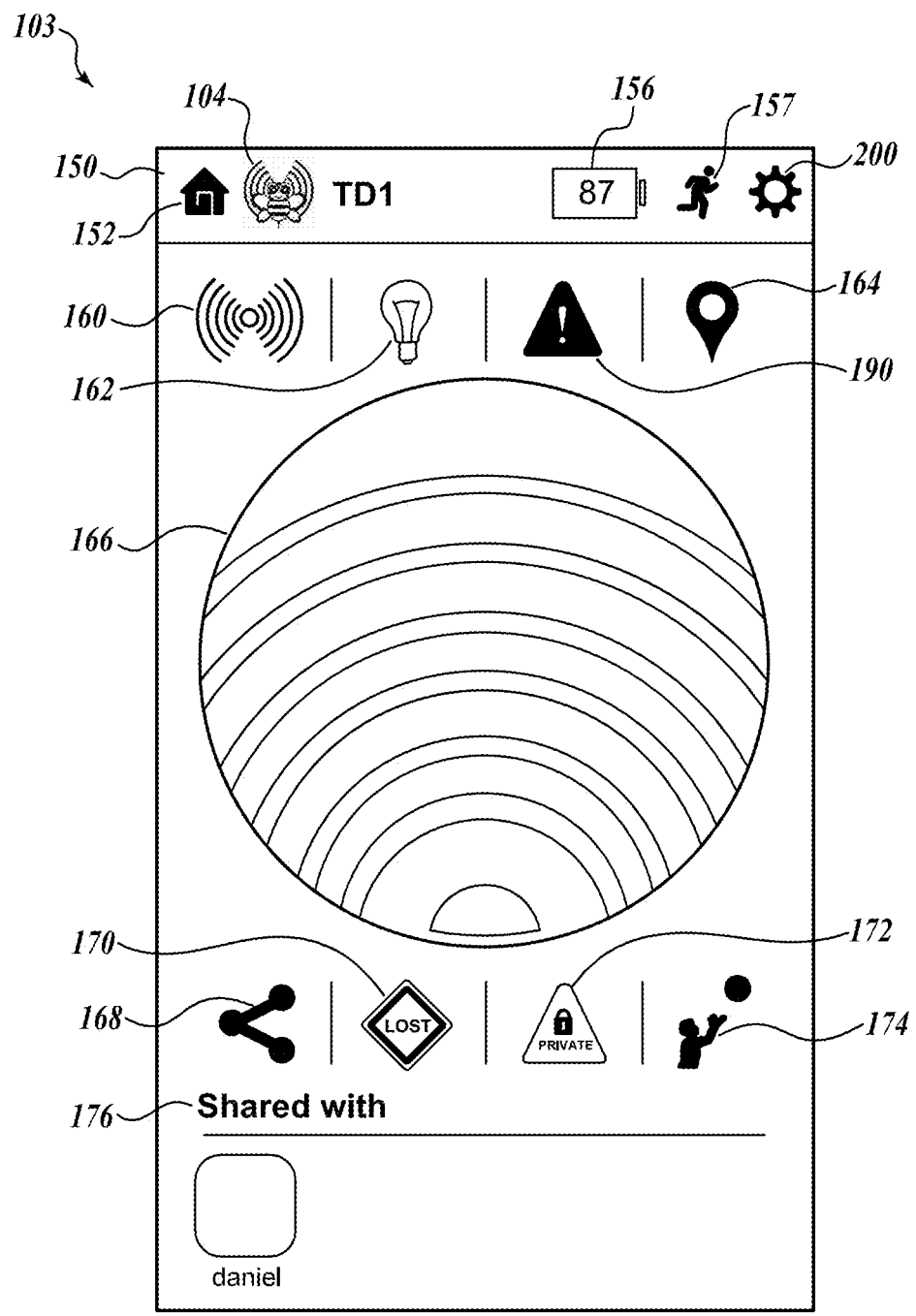
FIG. 9 is a view of screenshot 103 of a control program.

Turning next to FIG. 9, screenshot 103 shows a particular control screen for the tracking device TD1. Clicking or typing on one of the tracking devices shown in screenshot 102 accesses screenshot 103. Top banner 150 has a number of status symbols. Symbol 104 identifies the screen as relating to tracking device TD1. A user returns to the prior screen 102 by pressing the hive symbol 152. Symbol 156 shows the percentage charge of the battery, symbol 157 is the release symbol, and symbol 200 is for general settings.

Below banner 150 are a set of symbols for immediate alerts, paired alerts, and locations for the tracking device. Symbol 160 when touched will immediately sound the audible alarm through the loudspeaker of tracking device TD1. Symbol 162, a light bulb, when touched will cause the tracking device LED to emit periodic light by blinking its LED. If the tracking device is equipped with a vibrator, another symbol would be provided to indicate the vibrator. Symbol 190 allows the user to set up alerts, which include a combination of conditions as will be explained later. Symbol 164 is a mapping signal, which allows the user to acquire and display a map of the current location of the tracking device TD1.

Symbol 166 corresponds to the top cover 11 of the tracking device. The concentric arcs radiating from the bottom of the circular cover represent the relative range between the control apparatus and the tracking device. On the display, the arcs within the circular image 166 will bear different colors and will gradually fill in from bottom to top as the control apparatus comes in closer proximity to the tracking device. Below the range circle 166, the user has a number of options. The user may select symbol 168 in order to share the device with another user. By selecting symbol 170 the user may designate TD1 as lost. Selecting symbol 172 marks TD1 as private and only the user may see the data generated from TD1 as well as the location of TD1.

Symbol 174 allows the user to release all control of the tracking device TD1. At that point, the tracking device TD1 may be claimed and controlled by any other authorized user. The bottom banner 176 indicates other users with whom the current user has shared TD1.

Figure 10:
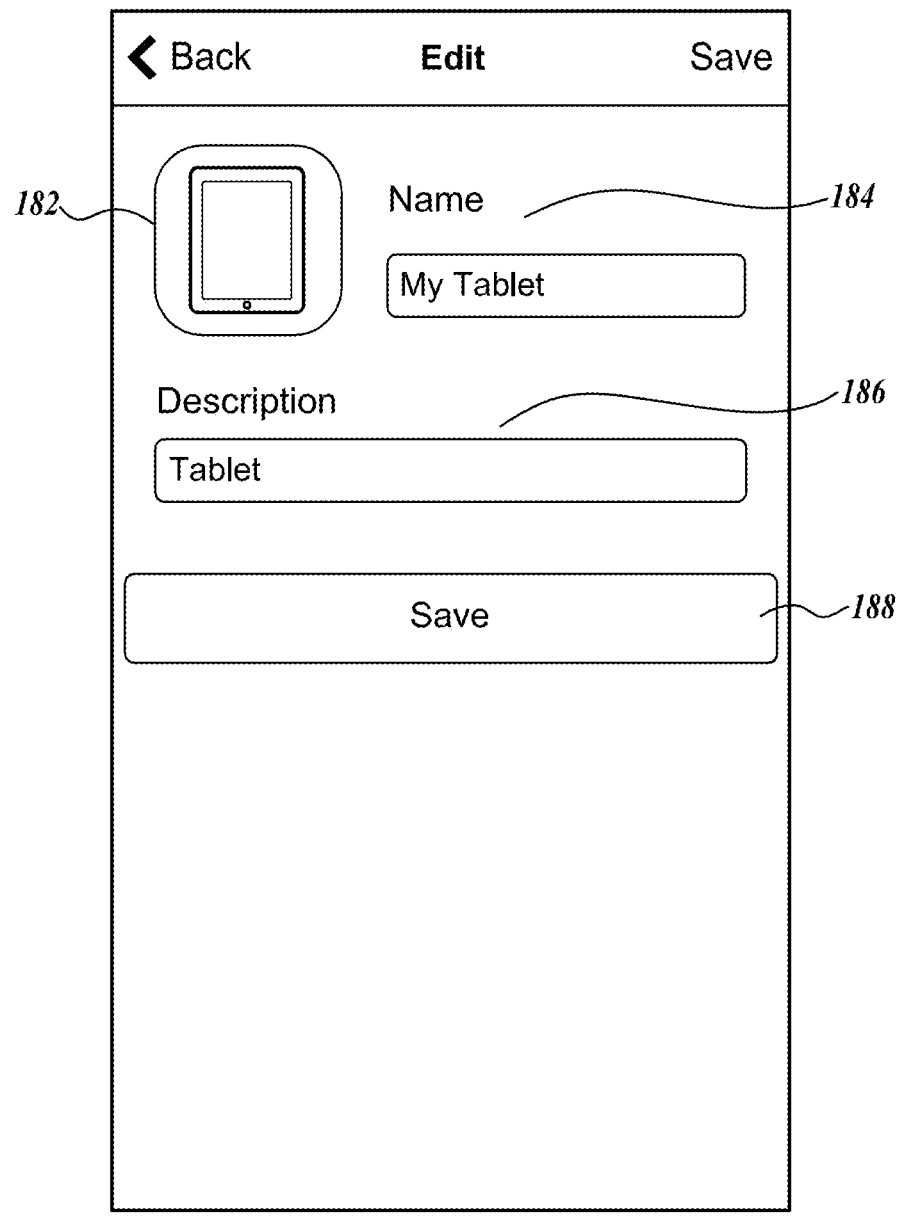
FIG. 10 is a view of screenshot 104 of a control program.

FIG. 10 shows a screenshot 104, which displays the general settings for tracking device TD1. By clicking on symbol 200 on screenshot 103, the user is taken to screenshot 104 where the user may enter particular information about the tracking device. For purposes of illustration, the user may enter a picture 182 of the tracking device or the object or person tracked. In this case, the tracking device is a computer tablet. In the entry 184, the user gave the name "My Tablet" to the tracked object. In box 186, the user may describe the object or person attached to TD1 and pressing bar 188 saves or the Save button on the top banner saves all settings. Pressing the Back button returns the user to screenshot 103. Pressing the Edit Button allows the user to make changes in the settings on screen 104.

Figure 11:
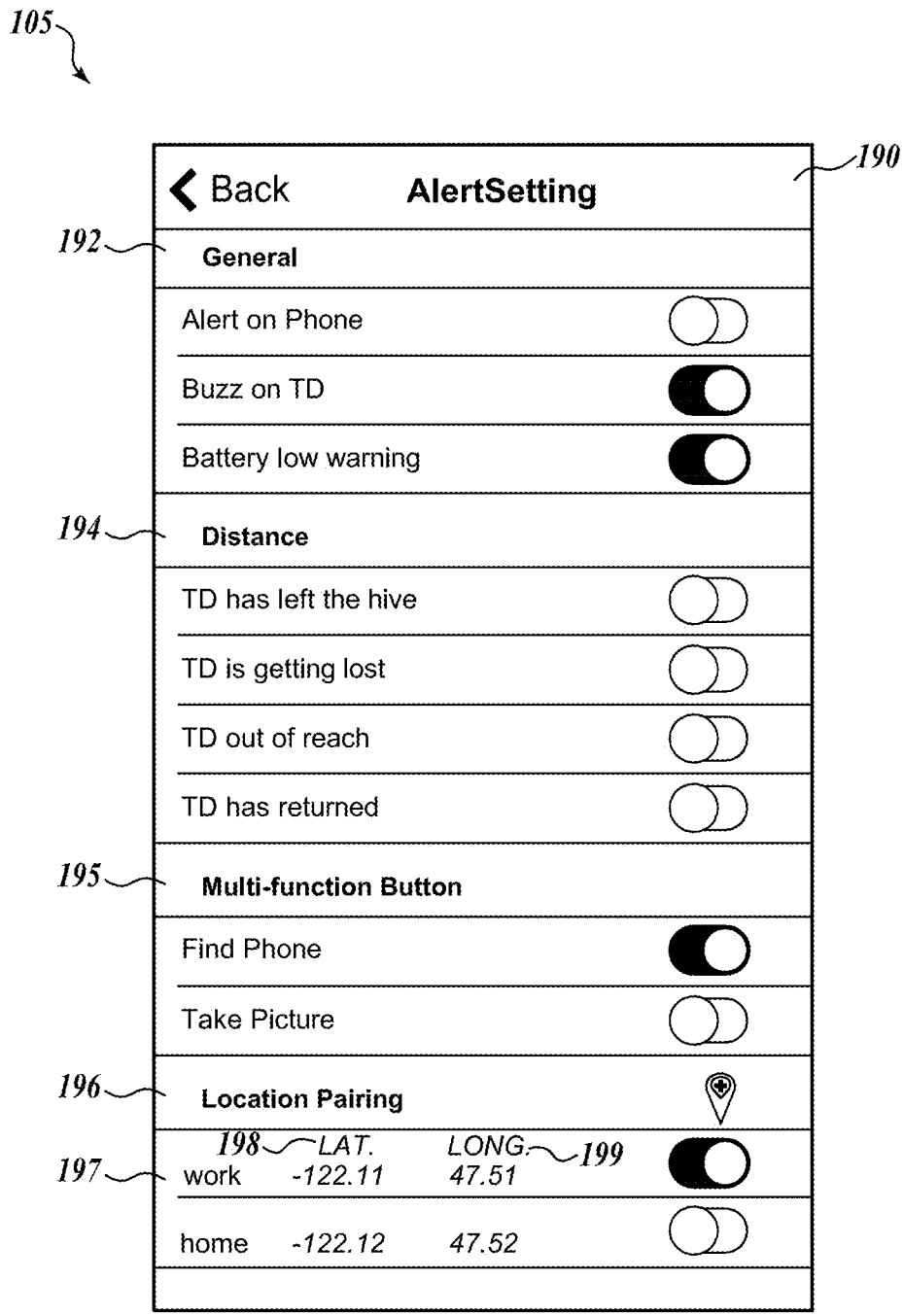
FIG. 11 is a view of screenshot 105 of a control program.

Screenshot 105 shown in FIG. 11 controls the Alert settings for the tracking device and the control apparatus. Pressing triangular symbol 190 in screenshot 103 of FIG. 9 takes the user to screenshot 105 of FIG. 11. In screenshot 105, the user has a number of options for setting alerts. The user may select alert settings 192 for the kind of alert (audio, light, vibration) and may also pair the alert with other conditions. Screenshot 105 is also used to establish remote control between the apparatus and TD1. As explained above, the tracking device may control the control apparatus 37 and vice versa. If desired, the user may have an alert show up on a control apparatus 37 such as the user's smart phone. In addition, the user may operate a loudspeaker on the tracking device. The user may also ask for an alert when the battery is low. Other alerts may be set for distance. For example, in the Distance alerts 194, the user has the option to set alerts for when the device leaves the hive (i.e., the range of the control apparatus), when it is nearing the edge of the hive, when it is out of the hive, and when it returns to the hive. Controls for the multi-function button 195 allow the user to find the control apparatus 37 or set the multi-function button 195 to operate the control apparatus, such as a smart phone, to take a picture. In other embodiments, the multi-function button may send an email or text message to a predetermined party. Further alert settings depend upon conditions such as location pairing 196. In this case, the alert is conditioned upon the tracking device being at work or at home. As shown in FIG. 11, the locations are identified by latitude 198 and longitude 199.

Figure 12:
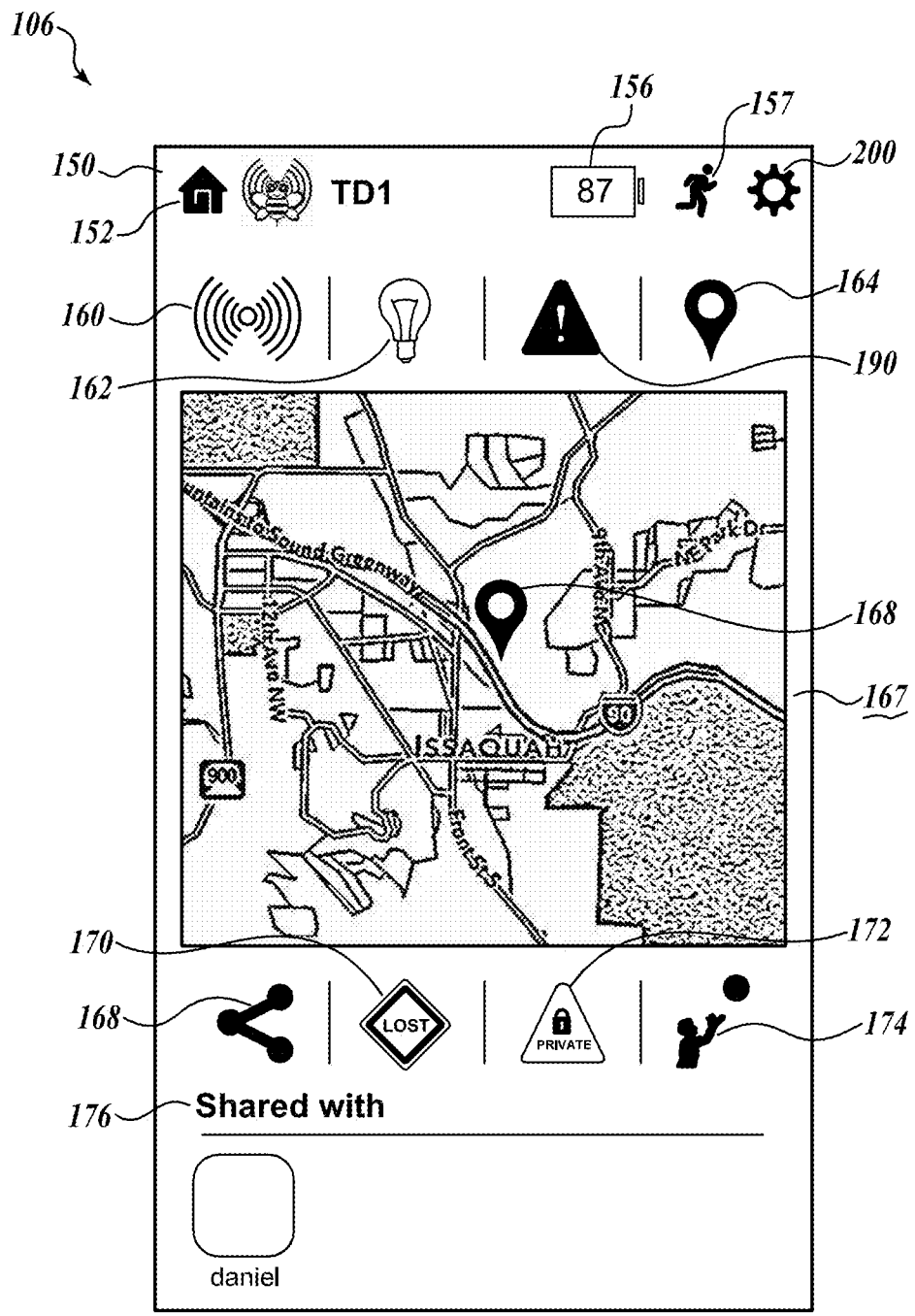
FIG. 12 is a view of screenshot 106 of a control program.

Returning to screenshot 103, the symbol 164 is a map symbol. Touching the map symbol 164 changes screenshot 103 from the range image to a map 167 as shown in FIG. 12 and illustrated in screenshot 106. The map 167 includes a pin symbol 168 showing the approximate location of the tracking device TD1. The location of the tracking device TD1 is acquired from other control apparatuses, which have acquired the beacon signal of tracking device TD1. See, for example, the system shown in FIG. 6 above.

Figure 13:
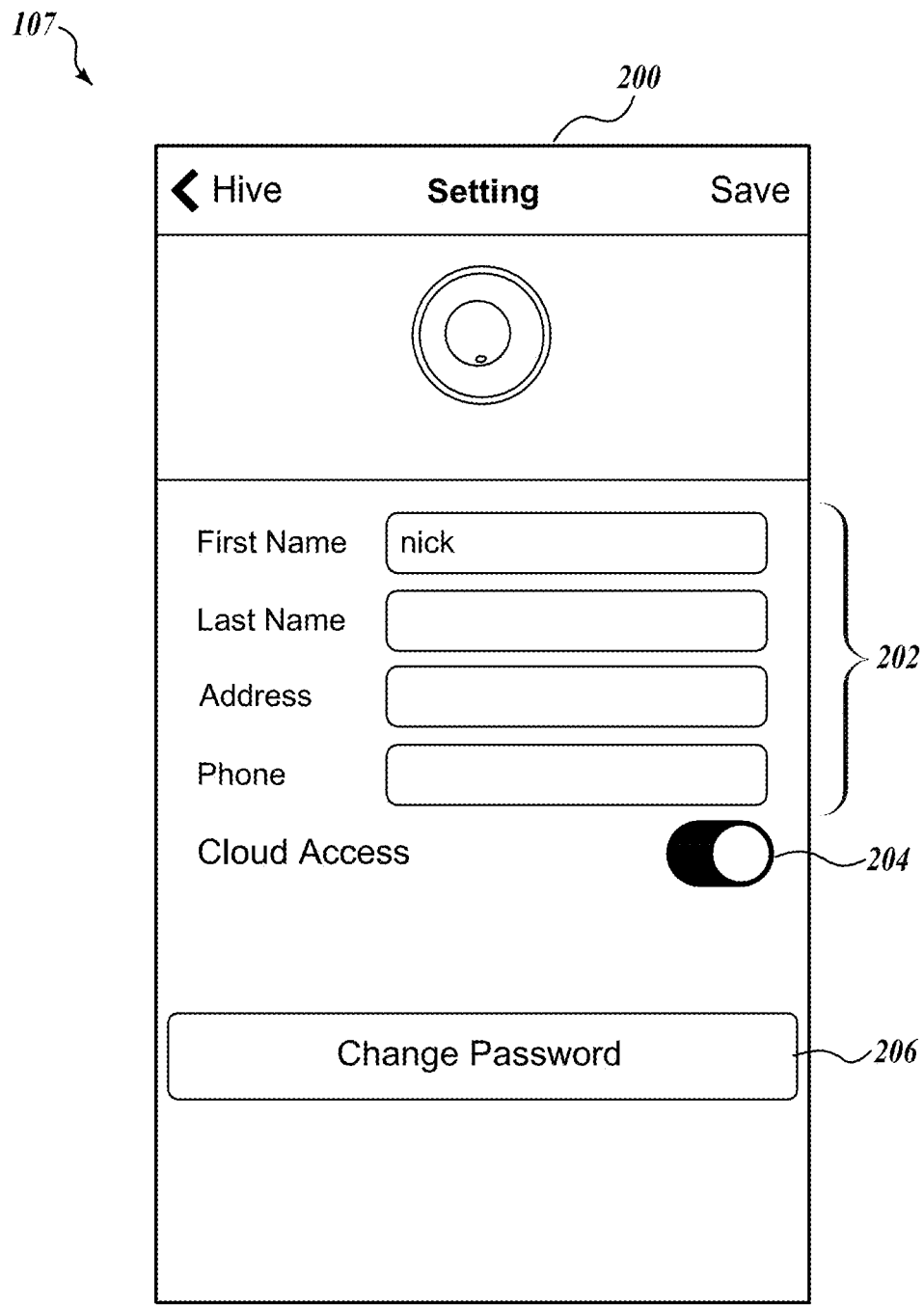
FIG. 13 is a view of screenshot 107 of a control program.

Screenshot 107, FIG. 13, shows the general settings for the user. In this instance, the user's address and information and phone number are established in boxes 202. Sliding the slide button 204 enables cloud access. The user may also change the password by clicking on the box 206.

Figure 14:
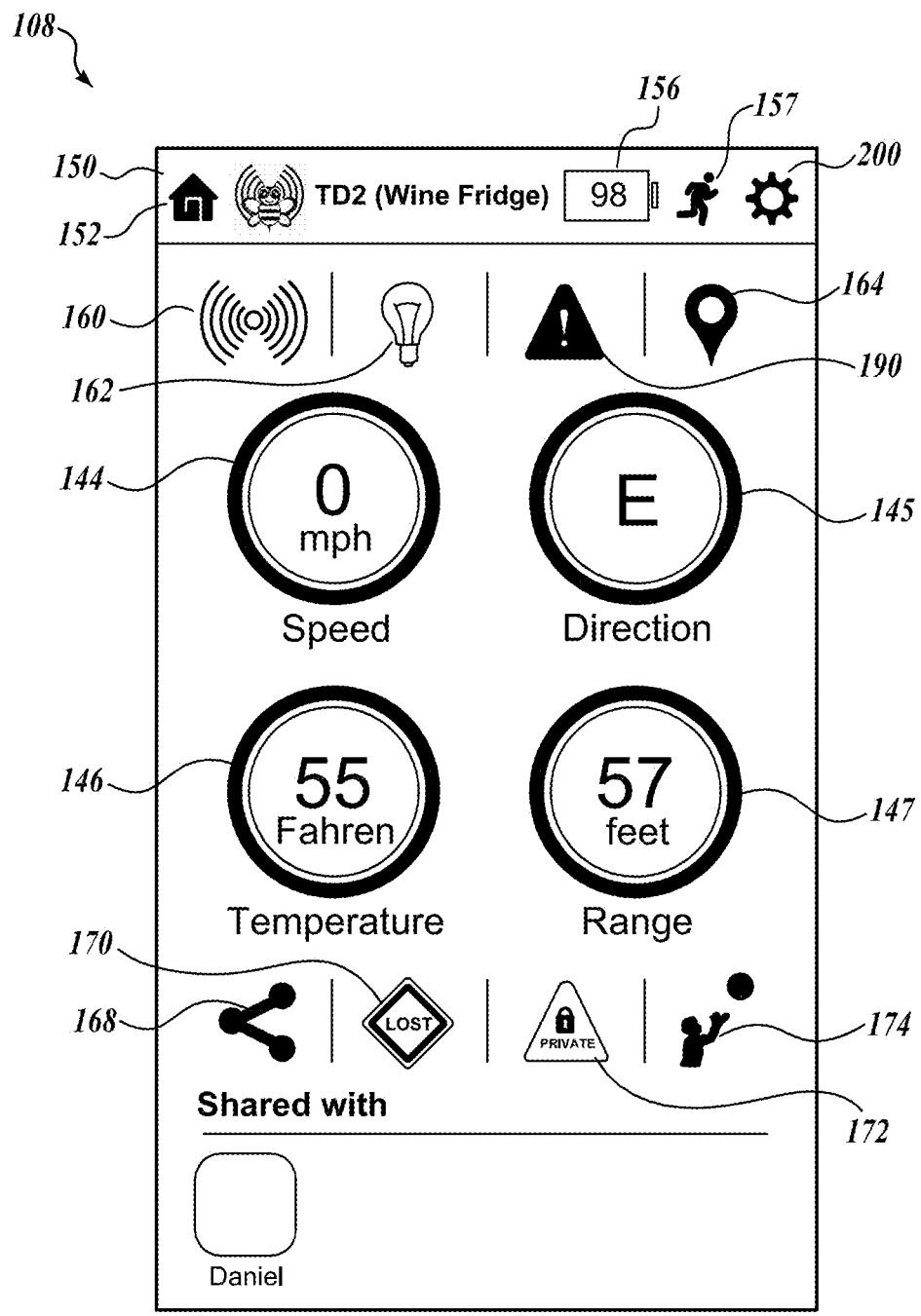
FIG. 14 is a view of screenshot 108 of a control program.
Figure 15:
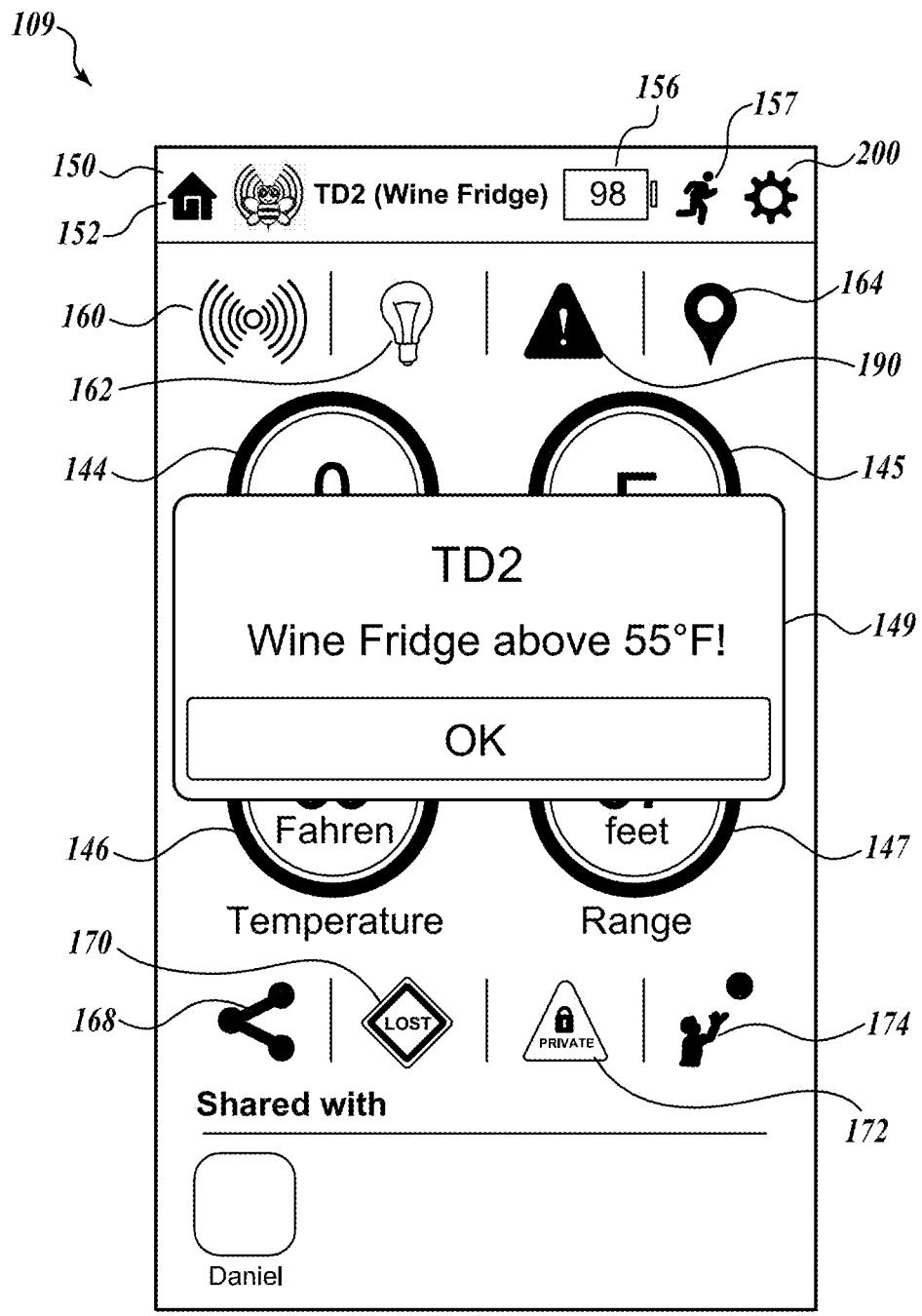
FIG. 15 is a view of screenshot 109 of a control program.

Screenshots 108, 109 in FIGS. 14, 15 show alternate views of screenshot 103 for status of a tracking device that has a 9-axis motion sensor as well as a temperature sensor. In an example shown in FIG. 14, the tracking device TD2 is used to monitor the temperature of a wine refrigerator. Nevertheless, it displays the 9-axis information of the TD2, including its speed 144 and direction 145, as well as its range 147 and temperature 146. The temperature alert is set to 55° F. If the condition of the temperature changes and rises above 55° F., an alert is sent to the control apparatus. The alert appears on screenshot 109 in the display of the control apparatus with the banner 149 showing that TD2 Wine Fridge is above 55° F. Alert 149 on the control apparatus appears not only on the display, but also may trigger a vibration on the control apparatus and/or an audible signal as well as a banner notification.

Figure 16:
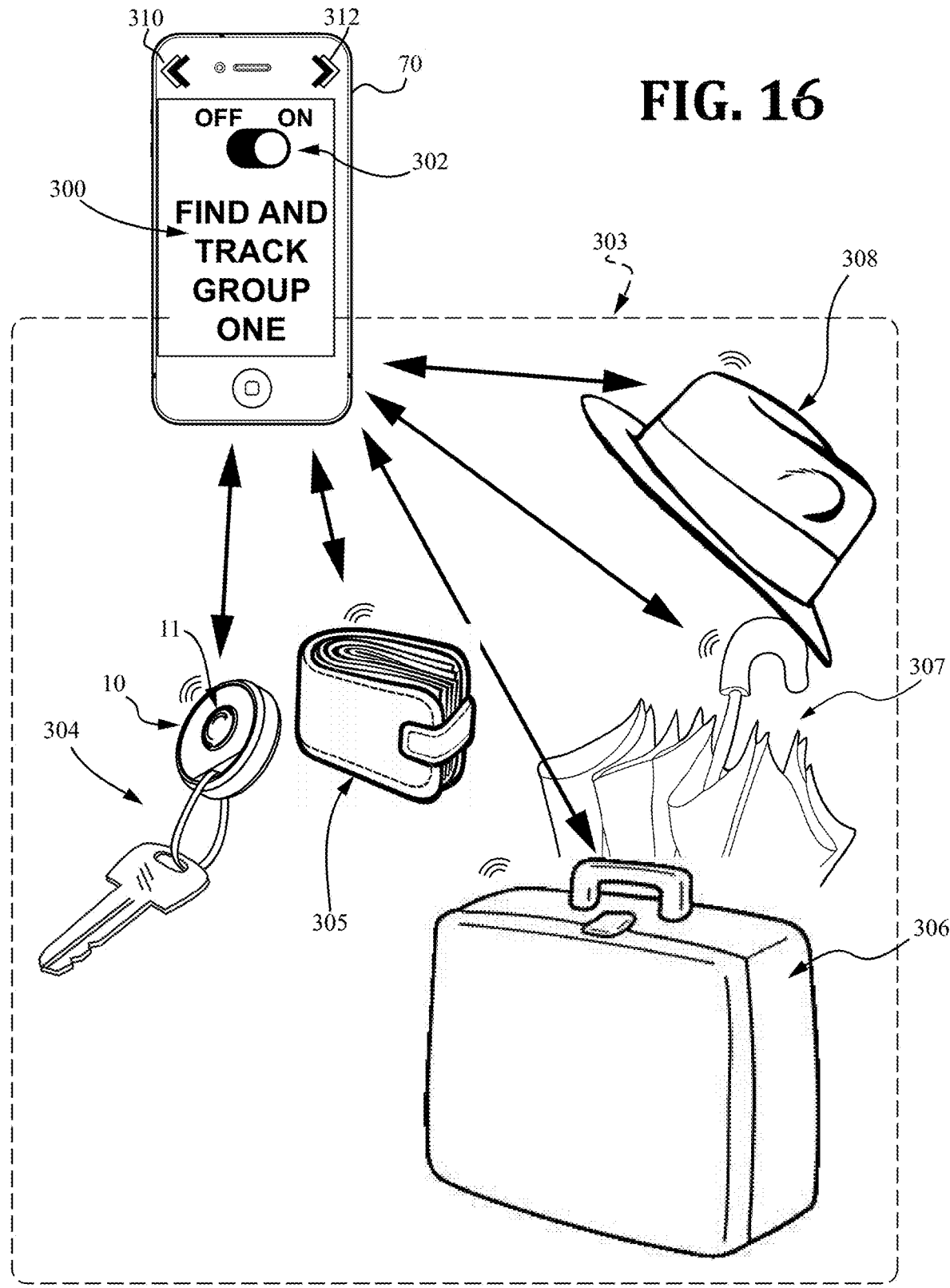
FIG. 16 illustrates a control device set up to track multiple objects that make up a user-defined group.

FIG. 16 illustrates a control device 70 (for example a user's smartphone) set up to track multiple tracking device 10 attached to objects, items or assets that make up a user-defined "group" 303. A program 300 is installed and run on the control device. The control program 300 is referred to generally as a "find and track group" feature and enables a user to conveniently locate items in the group by radio proximity or by using a bell and light built into each tracking device 10,2200,2800 from a single screen. The group feature may be turned on and off using soft slider control 302, for example. Each object of the group is fitted with a tracking device or the tracking device is embedded in the object. The tracking device may take the form of a credit-card sized device (2300, FIG. 22) for use in a wallet or a brim of a hat. The tracking device may also include a cellular radio (2800, FIG. 28, see below). In this illustration, a keychain 304, wallet 305, briefcase 306, umbrella 307, and hat 308 are selected as a "group" such as would typically be gathered up before going to work.

Using the program menu, each item on the list can be collected and cleared. In the event that any item has been misplaced, program 300 offers a user interface with map and tools to assist in finding them.

Figure 17:
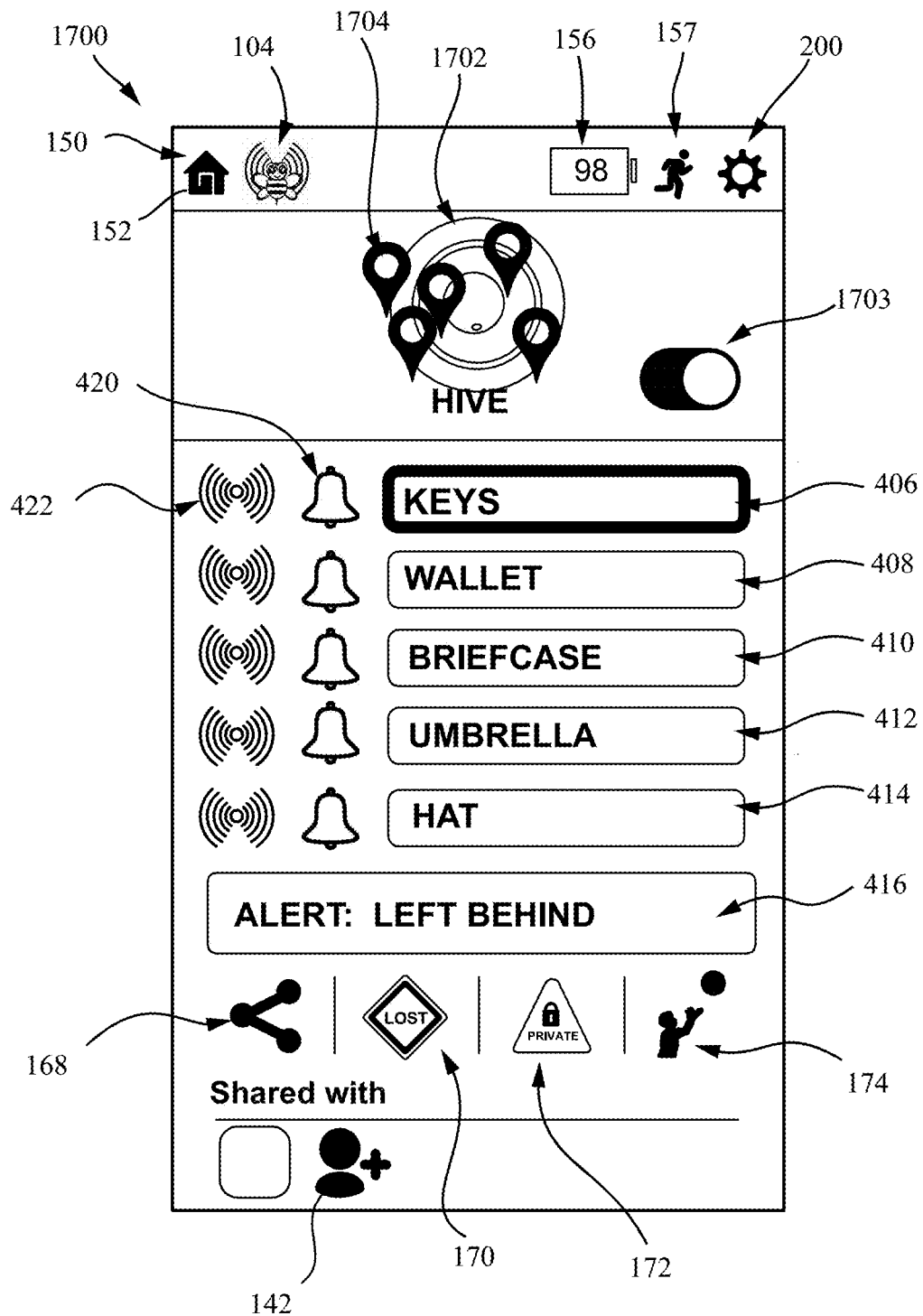
FIG. 17 is a view of a screenshot of a control program, the screen having user interactive controls for finding and tracking groups of objects.

FIG. 17 is a view of a screenshot 1700 of the graphical user interface in group mode: the screen having user interactive controls for finding and tracking groups of objects. Top center includes a bullseye 1702 that represents a general map of the radio field around the control device 70. Each of the five objects is mapped with a map pin 1704. Soft switch 1703 enables the user to switch off the group mode when not needed.

Also shown on the top banner 150 are soft buttons for "home" (152), for hive ("104"), a battery charge indicator 156, a soft button 157 used to release control of the radiotags, as used to change ownership or change permissions, and a menu pulldown 200 for general settings. In this view, the device tagged as KEYS 406 is highlighted so that it may be managed individually.

In the bottom banner, the user may select symbol 168 in order to share the device with another user. By selecting symbol 170 the user may designate the device tagged as KEYS as lost. Selecting symbol 172 marks the device as private and only the user may see the data generated from that device as well as its location.

Symbol 174 allows the user to release all control of the device tagged as KEYS. The bottom banner 176 indicates other users with whom the current user has shared the device tagged as KEYS. Other tracking devices can be selected in the menu list for actions.

By clicking on symbol 200 on screenshot 1700, the user is taken to screenshot 104 (FIG. 10) where the user may enter particular information about a particular tracking device. In box 186, the user may describe the object or person attached to a device and pressing bar 188 saves or the Save button on the top banner saves all settings. Pressing the Back button returns the user to screenshot 1700. Pressing the Edit Button allows the user to make changes in the settings on screen 104 (FIG. 10).

In screenshot 1700, five fields (up to seven are possible) are provided so that the user can monitor each radiotag in a group. Shown here are fields that are user-labelled as "KEYS" 406, "WALLET" 408, "BRIEFCASE" 410, "UMBRELLA" 412, and "HAT" 414. These correspond to the objects shown in FIG. 16, but any objects or assets selected by the user may be programmed as a group. The tracking devices may also be used with children and pets for example.

Icons 422 show that the corresponding BT radiobeacon signal of the tracking device(s) 10 are being received by the control device. Soft buttons 420 allow the user to generate a visual or audible alarm in any one of the objects of the group. In this way, the user can immediately inventory the needed items and cause any missing item to generate an alarm tone that aids in finding the missing item.

In use, radiobeacon signals are monitored by the control device processor, each signal having a unique identifier and an information payload. Depending on how the user sets up alerts, motion, heading, proximity, temperature, or other sensor outputs can cause the processor to execute an alert. Here, a sample ALERT: KEYS LEFT BEHIND is shown. This would occur if the group was moving, such as when the owner is leaving a room or walking on the sidewalk, but the KEYS member of the group was not showing corresponding motion. The alert will be shown on the control device 70, and may be accompanied by a vibration or an audible tone, if the group member is left behind. Similarly, an audible alert will occur on the radiotag or radiotags if the control device 70 is left behind. Thus the group uses radio proximity to ensure cohesion of the group; any fading or loss of signal from one group member results in a notification. Comparison of discrepancies in motion or heading signal data are interpreted to determine which tracking device is lost or left behind.

An OUT OF RANGE alert will occur if any member of the group loses radio contact with the control device.

A WAYWARD OBJECT may occur if the control device is moving in one direction or at one velocity and an object is moving in another direction or at another velocity. This is more likely to suggest that the object has been taken without permission. By actuation of the LOST button 172, the user can record the object as missing and can use cloud host resources to find and track the lost object. The WAYWARD OBJECT alert may occur in conjunction with a geofence that defines a "safe zone" or a geofence that defines an "exclusion zone".

Not all alerts relate to location. An OVER LIMIT alert can occur if sensor data exceeds a preset threshold. Similarly, an UNDER LIMIT alert can be preprogrammed. This is useful for example in the wine chiller shown in FIG. 15.

A SEND HELP alert can occur if there is a sudden impact, a rapid increase or decrease in accelerometry data, a sharp noise, very low temperatures, or sustained shaking. The user can confirm a need for help by pressing the alert button or can preprogram the multifunction button 11 of a tracking device to respond to a steady pressure or a distinct pulse sequence by causing the cloud host server to communicate a possible injury or threat to a 911 operator and provide a location of the radiotag.

Another alarm is a LOW BATTERY alarm. Generally this will occur in daylight hours (as determined by a photocell in the radiotag or control apparatus), and indicates that the user should either recharge or replace the battery supplied with the radiotag.

Other alerts can readily be programmed using basic rules-based instructions and one or more sensor conditions.

As for the FIND PHONE feature described earlier, the multifunction smart button 11 on any one of the tracking devices can also be used to round up any of the other object/radiotags that are missing, avoiding the need to pull out the smartphone 70 and navigate to the user interface.

In some instances, as discussed earlier, the alert function (also termed a "notification") can be accompanied or substituted by an action. Using motion of a tracking device to cause the control device to take an action was an example given. Similarly, the radiotag can cause a garage door to go up or an email to be sent.

Figure 18:
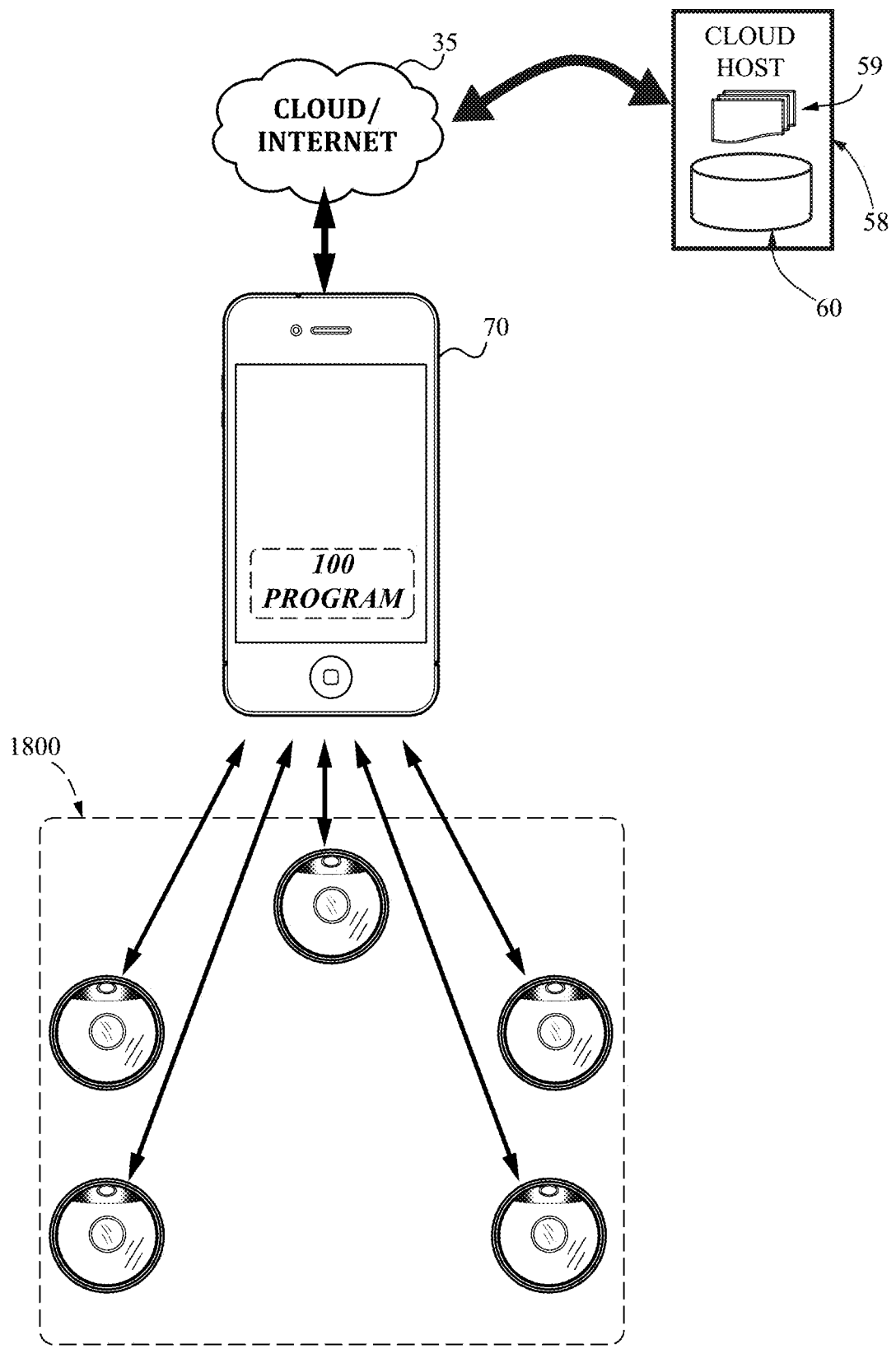
FIG. 18 illustrates a group 1800 of BT radiotags that report via a dedicated connection to a BT radio of a smartphone 70.

FIG. 18 illustrates a group 1800 of BT radiotags that report via a dedicated connection to a BT radio of a smartphone 70. By providing an application 100 configured to recognize compatible signals from BT radiotags, signals are handled differently than in an unprogrammed device. In some instances the signals are simply forwarded to a cloud server 58 for action, interpretation, or archiving. The cloud server has greater processing power and access to databases 59,60 for correlating information and generating commands in response to the information received from the tracking device group 1800. In other instances, the signals satisfy local logic conditions for commands and actions. The commands or actions can be generated by the cloud server, but in other instances the local program operated by the smartphone 70 is enabled to make the appropriate response. The smartphone is adapted for this purpose by installing a program 100 that is designed to operate the tracking devices as a group. Programmable responses may be assigned by the user by customizing or creating "conditional rules" stored in the smartphone or stored in databases 59,60 on the cloud server in association with a user profile. The radio unit identifier broadcast by the tracking device and forwarded to the cloud server ties the signal to a particular user profile. In some instances, the conditional rules for customization of executables are stored on the local smart device 70; in other instances the cloud server may store the rules and cause the local device to execute them.

Figure 19:
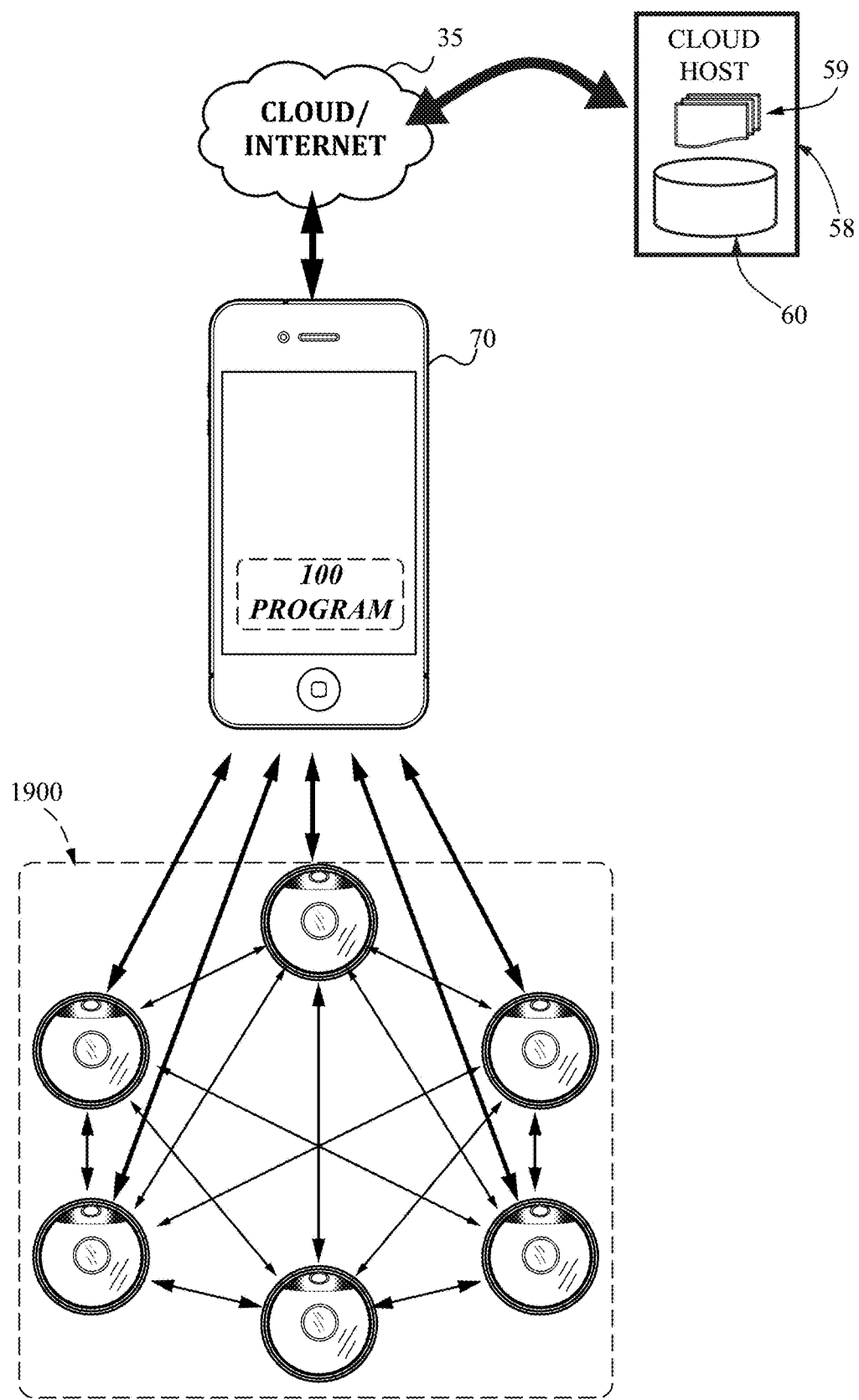
FIG. 19 illustrates a group of BT radiotags 1900 that in addition to connecting to the BT radio of a smartphone, also are capable of forming a mesh network with each other.

FIG. 19 illustrates a group of BT radiotags 1900 that in addition to connecting to the BT radio of a smartphone, also are capable of forming a mesh network with each other. In this instance, the connection with the smartphone defines a piconet with smartphone 70 as central and BT radiotags as peripherals, but each BT radiotag may also participate in a mesh network, peer-to-peer, whereby data is exchanged between members of the group without the smartphone as intermediary. Data may also be shared with server/host 58 via smartphone 70. Smartphone 70 is also useful in displaying a user interface for setting up the group as described earlier. The smartphone is adapted for this purpose by installing a program 100 that is designed to operate the tracking devices as a group. A mesh network is useful in allowing each device to monitor other members of the group, but the cost is more energy drain on the batteries.

Figure 20:
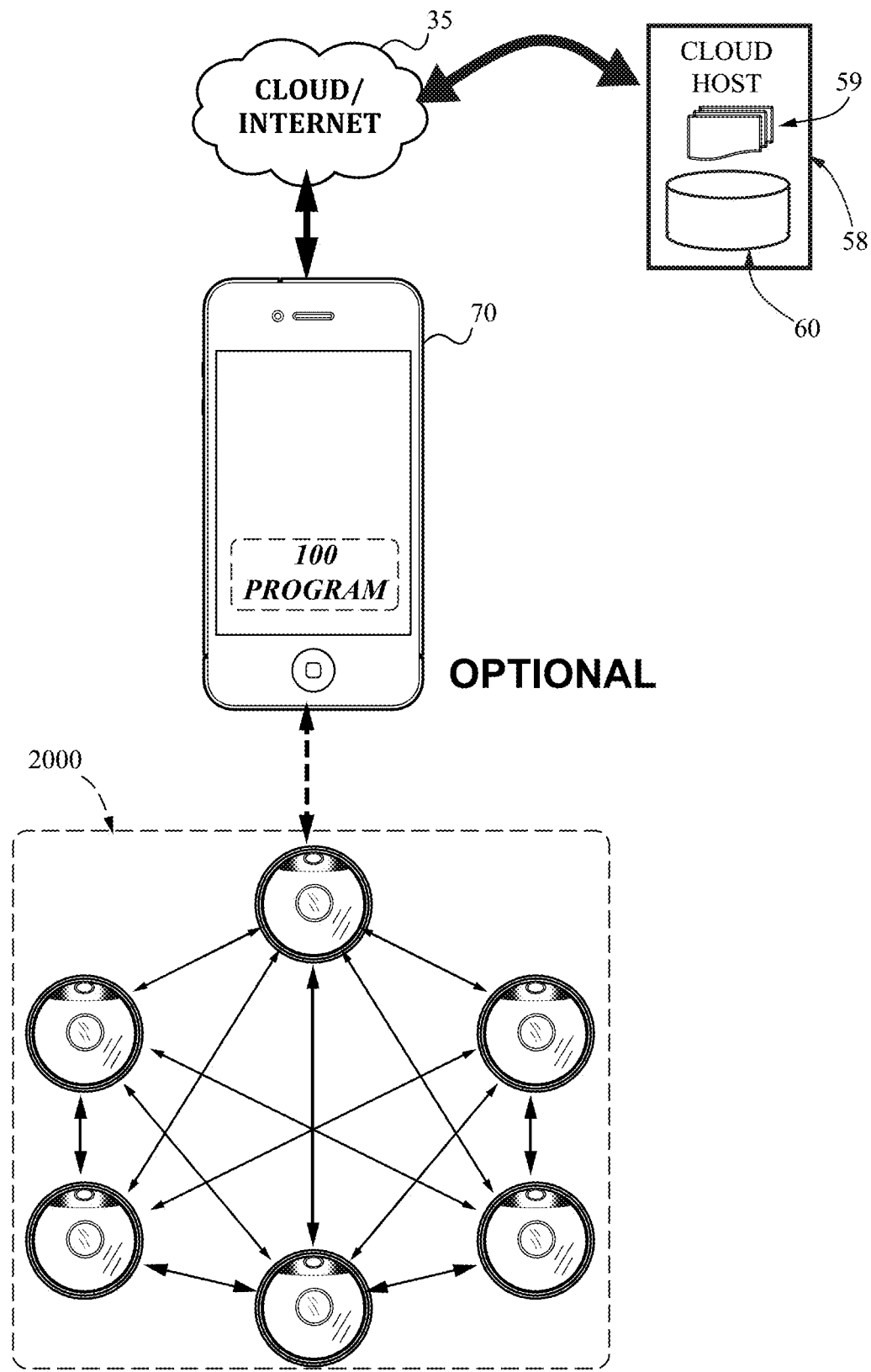
FIG. 20 shows the BT mesh network as an independent network.

In FIG. 20, the BT mesh network is shown as an independent entity 2000, in which each BT radio is able to recognize other members of the group. Generally, one member will assume the role of master, but the BT specification allows the role of master to be alternated by a "master-slave switch command" that when executed transfers the role of master of the network to another member of the group. Because the roles of master and slave are associated with different levels of transmit and receive activity, and hence different energy budgets, battery power sharing can be achieved by alternating the roles of the members so as to distribute the power requirement of maintaining the peer-to-peer network. The independent mesh network continues to operate as a piconet even in the absence of a smart device 70.

The smartphone in this view is optional for group cohesion, meaning that the group members monitor cohesion of the group independently by periodically checking for the radio signals of other members of the group 2000. The limitation is that the BT network is not capable of directly communicating with the Internet via an IP packet data portal or with a cellular radio network. Thus the smartphone 70 serves as a necessary intermediary for communications with cloud host 35 and server/host 58. Each smartphone is provided with a program 100 that enables the sharing of data from the BT group and for downlinking of commands, data, or program updates from the cloud host to the BT group members. Absent a smartphone, at least one of the tracking devices may have an independent processor and memory, operating an application in Python code, for example, and may have a more complex user interface for communicating essential information to a user. In one embodiment, the group 2000 stores information and periodically uploads it via the smartphone 70.

Figure 21A:
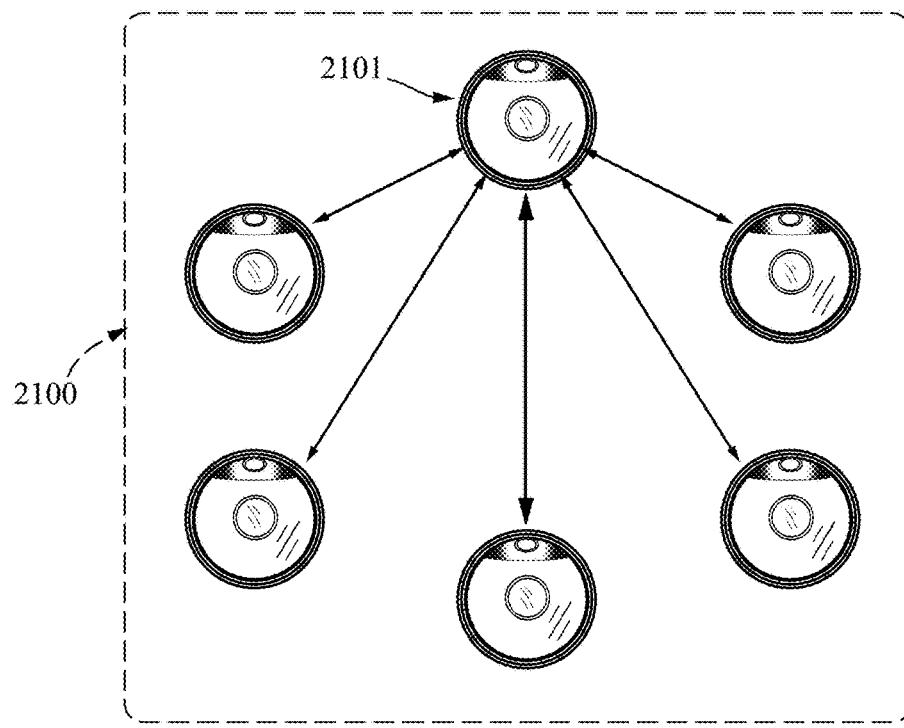
FIG. 21A shows BT device in a hub or star radio network.
Figure 21B:
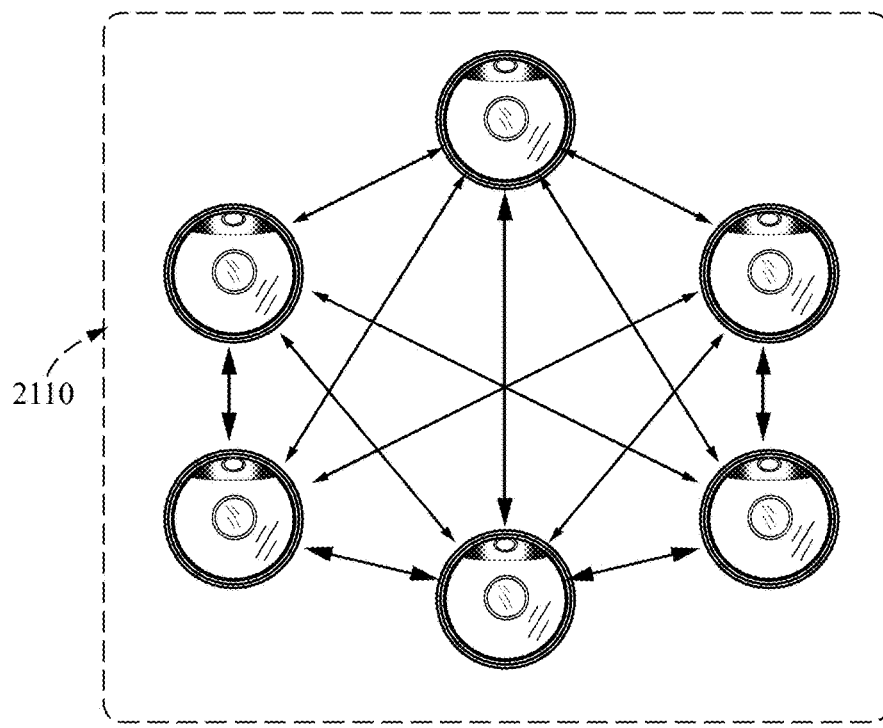
FIG. 21B shows a true peer-to-peer mesh network.

In FIG. 21A, the BT devices of a group 2100 are shown in a hub or star radio network in which one central device 2101 is linked to five satellite devices. But in FIG. 21B, all devices of a group 2110 are enabled to maintain BT radio links and share information with all other radios in a true peer-to-peer mesh network. This open network arrangement consumes more power than the star configuration, and is optional.

Figure 22:
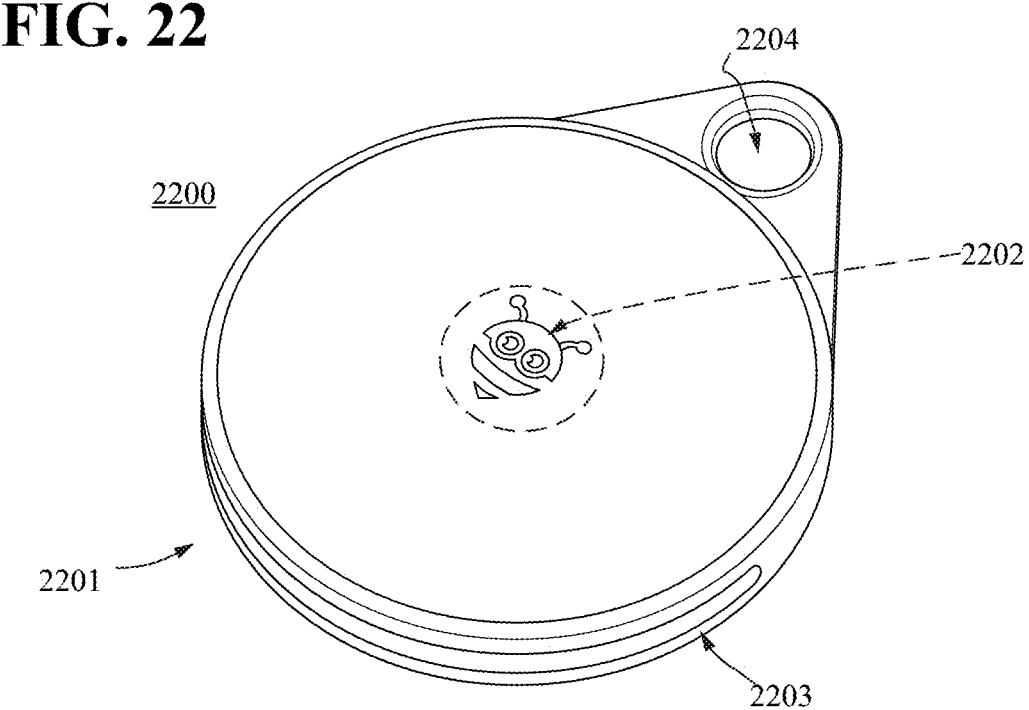
FIG. 22 is a view of a BT tracking device with an alternate form factor.

FIG. 22 is a view of a BT device 2200 with an alternate form factor. The device includes a radiolucent housing 2201 with center button sensor 2202 and an RGB LED 2203 mounted edgewise on the body. The center button sensor is a multifunction button and results in a distinctive radiobeacon signal when pressed. Bits in the radiobeacon signal are assigned to be read so as to communicate the number of times the button is pressed and the duration of the press to a smart device, for example. The signal may contain other information as well. The programming 100 in the smart device allows the user to assign a conditional rule based on the button press pattern or other information in the signal. The RGB-LED 2203 inlaid on the wall of the housing extends in a band along about a 180 degree arc opposite the annulus 2204. The RGB-LED may be segmented and may operate in a pulsatile or function specific mode to provide feedback during user setup and interactions. The annulus 2204 is provided for attaching the radiotag to an asset such as a keychain. Inductive charging is achieved with a Qi or NFC antenna on the base of the device.

Figure 23:
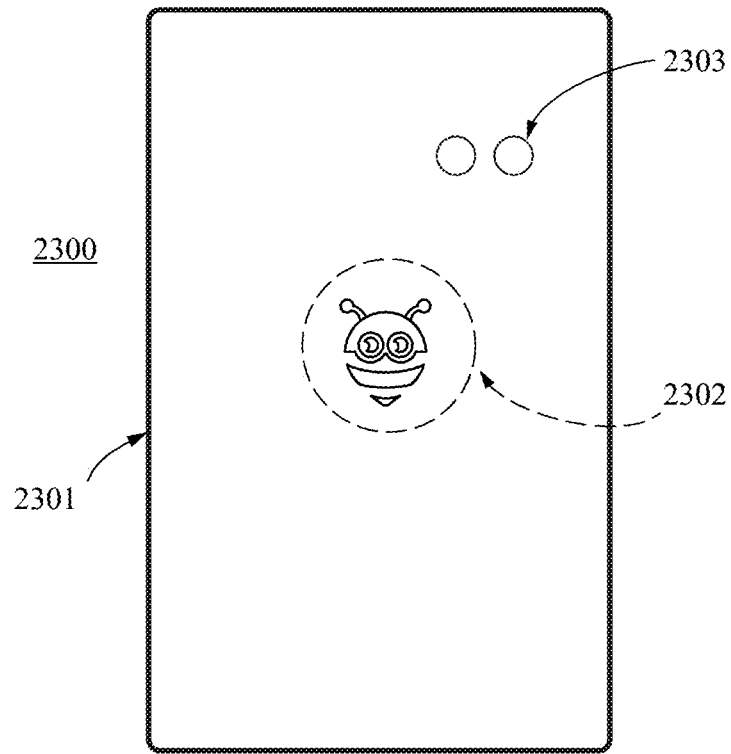
FIG. 23 is a view of a BT radiotag with a thin credit card-like body.

FIG. 23 is a view of a BT radiotag 2300 with a thin credit card-like body 2301. The body includes a central button sensor 2302 and terminals 2303 for attaching the radiotag to a charging dock. Alternatively, inductive charging may be used.

Figure 24:
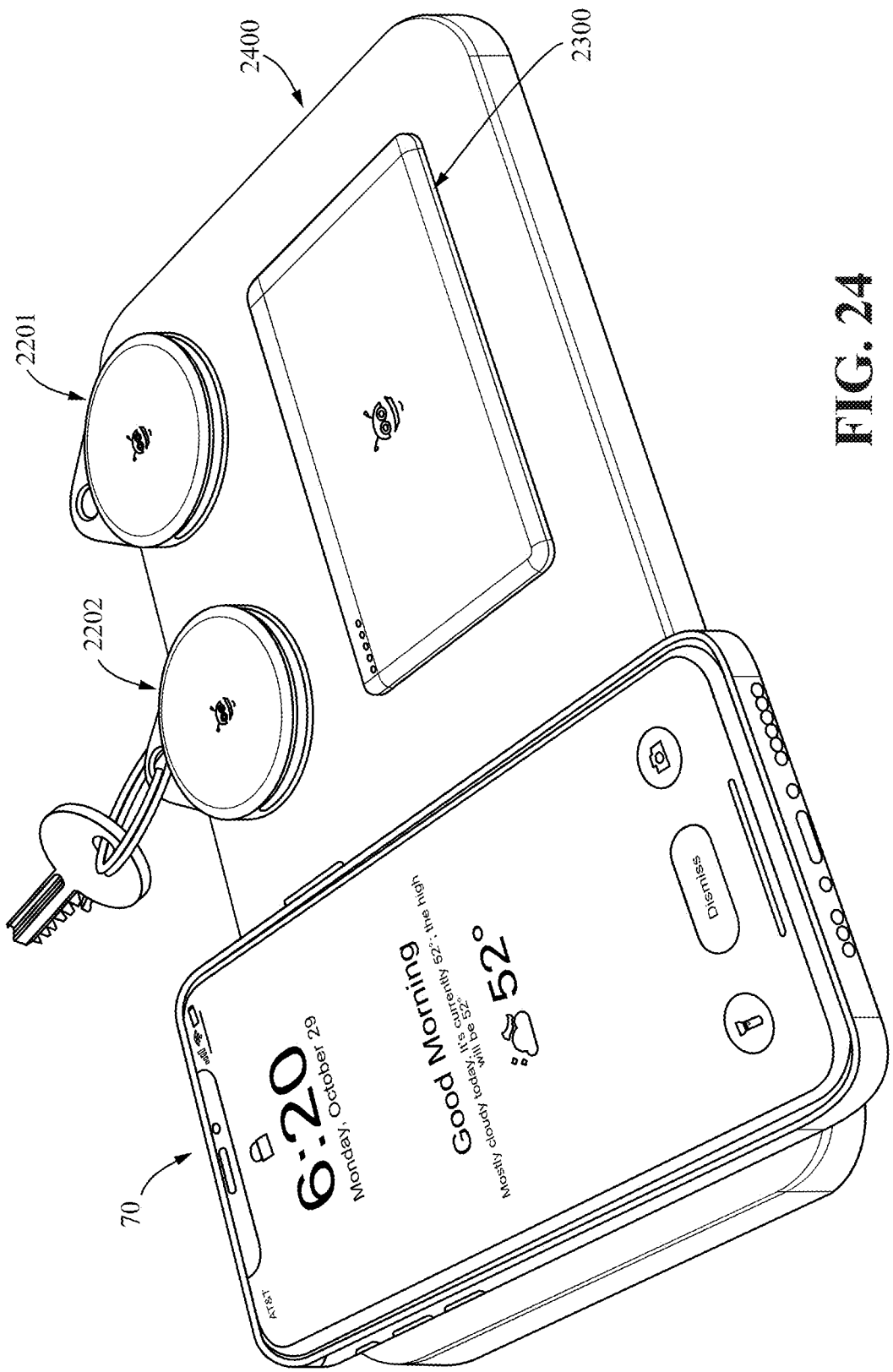
FIG. 24 shows an organizer pad with stations for recharging three or four BT tracking devices and a smartphone.

FIG. 24 shows an organizer pad 2400 built as an inductive Qi charging pad with stations for three or four BT tracking devices. Shown here are two BT devices 2201, 2202, one with a keychain, and a wallet-dimensioned card, 2300. For convenience, the charging pad also includes a charging station for a smartphone 70. The organizer pad has dimensions of about 22×12 cm and is few millimeters thick. The pad, which is a plug-in device that receives AC power, allows for charging of several radiotags along with the phone simultaneously and is for home use. The pad can also include provision for autosynchronization of data to an external server via a WiFi or BT radio built into the pad. In future releases, NFC antennae having the capacity to charge the system also may be used for data transfer over an NFC connection while devices are on the organizer. Data transfer is useful for example in synchronizing calendars, contact lists, and network settings. Each NFC radio is configured to enable staging and provisioning of a network connection to one of the higher bandwidth radios for devices having multiple radios; for example an NFC interrogatory can trigger setup and/or activation of a BT radio link, or a WiFi link, and thus the pad serves as a home reference hub, for example.

In this way several radiotags and a smartphone are managed as a group. When on the charging pad, data can be uploaded from the radiotags and program updates can be downloaded.

Figure 25:
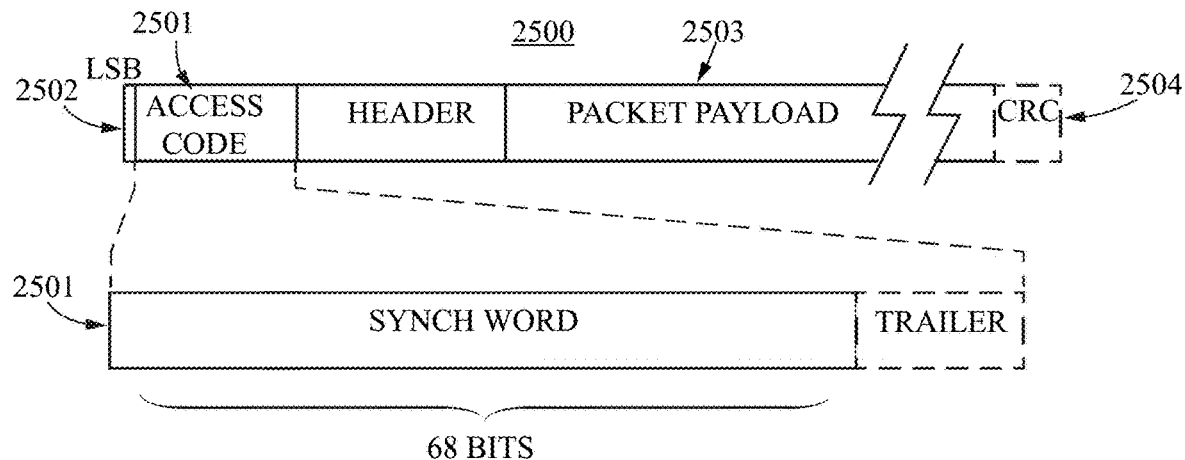
FIG. 25 diagrams the structure of a BT transmission 2500 as specified by the BT Special Interest Group.

FIG. 25 diagrams the structure of a BT transmission 2500 as specified by the BT Special Interest Group (SIG). The access code 2501 is used to define relationships between radio members in piconets and to distinguish advertising transmissions directed at specific recipients versus general advertising broadcasts. The access code may also be used to define members of a group for purposes of radio tracking. The trailer 2504 is generally a message integrity check. Messages in the BT advertising channels will include the preamble 10101010 (2502, one octet). Messages in the BT data channels may have preambles of 01010101 or 10101010.

BT radio signals are formatted as packets. BT devices include packet composers and decomposers. The message structure, starting with the least significant bit (LSB), specifies the preamble followed by the SYNCH WORD and trailer of the ACCESS CODE 2501, and then a PDU Header followed by the PAYLOAD 2503 and a CRC 2504. The synch word is designed to identify the relationship of the sender and receiver and to specify a basic synchronization sequence and clock offset for exchanging messages in the spread spectrum. The payload can be an advertising data payload of 0-37 Bytes or a data payload of up to 255 Bytes. The PDU header will specify the message type, which may be selected from i) connectable undirected; ii) connectable directed, (iii) non-connectable, non-directed, (iv) scan request, (v) scan response, (vi) connect request, and (vii) scannable undirected. A stealth access code may also be used that will not be accepted by the correlator of BT radios to which it is not addressed. In this way, the access code confers a significant level of structure and specificity on BT radio interactions.

BT radios also include correlators with registers for sorting and identifying received signals based on access code or service, for example as described in US Pat. Publ. Nos. 2002/048330 and 2009/0086711, which are incorporated herein for all they teach and reference.

"Access codes" address BT radio traffic. For example, a general inquiry access code (GIAC) identifies traffic broadcast to any listening device, and indicates a discoverable device. Other inquiry access codes may be directed to individual devices, such as particular members of a piconet. The access code may be derived from, but is not the radio unit identifier of the transmitting device or the intended receiving device.

A payload may include a URL and payload unique identifiers (UIDs) that identify proprietary "services", referring to the client-server relationship between a discovering device and a discoverable device. The payload may include frames or "values" containing more information. A MAC address, a partial MAC address, or a pseudo-MAC address can be inserted in the Payload. Payload information may include sub-type or location, advertising data, sensor output in digital form, and records of Bluetooth radio contacts, for example.

Service identifiers (UID) inform the radio of protocols to be followed in sending or receiving data, and allow developers to create tools that incorporate elements of the payload as "deep intent" triggers for software applications. Advertising messages may include one or more service UIDs, for example, that specify the kinds of interactions and data exchanges supported by the transmitting device. Other messages may not provide sufficient information to identify all services associated with a device, but a qualified BT receiver can respond to obtain more extended information without actually connecting.

For example, identifiers in a message actuate protocols in receiving BT radios and can wake smart devices, direct a smart device to a URL, push a notification to a remote device, or pull attachments from cloud library resources, for example.

Devices also may be recognized by the services they advertise. For dedicated peripheral devices, a client application can scan for devices offering services or features associated with a UID that specifies the GATT services the BT device supports, and in full CONNECTION, data specific to a service or feature can be transmitted across the connection.

The payload may also include a UUID or part of a UUID. BT unique radio identifiers (RUI) or "radio signatures", as used here, may be a MAC address of a BT radio device or may be a universal unique identifier (UUID) or a part of a UUID, and may include a serial identifier assigned by the Bluetooth Special Interest Group (Bluetooth SIG) as administered through the IEEE Standardization group (accessible via a WHOIS-style lookup). The RUI may also include a part number given by the manufacturer. The SIG standard also permits developers to encode a "group identifier" or "community identifier" inside an extended unique identifier (EUID) issued by the manufacturer, inside the BD ADDR, or inside a Service UID. Proxy identifiers such as service UIDs link to services associated with a discovered BT device.

A smart device can receive Bluetooth radio traffic from any Bluetooth device in radio proximity, and forward that traffic to an IP address associated with a Bluetooth group or community identifier, after adding a timestamp or a location stamp. By doing so, the smart device serves as a "hub" to transfer Bluetooth traffic radio contact records to a broader global network (or vice versa), enabling a range of location-driven services that can be modified according to sensor data. Smart devices include smartphones, for example, but may also include laptops, PDAs, Google glasses, smart wrist watches, and any generally portable device with Internet connectivity and onboard processing power is commonly understood to be a "smart device" sensu lato. Smart devices are typically provided with a SIM card when used in cellular telephonic radio communications. Each such device is given an IMSI identification number that points to one particular unique device and more generally is referred to as the cellular "radio unit identifier".

Many devices broadcast their RUI or MAC address in the open, or in response to a SCAN REQUEST. The RUI address can be an advertising address, a device address, a dedicated address of a piconet device, a virtual address, or a subscriber address, as is useful in mesh networks and for creating whitelists. Some address standards are open, others are proprietary or are obfuscated to prevent BT snooping.

In recent trends, BT signal payloads may include URLs that link the device to the physical web. Alternatively a community identifier is transmitted in a message as part of a header, routing address, or payload, and when recognized by packet decomposer in a receiving device, causes the message to be forwarded to an IP Address and associated cloud host. This approach has enabled community lost-andfound services such as described in US Pat. Appl. Publ. No. 2016/0294493) which is incorporated in full by reference.

The radio header and payload may also include resource identifiers that direct communications protocols in the link layer and activate software applications keyed to the resource identifiers. This approach is seen frequently with smartphones—installed applications can react in real time to BT transmissions. For example, a received BT transmission can wake up a sleeping device (US Pat. Appl. Publ. No. 2020/0242549), which is incorporated here by reference. More recently, data supplied in the fields or payload of a BT transmission can cause an App to be installed, or if the App is installed and the appropriate permissions are in place, the App can be run at a particular instance in the program as most relevant to contextual clues in the received BT signal. This is termed "deep intent" to indicate that the App anticipates the user's thought process and causes the client smartphone to display the most relevant materials from a resource or takes an appropriate action in anticipation of the need. More recently the process has been extended to display screens, so that "walk up" computing is increasingly automated by invisible BT radio transmissions that identify the user and guess the user's intent from radio proximity or accelerometry data. For example, if a user picks up a shoe in a shoe store, a BT radiotag attached to the shoe will send a sensor output and a wall display screen will display more information about the shoe, or push that information onto the user's smartphone.

In connected links, BT signals transmit data. Newer BT 5.0, 5.1 and 5.2 standards permit multi-slot messages for sharing larger amounts of information, even encoding of speech. Connectionless data sharing is also supported in the newer protocols.

In a typical BT interaction, a first BT device in discoverable mode will send an INQUIRY packet 128 times in 1.28 seconds. Each inquiry packet is sent in 16 time slots (10 ms, 625 us each) over alternating frequencies. The INQUIRY packet is short, just an inquiry access code. A second BT device, operating in an unsynchronized listening mode, intercepts one of these transmissions by coincidence (there are 79 possible frequencies [or 40 depending on the standard], three of which are reserved as advertising frequencies in BTLE). The Baseband protocol causes each radio to use pseudorandom "frequency hops" to jump from frequency to frequency over the spread spectrum (U.S. Pat. No. 2,292,387). A device that is in INQUIRY SCAN at some crossover hop will intercept a packet with an inquiry access code that it recognizes, or that it chooses to accept. The frequency hop protocol is inherent in the access code, and a device that accepts an access code can then join the hop sequence with the first device and can send an FHS response packet containing its hardware address and its clock so that the first device can specifically address it with further instructions, if permitted. The interaction may then rapidly be escalated to a PAGE and PAGE SCAN interaction, resulting in a CONNECTION that formally makes a piconet link in which the RUIs of the radios are stored in device memory for future recall. The piconet relationship defines one of the devices as a "center" device ("master") and the other device as a "peripheral" ("slave") for purposes of organizing the transmission and receive sequences. At the hardware level, these roles are interchangeable and are controllable by a master-slave switch.

A BT device can participate in two or more piconets as separated by time division multiplexing with millisecond separation. While more limited in the newer BTLE standards, in one embodiment, any BT device may belong to a hierarchy of piconets, in which its participation in a second piconet is alternated with its active participation in a first piconet.

The device in the central role scans for BT radio transmissions, looking for advertisements and inquiry responses. The device in the peripheral role advertises itself and offers a service. GATT server vs. GATT client determines how two devices talk to each other once they've established a connection. GATT metadata is transferred from server sensor node to client center node, for example.

To inquire about other radio units in a receiving area, BT radios may also promiscuously announce their presence to other BT devices by sending a general INQUIRY access code (0x9E8B33, GIAC). An ID Packet may be exchanged in response to a FHS packet. Access codes are classed as DAC, IAC and CAC, indicating Device Access Code, Inquiry Access Code, and Channel Access Code, respectively, the details of which relate to link management. All packets begin with the CAC, a DAC or IAC, and a clock number segment. A correlator identifies relevant packets for processing. BT devices acquire information about other local BT radios in this way.

In a piconet, using link management, devices that are parked or lose a pairing connection can ignore public traffic but will "wake up" (almost instantly) in response to a beacon signal from a familiar or "whitelisted" partner—so as to restore or recover a piconet connection.

The listening device can also partially wake up its MCU in order to log any radio contacts, while not responding further. Not all radio interchanges result in a CONNECTION, but the listening radio can record information about the transmission, and by escalating to INQUIRY SCAN without wasting time or energy, will receive more detailed information about the transmitting device.

Bluetooth Core Specification, Version 5.2 and Supplement (published in 2019, incorporated herein by reference) includes an "Extended Inquiry Response". Data types may be defined for such things as local name and supported services, information that otherwise would have to be obtained by establishing a CONNECTION. A device that receives a RUI and a list of supported services in an extended inquiry response does not have to connect to do a remote name request and service search, thereby shortening the time to useful information reception. Backchannel communications facilitate the connectionless mode.

Figure 26A:
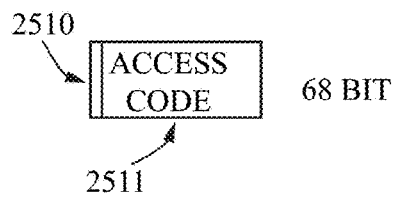
FIGS. 26A, 26B and 26C are sample packet structures that relate to the BT advertising and link layers.
Figure 26B:
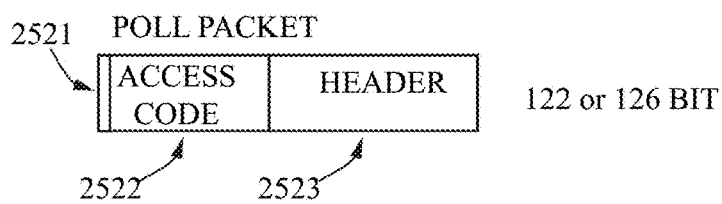
Figure 26C:
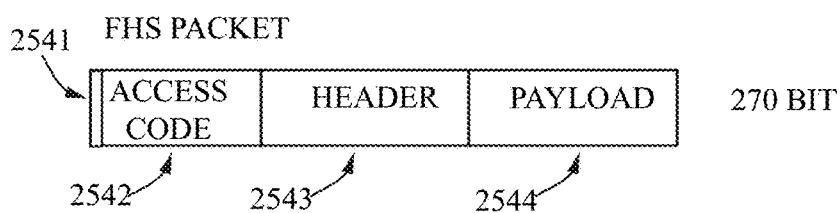

FIGS. 26A, 26B and 26C are sample packet structures that relate to the BT advertising and link layers. Advertising beacon message structures that have standardized lengths in the range of 31 to 47 octets. They may be proprietary formats having defined fields in the header and two to three open fields or frames in the body of the message for non-format contents such as an identifier associated with the device or an advertising service. In the case of Eddystone packets, packet types include those for broadcasting URL (or shortened URL lookup) or sensor data. The shortened names tie to a look-up service so that a device that receives the message can be directed to further information or attachments.

The shortest packet is an INQUIRY packet 2510 as shown in FIG. 26A, with a length of 68 bits. This is an access code 2511 of an inquiry or a device ID PACKET of a scan response. POLL 2521 and NULL packets have a length of 122 or 126 bits (FIG. 26B) and include an access code 2522 and a header 2523 that defines the packet. The FHS packet (2541, FIG. 26C) is important in exchanging identifiers and clock hopping schema as part of the connection process prior to further data exchange by pairing and is 270 bits in length. The FHS packet includes an access code 2542 for addressing the transmission, a header 2543, and a payload 2544. In extended connection mode and connectionless transmissions, packet lengths may span up to 5 slots. For fidelity in voice transmissions, higher numbers of repeats of short packets are used. But packets are typically limited to a maximum payload of 258 octets (about 2 Kbits) with a total length of about 2854 bits in a 5 slot data payload, optionally with enhanced rate packet transmission with DPSK at 2 Mbps or 3 Mbps. These details demonstrate the limitation of BT radio links and underscore the utility of cellular radio as an enhancement for transmission of larger amounts of data at greater speed. 5G tops out at a theoretical 5 Gbps, permitting greater use of broadband services.

FIG. 27 is a view of the structure of a proprietary inquiry response packet 2700 that includes a preamble 2502, access code 2701, payload 2702 and error check bytes 2504. The payload is structured to transmit data to a receiving device. The structure includes a series of length fields (designated by "L", 2704,2708,2712 for example) that help to mask data in the intervening fields. Field 2706 is a local name specified by the manufacture, and may be FNDR or FND, for example, to designate a brand of tracking devices. Field 2710 is a Service UID and acts to trigger the manufacturer's application when received by a control apparatus 70. Field 2714 is a data service filter that can contain information that specifies how the packet is to be read, and thus terminates a header part of the payload.

In this proprietary format, the next field 2016 in the payload specifies a 48 bit MAC Address (6 octets). The first two octets 2018 of the payload body define a "community identifier" that "points to" a designated server to which the data may be forwarded. The community identifier is shared by other devices made by the same manufacturer and is important because the power of the tracking devices rests in great measure on the cloud-based system that administers the devices for a community of users. This is described in more detail in FIG. 37, and in U.S. patent Ser. No. 10/389,459, and related patents that are co-owned.

The remaining four octets of the MAC Address 2016 are device specific and are broadcast so that the devices can be tracked not only by the user, but also by other devices that are community members and can run the required software for recognizing the message structure and decomposing the packet to parse out the MAC address. The MAC address serves as a radio unit identifier (RUI) or short version of a UID. This RUI allows any compatible device in the world to report the location of a lost tracking device to the designated cloud server 58 and allows the cloud server to pair the radio unit identifier with a user profile. Once the user is identified, the cloud server can generate an alert or notification to the owner, or can cause an action in a remote machine. Each type of data in the signal is capable of acting as a flag to trigger a remote response.

The rest of the payload is divided into other fields that are particular data types. The content of some fields can be dynamic, for example field 2720 can be an action sequence specifier in which the value of the field specifies a particular behavior or mode such as an alarm state. Another field 2722 can indicate whether the device is bonded to a control apparatus or is in an unbonded state available for bonding. If bonded, the device may not respond to invitations to connect from another control apparatus. A field 2724 may specify the state of the multifunction button that serves as a command when parsed by compatible software in a control apparatus. A next field 2726 may specify a temperature sensor output, for example. And field 2728 may specify a heading or a motion sensor output, and so forth. Field 2730 may specify the transmit power of the radiobeacon signal, as is useful to the receiving device in more accurately calculating radio proximity. These data fields, and others in other signal types, contain what is referred to here as "information" that may be used to track lost items and to cause remote actions by triggering command and notification functions in a control apparatus 70 or in a cloud host 58.

The tracking device may also receive encoded data that results in execution of a command sequence. The devices have both packet compilers and decompilers for sending and receiving encoded messages. BT devices may also include encryption that may be native encryption specified by the BT SIG, or proprietary encryption utilities.

Thus the BT tracking device exhibits a significant level of sophistication in a simple package. The primary limitation is range of the BTLE radio transceiver. At 2.45 GHz, a signal transmitted at 0 dBm decays in quality within a radius of 100 yards. This is in part due to the FSK modulation of the primary signal and the use of a spread spectrum. In order to overcome these limitations, a next generation of radiotags has been released that includes a PSK-modulated cellular radioset capable of more powerful transmissions. While these newer radiotags are technically different, the basic operation of the lost-and-found system (3700, FIG. 37) includes many features of the earlier systems, but with the augmentation of cellular network connectivity.

Figure 28A:
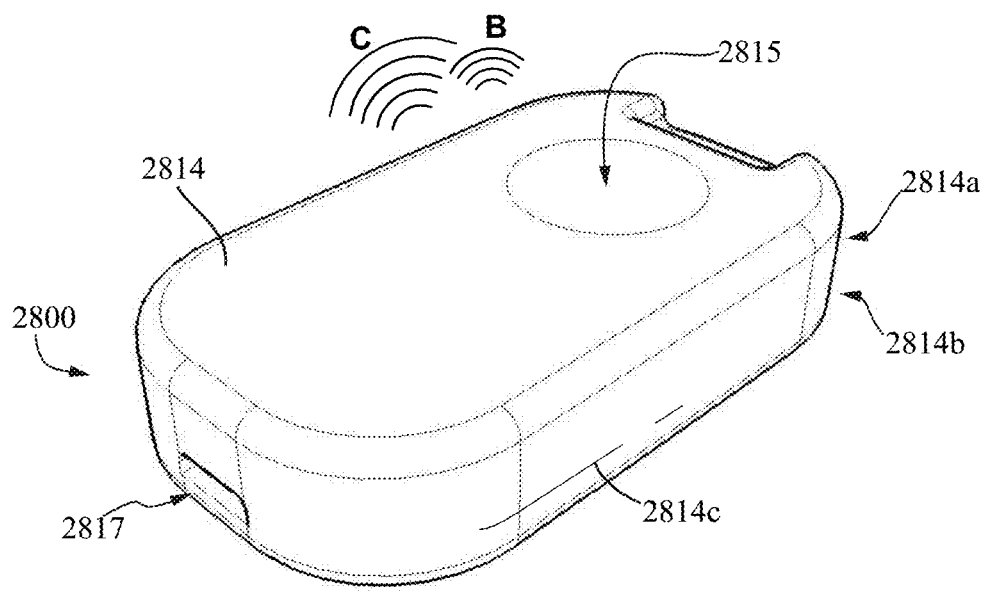
FIGS. 28A and 28B are perspective views of a dual-radio "XCB" radiotag device with both BT and cellular radios.
Figure 28B:
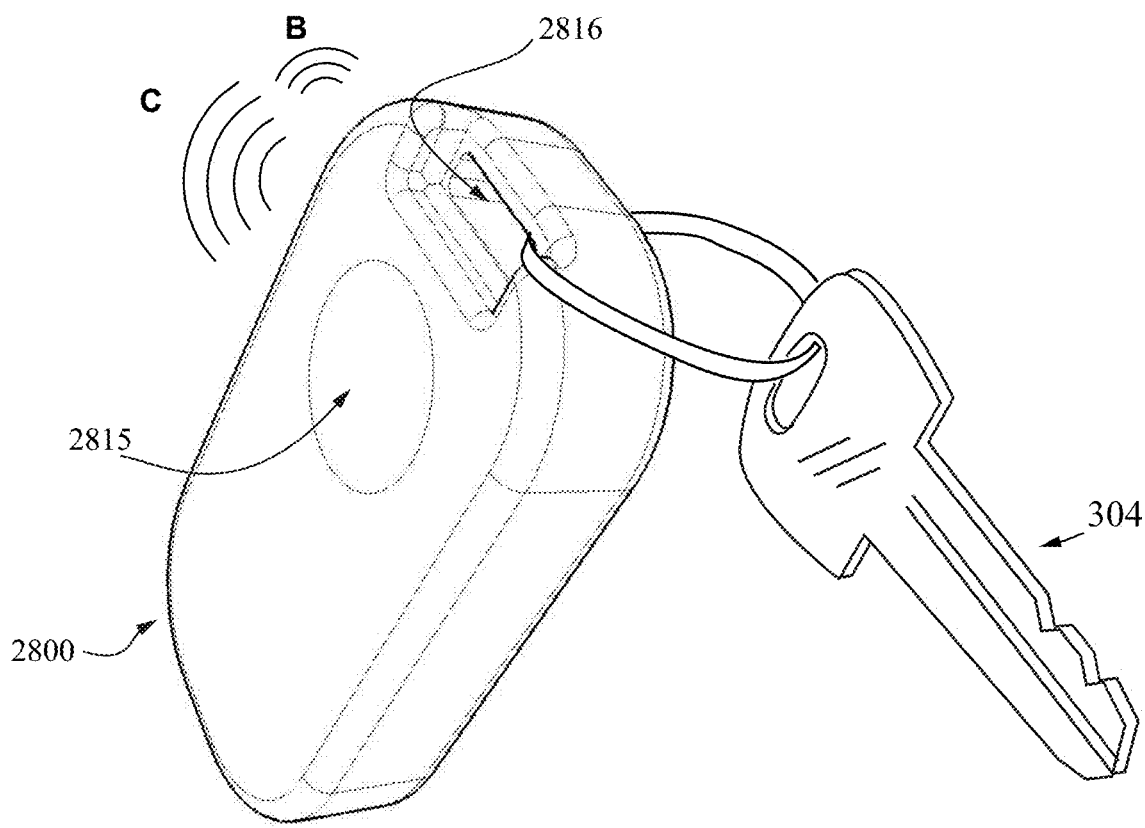

FIGS. 28A and 28B are perspective views of a dual-radio radiotag device 2800 with both a BT and a cellular radio. The device includes a radiolucent hard case 2814, shown here with clamshell construction with upper case member 2814a and lower case member 2814b joined at seam 2814c. Optionally a battery access port may be provided on an undersurface of the case 2814, or in other embodiments the devices may be sealed and may be inductively rechargeable. A USB port 2817 for recharging and data transfer is shown at the back lower end of the device.

So as to distinguish these radiotags 2800 from the earlier described BT radiotags 10, the dual-radio devices are termed "XCB radiotags", and are described more fully in U.S. patent Ser. Nos. 16/575,315, 16/950,666 and 17/163,403 et seq, which are co-owned at the time of this filing and are incorporated herein in full by reference. All such devices 10,2800,2200,2300 are useful as tracking devices when attached or otherwise associated with an asset, person, pet or other object in need of location and tracking services.

XCB devices include a battery or mobile power supply and supporting circuitry as will be described below. The case includes an annulet or slot 2816 (FIG. 28B) for receiving a lanyard or chain. One skilled in the art will readily appreciate that there are various ways of associating a radiotag with an asset, human or animal in need of tracking or likely to get lost. Also shown is an actuator button or switch 2815 formed on an upper surface of the case. The switch 2815 may function as a "homing button" to cause the device to CALL HOME when the switch is depressed, as will be described below. These features are representative of XCB radiotags that embody aspects of the invention but are not to be construed as limitations of the inventions as claimed.

FIG. 28B is a perspective view of first XCB device 2800 with keychain or lanyard through annulet 2816. In these drawings, signals from the radios are indicated by concentric arcs that connote electromagnetic waves, wider for cellular signals (C) and narrower for BT radio signals (B). An attached keychain 304 illustrates one of the many possible uses of the XCB devices. XCB devices and smartphones are both examples of "cellular radio devices" as used here, but XCB devices are used as radiotags and for relaying information to a central server, generally by a machine-to-machine (M2M) protocol.

FIG. 29 is a schematic 2900 of an embodiment of an XCB device 2800. Processor 2970 includes a BTLE radioset 2980 electronically coupled to an antenna 2981a, including, if needed, an encoder/decoder for parsing digital radio signals. The processor can be programmed, or otherwise configured, using software resident in ROM (such as EEPROM 2985) or as firmware, or a combination of both software and firmware. RAM 2984 is also provided for storage of volatile data, such as for data logging of sensor data that is transmissible by cellular or BT radio.

The MCU 2970 defaults to low power mode with clock function as a default, but can be powered up by a signal from the BT radioset or according to a power management schedule that also controls the cell transceiver 2983. The power management schedule includes PSM mode for deep sleep and eDRX mode for intermittent wake at paging windows and for TAU. Relatively simple processors with integral BT radio modems can be used, such as the Dialog DA14683 (Dialog Semiconductor, Reading UK), Texas Instruments CC2652RB (Texas Instruments, Dallas Tex.), Toshiba TC35680FSG (Toshiba, Minato, JP), Nordic nRF52840 (Nordic Semiconductor, Trondheim, Norway) and related semiconductor packages.

Cellular radio modem 2983 with cellular antenna 2983a is configured to provide simplified communication on a private network. In one embodiment, the XCB device is operated as a cellular device accessible by an IP address on a private network to find and track the whereabouts of the device via a dedicated and secure 5G private network or gateway VPG that is administered by a cloud-host administrative server. A SIM module may be installed to establish the exclusive IP address in the XCB device, with network access restricted to authorized parties such as smartphone 70. The cellular modem may be for example a Monarch LTE GM01Q (LTE-M/NB-IoT such as the SQN66430 SiP) or NB01Q (NB-IoT) LGA module with integrated SIM platform (Sequans, Paris FR), or an AeroFONE single-chip core from NPX (NPX Semiconductor, Eindhoven, Netherlands), for example.

In one embodiment, the cloud administrative host implements the VPG or cloud host 35 network and uses the IP address to access the XCB device. By using the VPG to wake up the XCB device in a paging window as needed, sleep modes can be increased to save power. For example, an eDRX protocol can be overridden, or the parameters of a power saving mode modified. And by waking up the cellular modem, then more commands and data can be transmitted to the XCB device and data can be uploaded from the XCB device. Once the cellular radio is on, then network-assisted location fixes on its transmissions may be performed automatically.

Use of private IP addresses with a VPG reduces the incidence of inadvertent, unauthorized, and network-incidental messaging that can drain battery life. The cloud host also adds a layer of artificial intelligence.

Devices having a cellular radio may wake up periodically, get a location fix, report the location to the cloud host, and then return to sleep so that the battery life is months or years. In one embodiment, the VPG network may use the location information to create a "trail of waypoints" of locations of the XCB devices over time by periodically generating and logging locations obtained by AGPS in an energy efficient manner. A motion sensor or heading sensor also improves the efficiency of the devices. For any given time period, if accelerometric motion is detected that is characteristic of motion, or a vectored heading, a position fix is requested and fulfilled. For example, the position fix is not repeated unless motion is again detected. In a variant on geofencing, XCB devices in identified "safe locations" are queried less frequently for location updates and not unless motion data is consistent with an excursion that would take the XCB device outside a designated range of the safe location. The tempo of a walking person is one flag, the higher frequency vibration of an automobile ride is another flag that would trip a location update command inside the XCB device. Thus only the accelerometer needs to be monitored on battery power unless and until a location update command is scheduled in advance or a query is received from the cloud host.

The signal strength of a cellular base station can also be monitored, as is typically the case in cellular networks to monitor connections and when needed transfer connections from one cell to another cell. Typically, the XCB device location is updated by TAU (Tracking Area Update) when a handoff is made between two cells. Depending on rules set by the cloud host that can be linked to the XCB device user's profile, to local events, time of day, and so forth, the cloud host can also be notified if the XCB device is reallocated from one cell to another. Because this can also occur when cell traffic is being levelled (i.e. by moving users from a crowded cell base station onto an adjacent base station having lighter traffic) the cloud host can monitor the base station carrier channels in the network path to differentiate location changes that are traffic load driven versus changes driven by a change in cell initiated because the XCB device detected a stronger signal from an adjacent base station and elected to initiate a handover to the new system transmitter.

The device optionally includes an OLED display 2930 and display driver 2929.

In some instances, the cellular radio chip 2983 will also contain a GPS position locator. In other instances, a GPS chip 2988 and antenna 2988a will be supplied as a separate component(s). Because GPS involves an energy-intensive signal acquisition and calculation, triangulation methods for determining location may instead be implemented using the cellular or BT radiosets, and such methods are satisfactory where multiple base stations having known locations are available, such as in most urban environments.

USB port 2981 is intended to operate with charger 2998 to recharge battery 2999 but may also be used to download program upgrades, for product qualification and troubleshooting, and for any other purpose for which a USB port may be utilized.

Audio codec 2990 is coupled by a LINE OUT to amplifier 2992, which drives speaker 2993. The speaker may be mounted on the housing rather than on a circuit board so as to take advantage of any resonance of the housing shell. The XCB device may include a vibrator driver 2994 and one or more vibrators 2995 configured to provide notification functions and may be combined with one or more buzzers. By selecting a higher dB piezoelectric buzzer (not shown), a FIND function can be realized analogous to the FIND PHONE function taught in U.S. Pat. No. 9,892,626, herein incorporated in full for all it teaches. Using the vibrator, an XCB device may be "nudged." A nudge is useful when a user of a parent device wants to attract the attention of the user of the XCB device, such as when a message is sent that needs a prompt reply.

Sensor package 2996 may include one or more sensors that are not switch sensors and are thus distinct from switches 2986 (S1, S2, S3). Various combinations of sensors may be provided in a sensor package. In some preferred embodiments, a sensor is a combined 9-axis motion sensor and temperature sensor. In one preferred device, a sensor is an integrated package having an accelerometer, gyroscope, and magnetometer for each axis. In some instances, the sensor package is incorporated into the processor.

As illustrated here, accelerometer or heading sensor 2997 is associated with processor 2970 and may be used to trigger processor functions as in motion/heading control and left-behind notifications. Generally, an XYZ three-axis accelerometer is included but may also include a 3D gyroscope and magnetic compass with firmware that generates a heading output to the processor. In some instances, the accelerometer may be integrated into the processor and has a number of uses. Input from the accelerometer, such as a double or triple tap, can be used as a wakeup signal as part of a power-savings sleep routine.

The device may also be equipped with a Qi charger antenna (not shown) or an NFC antenna 2933 for receiving finger taps. Each tap can be associated with a transmission of an RFID identifier from the XCB radiotag to a device such as a smartphone equipped with an NFC reader and suitable App. On sensing a finger tap, the XCB device powers on the NFC circuit to transmit the RFID ID and causes a bootstrap routine in cooperation with the smart device to initiate a BT connection or a WiFi connection for example.

GPS chip 2988 with GPS antenna 2988*a* is shown as being optional because in some instances the GPS functionality will be built into the processor or into one of the radiosets, if present at all. Some cellular radio chips are provided with accessory GPS functionality integrated into the die. The GPS antenna 2988*a* may be separate from the cellular antenna 2983*a* as shown, but, in some instances, a combination package is used. GPS may be actuated at extended intervals to save power, and may be smart GPS, that is, activation occurs when there is a need, such as when there is motion of the wireless device or there is a situation in proximity to the wireless device (as detected from other data feeds) that necessitates, or can benefit from, closer tracking and monitoring of location. AGPS may be used to reduce power.

Figure 30A:
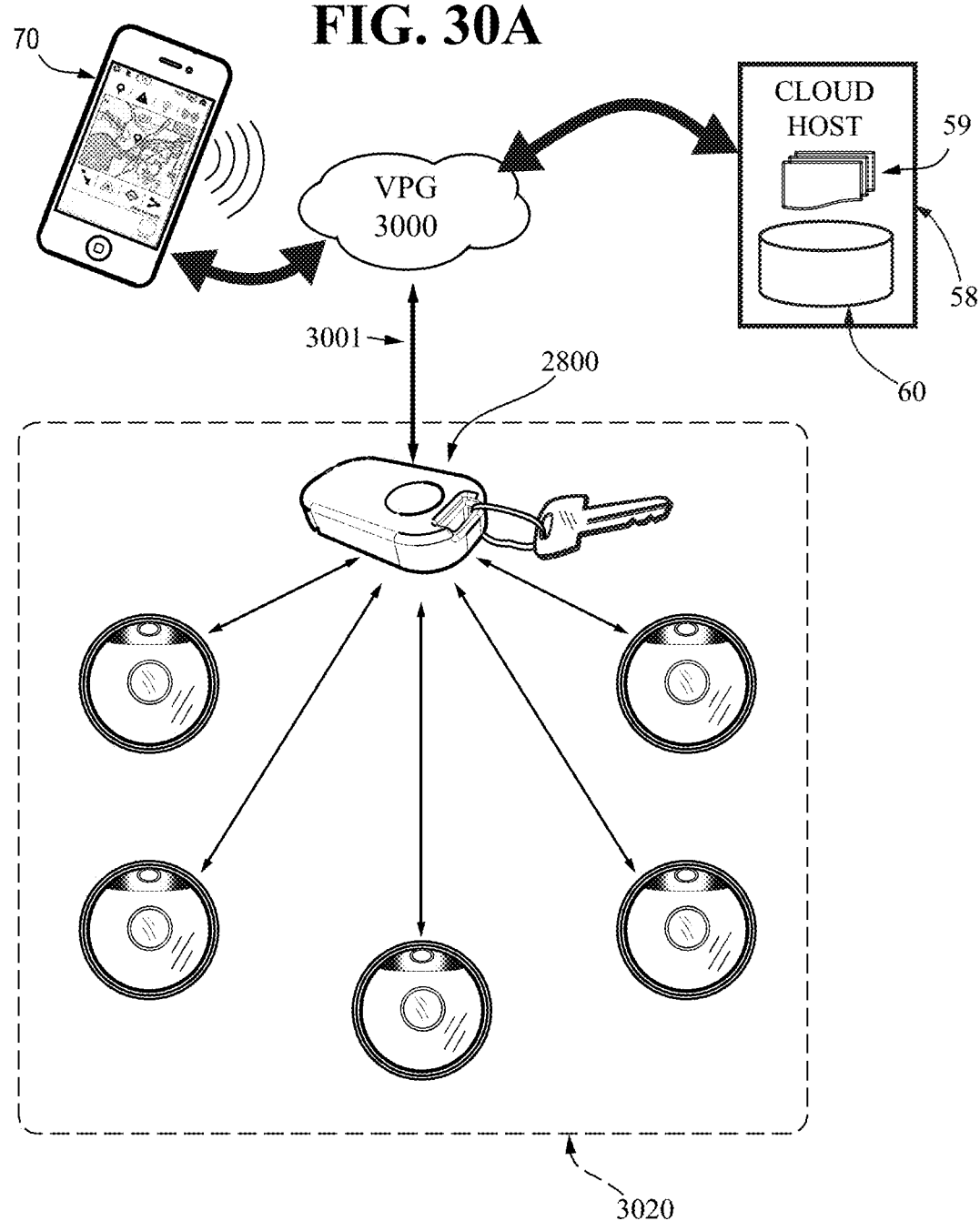
FIGS. 30A and 30B illustrate XCB radiotags as part of groups of tracking devices.

FIG. 30A is a view of an XCB radiotag 2800 as part of a first group 3020 defined by membership of six tracking devices (including the XCB radiotag, which may be attached to a keychain, for example). The XCB radiotag is enabled to directly connect 3001 with a virtual private gateway 3000 via its cellular radio (2983, FIG. 29). Data can be relayed from the BT radiotags in the group (that lack a cellular radio) to a cloud host 58, and conversely, the cloud host can send data, commands or program updates to the Bluetooth radiotags via the XCB radiotag 2800. The server/host 58 will look up the identifiers of the BT radio units in group 3100 and access a user profile in its databases 59,60 before generating commands or notifications. Thus the XCB radiotag can complement or replace a smartphone in monitoring radiotag groups.

In one instance, the XCB radiotag 2800 monitors traffic from each of the BT radiotags and compares the radio unit identifiers with a whitelist. Any loss of contact with one of the units of the group is reported to the cloud host 58 and can result in an alert to an owner of the radiotag group 3020, for example.

Figure 30B:
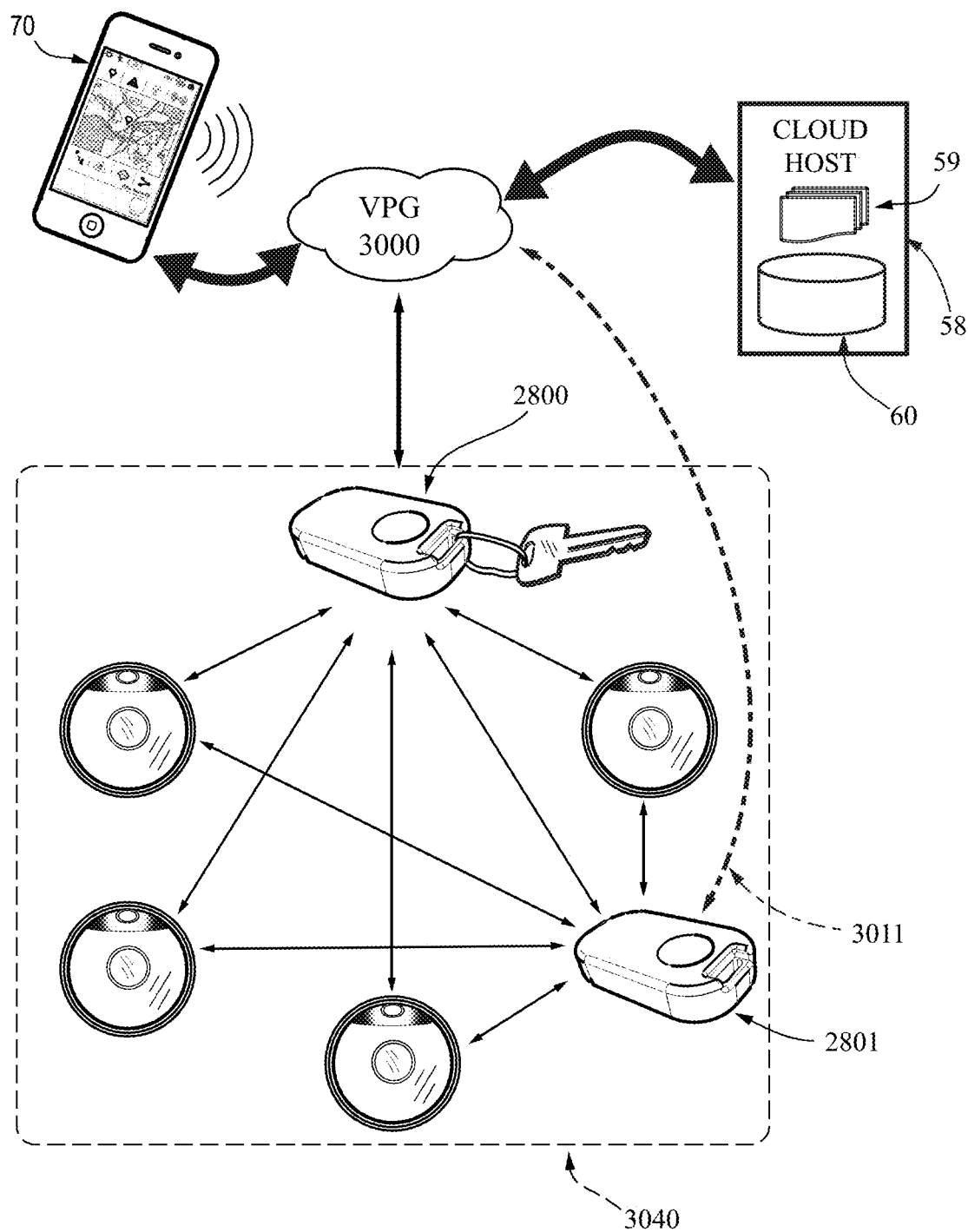

FIG. 30B is a view of an XCB radiotag 2800 as a monitor for a second group 3040 of BT radiotags that includes a second XCB radiotag 2801. The lead XCB radiotag 2800 is enabled to directly connect 3001 with a virtual private gateway 3000 via its cellular radio (FIG. 29). Data can be relayed from the Bluetooth radiotags to a cloud host, and conversely, the cloud host can send data, commands or program updates to the Bluetooth radiotags via the XCB radiotag 2800. The second XCB radiotag 2801 provides a level of redundancy and has the capacity to also directly connect 3011 via a cellular uplink to the server/host 58. Both XCB devices can monitor radio links to other tracking devices in the group and can forward commands as needed. If battery power in a first XCB device is depleted, the second XCB device can take over management of the piconet.

Figure 31:
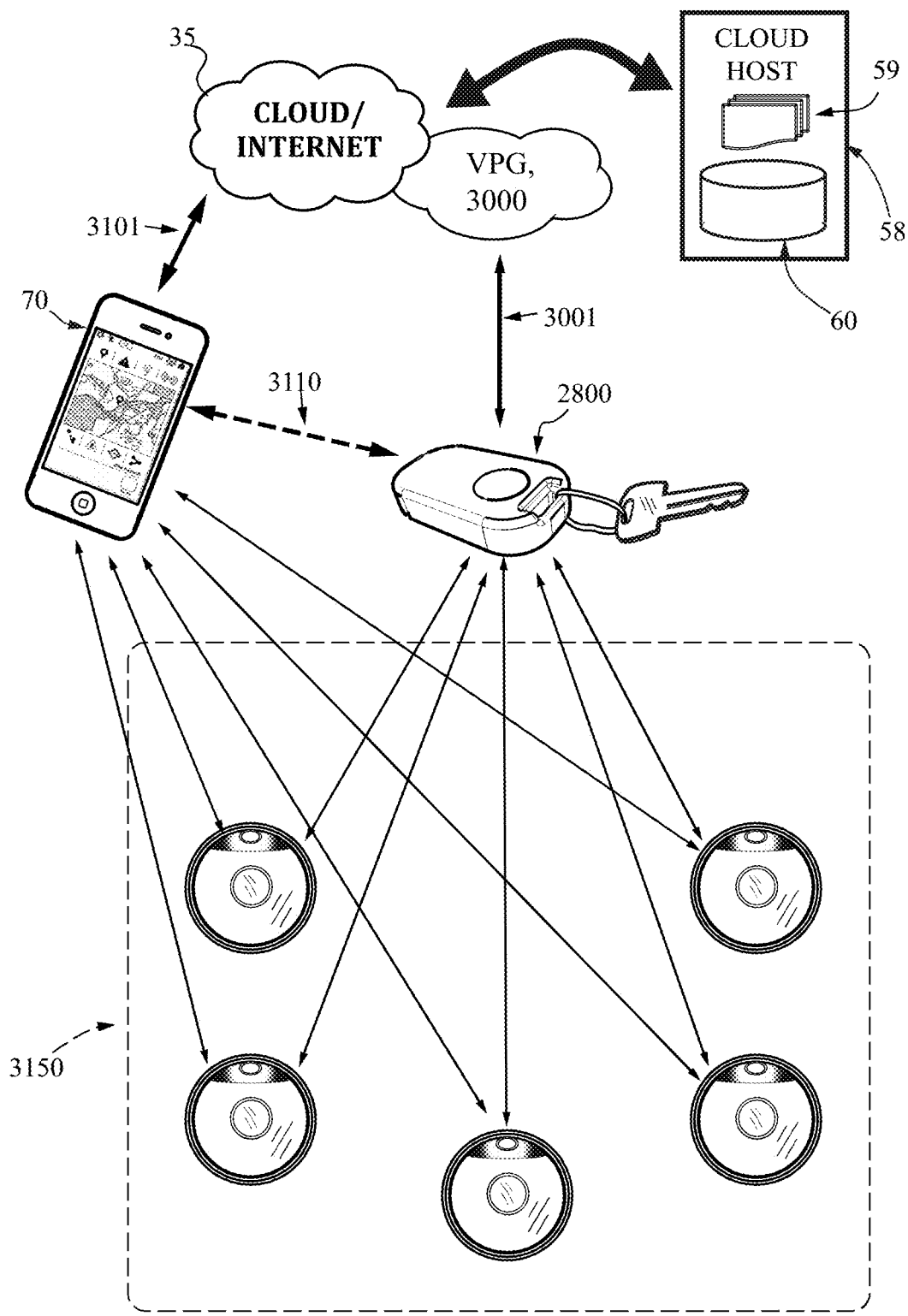
FIG. 31 is a view of a system in which an XCB radiotag serves as an alternate link between a group of BT radiotags and a cloud host.

FIG. 31 is a view of a system in which an XCB radiotag 2800 serves as an alternate link between a group of BT radiotags and a cloud host. The BT radios of radiotags can pair with or can advertise to either a smartphone 70 or the XCB radiotag 2800. Both the smartphone 70 and the XCB radiotags 2800 can report information to a cloud host 58 and can receive instructions or notifications from the cloud host 58. Both are networkable on a cellular network and both have BT radios and can detect other BT radios. XCB radiotags do not generally have the touch-sensitive display screen that is characteristic of smartphones and are not generally equipped to enable the user to display a user interface and to customize a user profile and conditional rules in a cloud host database 59,60. However, in other respects XCB devices have some of the characteristics of a "smart device" and include a SIM card and programming for operation as part of a cellular network and system for lost-and-found tracking of radiotagged assets, and hence are "tracking devices" or "radiotags" having cellular network connectivity for greater power in providing location and tracking services.

XCB radiotag 2800 links directly 3001 with the server/host 58 via a virtual private gateway 3000 that is operated to reduce unwanted cellular messaging that would otherwise drain the battery of the radiotag. The management of the group 3150 can be handed off to a smartphone 70 as needed, and the smartphone may communicate with the host server 58 via a conventional cellular link 3101 managed by a telecommunications company. The smartphone and XCB radiotag can also be in communication, generally through a BT radio link 3110 but in some instances the link between the two cellular devices can be routed through the VPG or through the telecomm network for exchanging M2M data, or as a virtual "walkie-talkie". While the current generation of XCB radiotags are not built to support voice communications, future versions may include cellular voice messaging in duplex or partial duplex connections.

Figure 32A:
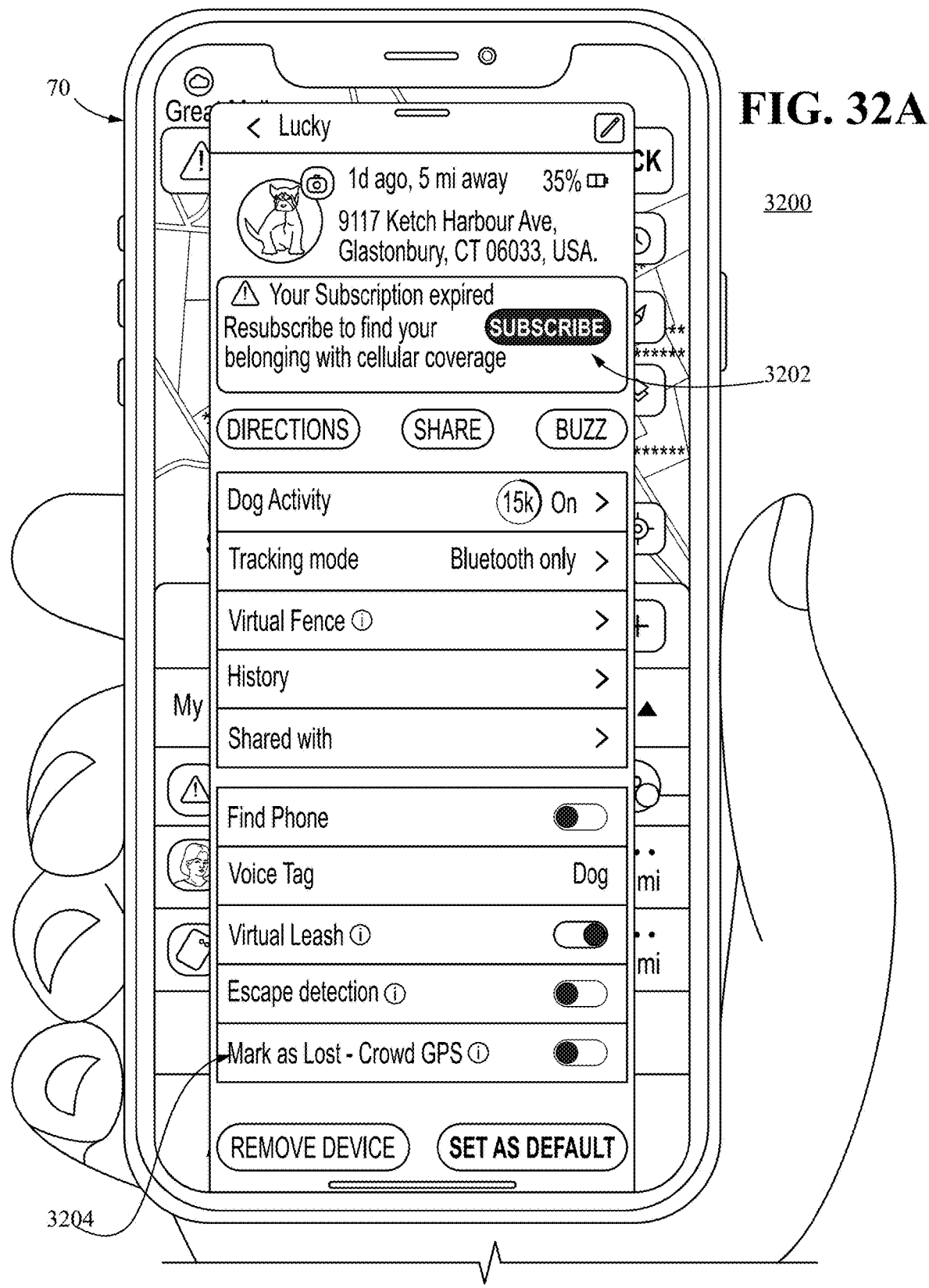
FIG. 32A is a screenshot showing exemplary services available using systems with tracking devices.

Smartphone 70 is used extensively in setup of the XCB radiotag and the BT radiotag group, and is also used in receiving owner notifications. An exemplary screenshot is shown in FIG. 32A.

The cloud host 58 and supporting databases 59,60 are used to provide subscription lost-and-found services. FIG. 32A is a screenshot 3200 that indicates exemplary pet-related subscription services 3202 that may be available, which can include biometrics telemetry from a mammal to which the radiotag is secured, real time tracking, establishment of safe zones enforced by radio tethers, tracking history, extrapolation of destination, detection of an escape from a geofenced area, community-supported lost asset recovery, voice interaction services, and a handy FIND PHONE utility that lets the actuation switch 2815 on the radiotag cause the owner's smartphone 70 to ring so that it can be quickly located if misplaced in the house.

For pet-related services, the XCB radiotag is attached to the pet by a collar, for example. Similar services can be provided for lost children or for physical assets in need of radio tracking. For example, services may include directions to find a lost pet, a sharing button that lets the user share the radiotag signal with friends and family, and a BUZZ button that causes a piezo speaker in the radiotag to vibrate or buzz audibly as an aid in searching at close quarters. Provision for a voice interface may also be offered. And a LOST PET alert (3204, Cloud GPS) can be posted with the cloud host so that any compatible device that encounters the radio unit identifier or MAC address of the lost radiotag will trigger a notification to the owner. Further descriptive material is found in U.S. patent application Ser. No. 16/575,315, titled "Hybrid Cellular Bluetooth Tracking Devices, Methods and Systems".

Several levels of tracking services may be provided, each with a different expected battery life on a single charge. These are estimates based on balanced radio usage and latency for the cellular and/or BT radio modems. The "Dynamic Tracking" mode, which updates location at a central server every 30 to 90 minutes, is recommended for most routine use, but in the event of a lost smart object, the devices can be upgraded to uplink data every 4-8 min in an "Emergency Tracking" mode. Lower power tracking provides updates every 4-6 hours, and for maximum battery life (up to 1 year), a BT only tracking regimen is supplied. Each of the cellular plans is associated with radio parameters for EDRX and PSM, and can be modified anytime the radiotag opens a cellular network connection in a paging window, or is in BT communication with a community smart device (72, FIG. 37) having a network connection to cloud host 58. As described earlier, the BT radio and sensor package, including motion and heading sensors, can trigger a CALL HOME during which the power savings parameters can be reset. Also, biometric data can be linked to a CALL HOME. The actuator button 2815 can also cause a cellular connection to be initiated, or a tap by an NFC-enabled smartphone will actuate a network connection. The virtual fence established location coordinates around a pet so that if the pet goes past the fence, an alert is sent to the owner. The virtual leash moves with the control apparatus 70 and establishes a radio proximity leash that if broken, results in an alert to the owner and optionally an audible warning to the pet or child. Other features include a history of locations and an activity tracking log.

Figure 32B:
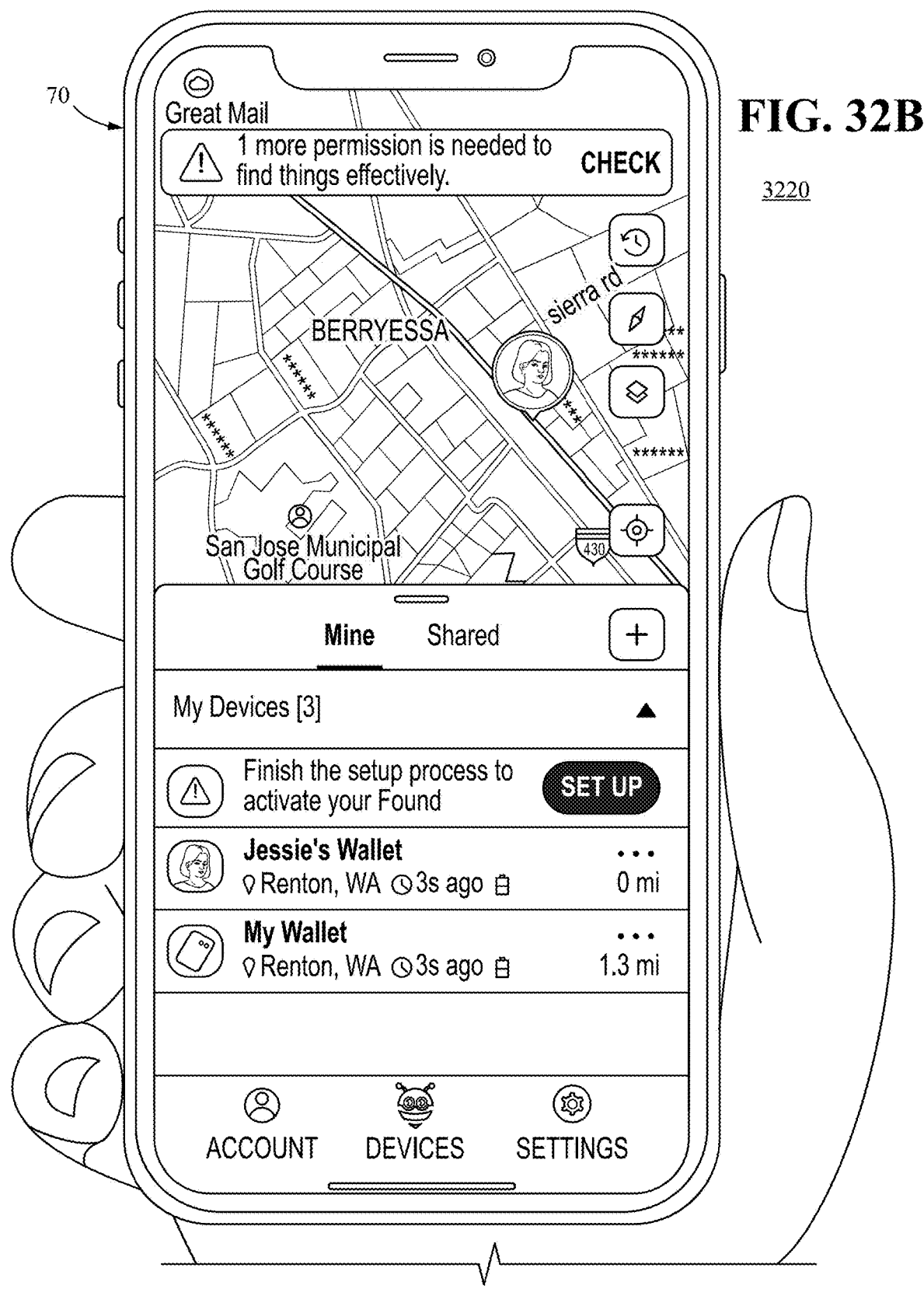
FIG. 32B provides a screenshot of a tracking program in operation on a smartphone as part of a lost-and-found system.

FIG. 32B provides a screenshot 3220 of the tracking program in operation on a smartphone 70, and can show the location of one or more XCB radiotags on a map of a city. By using a combination of BT and cellular, very large areas of the planet can be scanned for a missing radiotag and the precise position pinpointed and displayed on a map, with the capacity to scale in and get directions for recovering the lost smart object and for other subscription services that are administered by a cloud server 58 as part of the lost-and-found system.

The XCB radiotag can also provide location information relative to other BT radiotags of a group that are in BT radio proximity. The XCB radiotag need not be an attachable device, but in some instances may be embedded directly in a smart object and receive power from the smart object.

Figure 33:
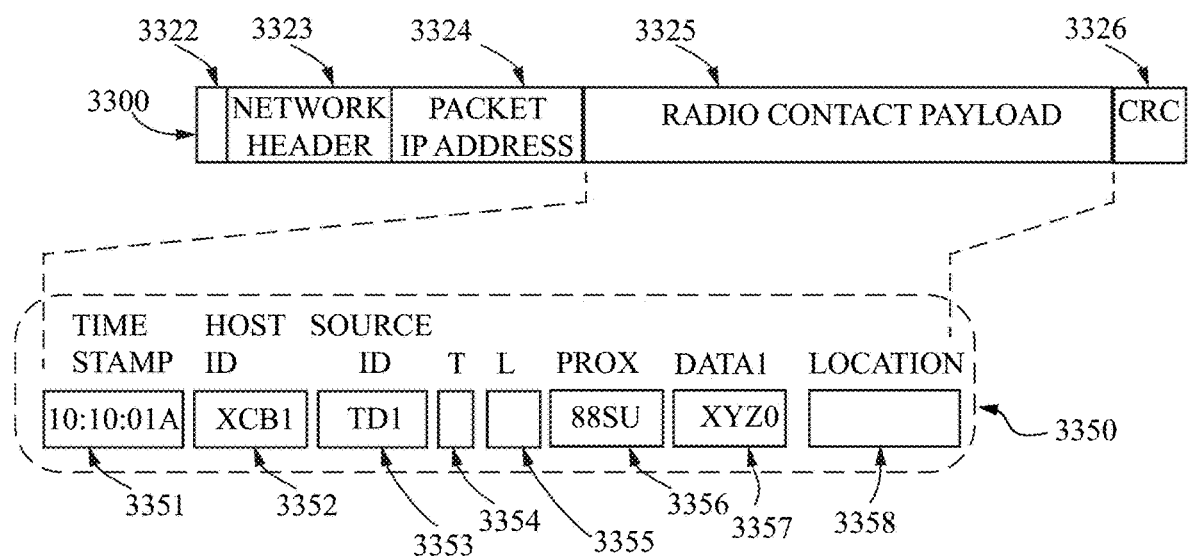
FIG. 33 is a view of an IP packet data message containing radio contact information.

FIG. 33 is a view of a message structure 3300 containing radio contact information that is relayed via a cellular network connection from an XCB radiotag to a cloud host as IP packet data (such as can be carried over a cellular network connection). A WiFi message is similar. In this instance, these packets are encoded in a packet compiler within the XCB radiotag and transmitted by the cellular radio. The payload consists of a radio contact log record having the details (termed here "information", 3350) of a BT radio contact received by the XCB radiotag. The information may include a current location 3358 determined by GPS, AGPS, PoLTE or other network positioning. The IP data packet 3300 includes a preamble 3322, a header 3323, an IP packet address 3324 with MAC address of a host server that acts as a recipient or clearing house for the records, a payload 3325, and CRC 3326. In this example, the payload 3325 is a radio contact record, and includes a timestamp 3351, an ID of the host device 3352 that captured the radio contact record, an ID of the transmitting device 3353 that initiated the radio signal that was intercepted, message type 3354 and length 3355 statistics, a proximity indication 3356 that estimates the distance between the receiver and transmitter, any sensor data, UID, service characteristics or URL 3357 in the payload, and a location 3358 of the host device at the time the signal was intercepted.

Figure 34:
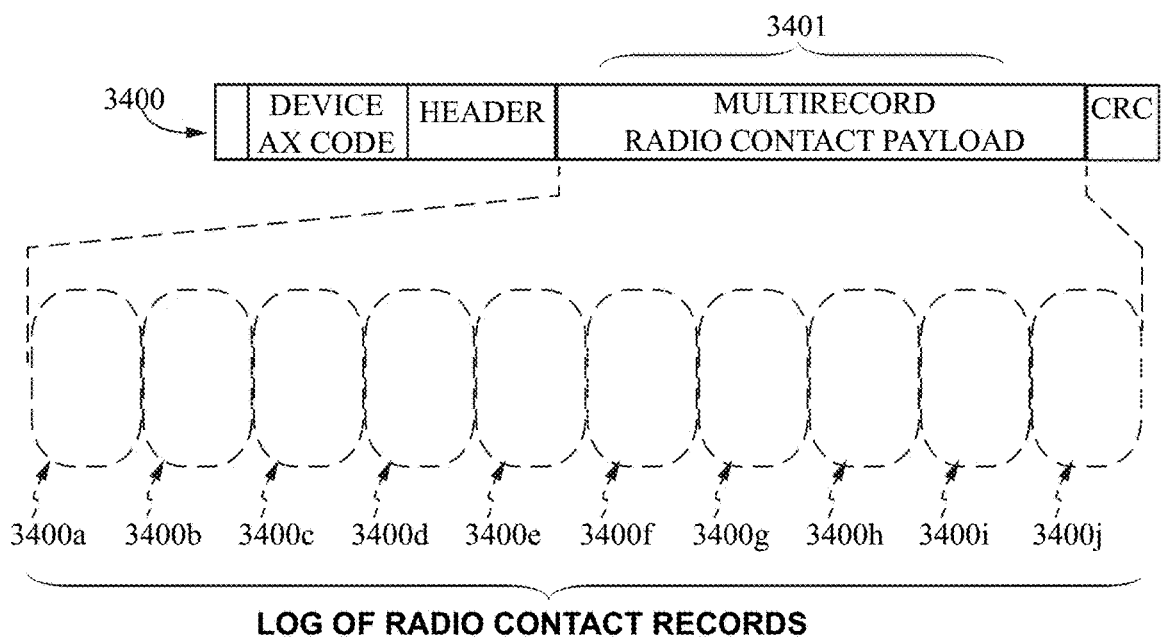
FIG. 34 shows a concatenated structure of a multi-record radio contact log useful in tracking a group of radiotags.

FIG. 34 shows a concatenated structure of a multi-record radio contact log useful in tracking a group of radiotags. This log is compared to the expected content of radio contacts for the group by a competent computing machine such as the cloud server, and any anomalies are the basis for a notification to an owner/user (such as a LEFT BEHIND alert as described earlier). The log of radio contacts can be compared to a whitelist, for example, or compared by homology matrix algebra to detect abnormal readings or absent readings from any of the reporting members of the group of tracking devices.

FIG. 34 makes clear that the IP data packet 3400 can be logged and transmitted across a cellular signal in an efficient and data intensive way by concatenating the radio contact reports. A multi-record radio contact payload 3401 is a log of or a "snapshot" of the radio traffic around the host XCB device for a slice of time. Shown here are ten log records 3401a, 3401b, 3401c, 3401d, 3401e, 3401f, 3401g, 3401h, 3401e, 3401j, of individual BT radio signals that were intercepted. The snapshot provides a real-time look at what kind of radio neighborhood surrounds the receiving device. The log will include members of a group that is being tracked if any, but also records of BT signals that are not included in the group membership. If the device is in a familiar home office, there will be the BT printers, the smartphone, the user's radiotags, perhaps a headset or a BT mouse, all expected members of the radio ensemble that is characteristic of that home location. The unique radio identifiers of each device are combined to form a signature that indicates familiar surroundings and defines a "safe zone". When the user leaves the front door, some of those radio identifiers accompany him, and are picked up on the next radio snapshot. Further form home, an increasingly alien radio environment is encountered. Each radio snapshot on a journey contains information that informs the relative familiarity or strangeness of the surroundings.

FIG. 35 is a view of a rolling memory stack containing radio contact records. In this model, a continuous rolling stack of BT radio contact snapshots is taken. Anomalies in the data are detected by machine learning and probabilities associated with predictable outcomes are used to design interventions. Data is acquired at intervals by periodic listening on BT radio channels. The minimal latency in detecting anomalies and rapid identification of some lost asset issues results in a significant uptick in consumer confidence in the lost-and-found system. Old data is archived by the administrative server for use in building models for machine learning and is then discarded so that the memory resources inside the XCB radiotag are not overloaded. Over time, a consensus "memory record" of the expected BT topology of a place (or places) is stored in memory of the XCB device or host server and any new radio snapshot can be accessed to determine whether the device is where it is supposed to be. Ultimately, this approach yields a system that can predict a device is lost before the owner knows it is lost.

The system 3700 can also use the radio contact logs to "guess" locations of lost items. Each time the radio tracker associated with a lost item is detected, another location datapoint becomes accessible in a cloud database 59,60. Each XCB radiotag and smartphone serves a community of users, and the data achieves a granularity that allows a user to view the approximate position of a lost object on a map essentially as shown in FIG. 12.

Figure 36:
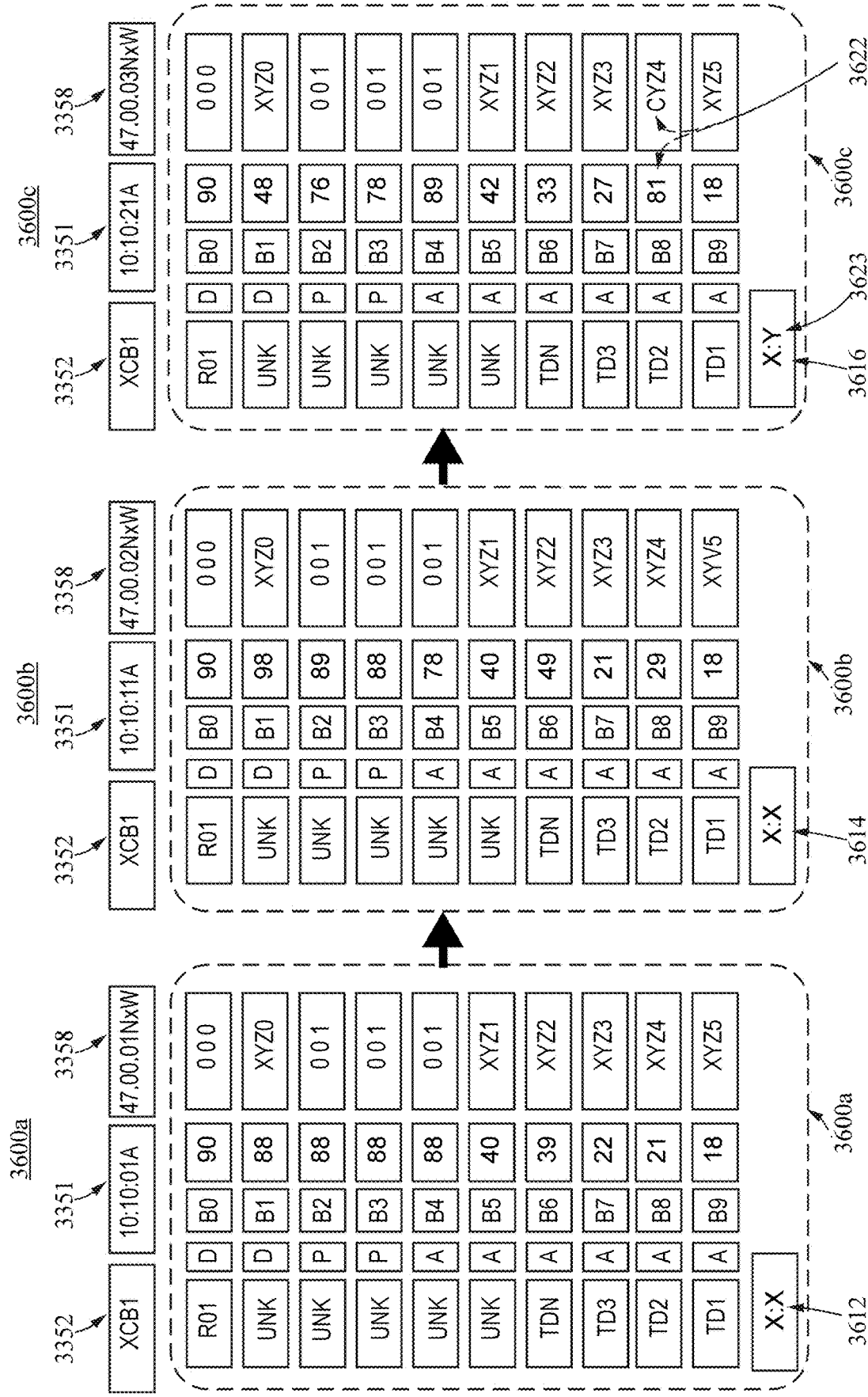
FIG. 36 is a view of a relational database for managing sequential snapshots of radio contacts.

FIG. 36 is a view of a relational database for managing sequential snapshots of radio contacts. The series of three radio envelope snapshots 3600a, 3600b, 3600c (bold arrows represent a time series) are each taken by intercepting radio traffic in BT advertising and data channels for a designated interval of time. Passive listening is used so as to not consume more battery power by generating back-and-forth radio messages. Each message includes the HOST ID 3352 of the XCB device collecting the snapshot, a timestamp 3351, and a geostamp 3358. In this instance the top ten BT signals (based on RSSI for example) intercepted at a moment of time are captured in each snapshot. A rolling stack with registers for this purpose is illustrated in FIG. 35. Each dashed box 3601a,3601b,3601c contains a table with five columns corresponding to the transmitter identification, the type of message, a length of the message, RSSI, and any data content in the message as captured in each of the radio contacts. Each radio contact occupies one row in the table.

At the bottom of each snapshot, a "familiarity ratio" 3712,3714,3716 is calculated that accounts for the signals of group members as a numerator over a denominator of the background BT radio traffic signals in a snapshot. The familiarity ratio may take fixed transceivers into account, scoring device signatures that typically remain in a safe zone differently from device signatures that always accompany the owner. Alternatively, a homology matrix may be used to make the calculations. A "strangeness index" can also be provided that accounts for irregular or unexpected BT signatures associated with a location. By quickly recognizing the pattern of familiar and unfamiliar BT transmissions in a location, the XCB device can quickly autoprovision a kit list of what to keep track of, infer actions to be taken if there is an exception, and also note the overall characteristic of the location as a mélange of BT radio traffic so that in the future, when that pattern is again detected, the device can know where it is. In this way, the XCB device can know something is lost before the owner does, can guide the owner to a lost device, and can also know where it is without the need for GPS, AGPS, PoLTE, or other advanced, energy intensive location acquisition means.

Referring to FIG. 36, the combination of a sudden decrease in proximity and a vectored impact in the data columns at 3622 (arrows) is manifested in a summary indication 3623 that one of the radiotags has been left behind. This inference is made by the XCB device and is communicated to the owner directly or via smartphone 70. The XCB device performs the analysis autonomously. By comparing the logs of multiple radio devices, a consensus emerges and the "left behind" or "lost" alert can be issued instantly while the owner is still well positioned to backtrack and recover the lost radiotag. Alternatively confirmation is obtained if XCB radiotag (host, 3352) shares the log snapshots with a system server 58, but the cost is increased latency. To speed up the analysis, the smart XCB radiotag is built with sufficient memory and processing power to handle local processing of basic homology comparisons on the fly.

For a basic level of group tracking, the XCB radiotag can be provided with a stack of registers sufficient to store a whitelist of tracking device group members and to take periodic snapshots of the BT radio traffic received from the group members. The snapshots can be compared with data stored for established "safe zones". A change in background radio traffic can be detected with a latency dependent on the snapshot rate, an advance in the art over smartphone-mediated "virtual radio leashes", which may be inactive for ten minutes or more because of constraints imposed by the operating system and may not be flagged unless a signal is lost entirely.

Figure 37:
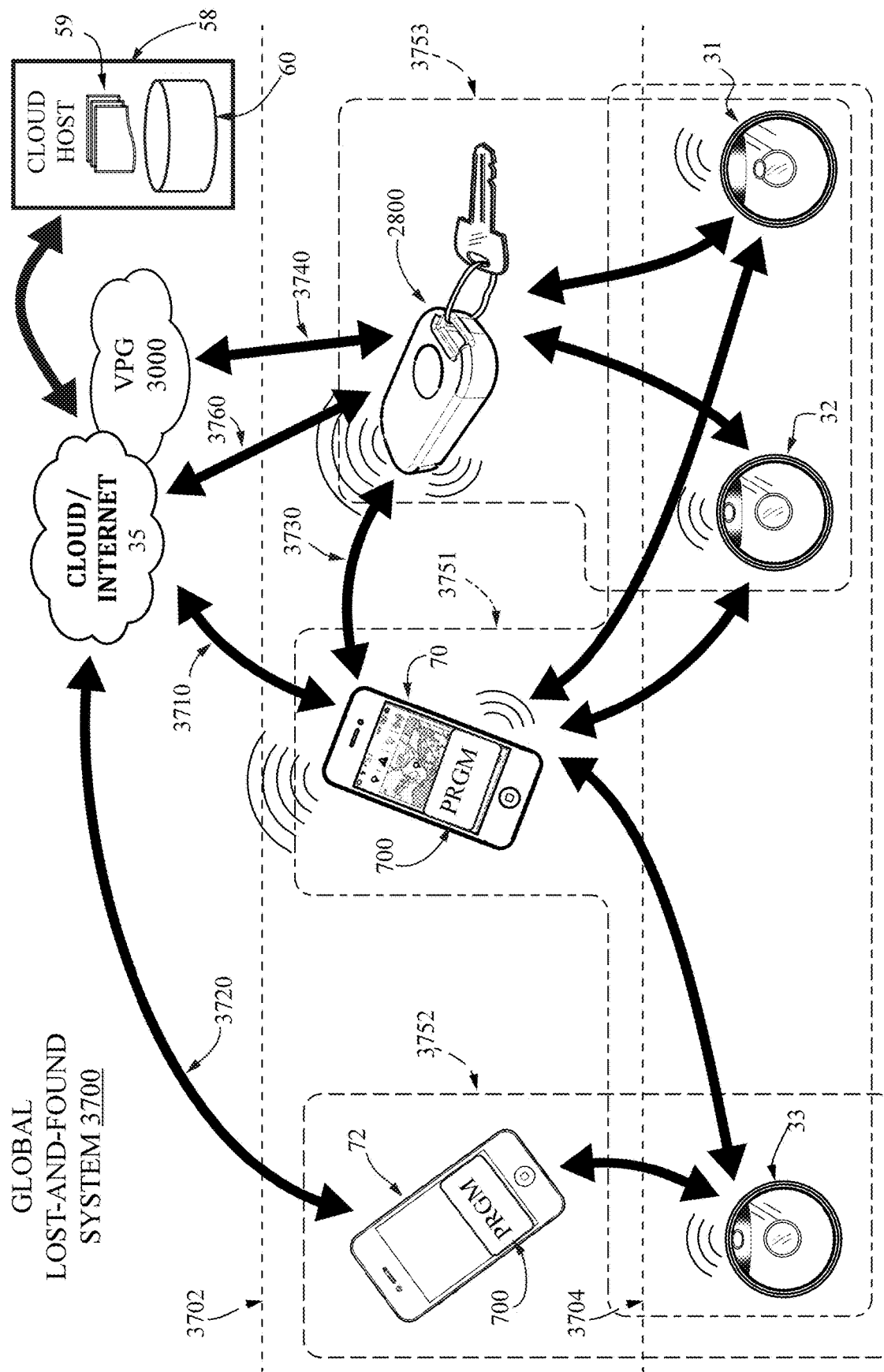
FIG. 37 is an overview of system that includes a community of users, and is intended to show the basic concepts of "cloud shortcutting".

FIG. 37 is an overview of system 3700 that includes a community of users, and is intended to show the basic concepts of "cloud shortcutting". At the top of the network (above dashed line 3702) are found the cloud hosts, servers and fixed network hardware of the backbone of a global network. The cloud/internet 35 is an IP packet date environment consisting of wired and wireless devices that make up a Global Area Network (GAN). The GAN may also include Virtual Private Gateways (VPG, 3000) that define private IP channels carved out from the Internet. The cloud/internet and VPGs interface with servers (represented by server 58) that define "cloud hosts". In this instance, the cloud host 58 is a dedicated administrative host for operating a global lost-and-found system 3700. Multiple servers may be used to administer the system. As part of system 3700, cloud host 58 includes databases 59,60 and is linked to network resources that maintain user profiles and track tracking device locations as was described with reference to FIG. 6 above.

Below dashed line 3702 and above dashed line 3704 are found portable devices that make up the cellular and WiFi layer of current network architecture. Implicit in this structure are the base stations of the telecomm companies, Starlink satellites, and portals of cable companies that route traffic between users and cloud resources, and so forth. Below dashed line 3704 are found portable devices with limited broadcast range, such as the BT tracking devices 31,32,33 shown here. In 5G, this layer is expanded to include fixed installations of other kinds of radio devices that operate in allocated 2.4 GHz, 5 GHz, 6-7 GHz, 11 GHz and 28 GHz bands, for example.

Information in signals from devices 31,32,33 can be relayed to the cloud layer by use of intermediary devices 70,72,2800, which have both BT and cellular transceivers. As presently practiced, cellular and WiFi make up the bulk of the bandwidth available for moving information and commands between the bottom wireless device layer and the cloud host layer. However, rapid expansion of 5G alternatives and the Internet of Things is expected in this decade. As more 5G bandwidth is deployed, additional device types will become available, but the principles outlined here will remain by which a network having multiple radio types is established that links the cloud to local devices.

As a first illustration, devices 31,32,33 can be considered as a group (box 3751), representing devices owned by a common owner. Bold arrows indicate wireless information links. Link 3710 connects the owner's smartphone 70 with the cloud host 58 via a cellular telephone network (or WiFi hotspot). Bluetooth radio data is not directly compatible with the cellular link 3710. The smartphone 70 includes an application 700 that reads BT data packets and forwards relevant information to the cloud host, and may also send or relay commands to the BT devices 31,32,33.

In advertising mode, each BT tracking device 31,32,33 uses its core BT transceiver (21, FIG. 2A) to broadcast a periodic beacon signal with information including the identity of the tracking device and also including any information from onboard sensors of the respective tracking devices. A sample of a signal "payload" that includes "information" 2750 such as sensor data, radio identifiers, battery reserve, transmission power, and piconet status, for example, is shown in FIG. 27. The BT beacon signals have a range dependent on transmission power, but the range can be 100 ft to 100 yards, for example.

The BT device 31,32,33 transmissions may be monitored by the smartphone 70 on a regular basis. The smartphone (with an installed application 100,300,700) will typically add a timestamp to a received transmission and may also add a geostamp before forwarding any relevant information to the cloud host. In this way, the system is able to track the BT devices 31,32,33.

If the smartphone 70 loses track of BT device 33, the system will rely on a community smart device 72 (box 3752) to report a location where the lost device was detected. Community smart device 72 includes a BT radio and is enabled to listen for BT radio traffic and to parse out the radio unit identifier of BT device 33, using an installed program 700. When in radio proximity, community smart device 72 will receive the beacon broadcast from the BT tracking device 33 and can relay the information in a transmission 3720 to the designated host 58, and the transmission 3730 can include a (GPS or network-assisted) location of the smart device 72 when the radio contact is made. The smart device 72 does not need permission from the owner of the tracking devices 31,32,33 to receive and forward the radio unit identity and any sensor information broadcast by device 33. As long as the control program 700 for tracking device 72 is running, the beacon signal from any of the tracking devices 31,32,33 will be received and processed. The control apparatus 72 can act on the information in the signal or can forward the signal to the cloud host 58. Generally, device 72 will add a timestamp and a location stamp. The smart device may also add other information (such as sensor output from sensors onboard the smart device) to a "record" of the radio contact with the tracking device before forwarding the record to the cloud host. The retransmission of beacon information received from BT device 33 by smart device 72 imposes no hardship on the community member because each smart device regularly transmits a signal and data to the cellular network as part of maintaining a network connection. The forwarding of data can be handled in background as described in U.S. Pat. Nos. 9,774,410, 9,900,119, 10063331, 10371800, 10389459 and 10937286, which are co-owned at the time of filing and are incorporated in full by reference for all their teachings. The forwarding of beacon signals may occur even if device 33 is not reported as lost by the owner. When the information is received, the cloud host will look up records associated with the radio unit identifier of device 33, determine the owner, determine whether the device is reported as lost, and if flagged as lost in a database 59,60, then will notify the owner and assist in recovery of the lost device. The notification to the owner may include an option to display a map showing the approximate location of the lost device (for example as described in reference to FIG. 12). The system will also aggregate multiple reports of radio contacts with the lost device and can present those as a consensus location if the device is stationary, or a trail of waypoints if the device is on the move.

Smartphone 70 may also be enabled to track XCB device 2800 using a BT radio link 3730, but beyond the limited range of the BT radios, the system will rely on the cellular radio of the XCB device 3730 for periodic location reports. If the smartphone 70 loses track of the XCB device, the system will still receive periodic location data via cellular link 3740 because the XCB device is programmable to make an autonomous cellular network connection.

In fact, XCB device 2800 is able to manage a group (box 3753) without smartphone 70. In this instance, the group consists of devices 31,32 and 2800 under common ownership and reporting to the cloud host 58 via links 3740 or 3760. The cloud host 58 tracks not only the BT tracking devices 31,32 but also cellular XCB radiotags 2800. The XCB radio tag is able to report location independently using one or more location services selected from GPS, AGPS, PoLTE, and so forth. The XCB radiotag 2800 is locatable both by its BT beacon signal, but also by its cellular network connection in a cellular network. As long as BT radio contact is maintained within the group 3753, the approximate location of the three devices is known to the system. If the XCB device 2800 is forwarding information to the cloud host from the BT devices 31,32, and that information includes motion sensor output, then the system can monitor the relative motion of the devices, and infer a left behind or a lost condition from the data even before radio contact is lost.

Groups 3751 and 3753 may be permitted to co-exist. A bonding relationship between the smartphone 70 and BT devices 31,32,33 is carried in the memory of the BT devices (as peripherals) and the smartphone (as central). The program 700 operated by the smartphone permits sharing of BT devices with others, but in some coding scenarios, the access codes may be changed if the BT devices have already been "claimed" by smartphone 70. A flag may be inserted in the broadcast of the BT device that marks it as a claimed device and limits its discoverability. However, the BT SIG standard does permit BT devices to participate in two or more piconets using time-division multiplexing, so groups represented by boxes 3751 and 3753 can be formed and operate independently if coded to operate as separate groups.

For example, using BT radio, XCB radiotag 2800 may monitor BT devices 31,32, while smartphone 70 monitors the XCB radiotag 2800 and device 33. Interestingly, in this model, smartphone 72 may be granted privileges at the cloud level to send commands to BT devices 31,32 via XCB radiotag 2800 if smartphone 72 is operated by a friend or associate who works with the owner of smartphone 70. As conventionally deployed, the BT devices will change their access codes once they have bonded to an owner's control apparatus 70 and will not be detectable by passersby, but when that bonded link is broken, the devices will again begin transmitting a general advertising beacon signal with access code GIAC that can be detected by smart device 72. Using a multi-threaded processor, the firmware of the device 2800 and the program 700 may be modified so that bonding in one piconet does not limit advertising or even participating in another piconet.

At another level, all of the devices 70,72, and 2800 may be operated (i.e., may be programmed) to sweep up BT radio contacts and report them to the cloud host 58. The XCB radiotag, as it moves through a workday, may encounter and report a series of radio contacts with devices having the signature characteristic that marks the devices for reporting to the cloud host. While not shown, tracking devices owned by other community members, and any radio signals of other BT devices such as printers and home accessories, will be included in these sweeps. Thus the net effect of deployment of the system is to convert the middle layer of the diagram, between dashed lines 3702 and 3704 into a large machine for scanning, detecting and reporting BT radio units. These radio contacts are reported via the cellular links 3710,3720, 3740,3760, but radio contact information can also be transferred laterally as BT packet data, for example via link 3730, from the XCB radiotags to their more powerful cousins, control apparatus 70 and (if permitted) smartphone 72. In some instances, the system will rely on location data generated by the community smartphone 72 or the owner's smartphone 70, but the XCB radiotag 2800 may also generate an autonomous location fix, so has greater value as a tracking device.

As a clarification of XCB device 2800, cellular network connectivity, network links 3740 and 3760 may be operated as cellular links in which link 3740 is managed by a VPG 3000 and link 3760 is managed by a conventional telecomm utility through a cellular base station, satellite link, or WiFi hotspot, for example. The VPG establishes an IP address for XCB device 2800 and will send a packet that includes an instruction to wake up the cellular modem (2983, FIG. 29) when needed, for example, as part of power management. The VPG can also receive location updates via the private IP address. But link 3760, once the cellular modem is active, can be used for general uplinks of data and downlinks of commands.

Use of a cellular radiotag 2800 for tracking services offers new opportunities. Tracking devices 31,32,33 and XCB radiotag 2800 may define a "group" having four members. The XCB radiotag 2800 has the capacity to report its current location both to the host server 58 via cellular or directly to the owner's smartphone (via link 3730) via BT radio, and to monitor the radio proximity (and hence the approximate locations) of the remaining radiotags 31,32,33 of the group. When cellular is used, use of a virtual private gateway (VPG, 3000) in making these location reports ensures privacy and also dramatically cuts the energy budget for cellular connectivity. As compared to the telecommunications link 3710 to smartphone 70, a significant amount of power consumption for network traffic, much of which is clutter, is eliminated. Use of a VPG reduces this traffic substantially.

By adding processing power to the XCB radiotags, network traffic can be further reduced. Local processing of received sensor data from the members of the group permits some inferences about group cohesion to be made locally, either by the XCB radiotag 2800 or by the smartphone 70. Similarly, an XCB radiotag can detect BT devices that define "safe zones" such as a home printer or smart device with a fixed location that broadcasts a BT beacon signal, and by storing these device signatures in memory, can turn off or throttle down the cellular modem when the radiotag is in the safe zone. Conversely, an XCB radiotag that leaves the safe zone, for example a radiotag on a dog's collar when the dog jumps the backyard fence, can infer from the loss of the familiar BT signature signal that it is no longer in the safe zone, and can activate its cellular modem to report its motion and location. Thus an XCB radiotag can become a "smart device" capable of programming to make autonomous decisions about if and when to connect to the network using the more power-intensive cellular modem.

At a system level, using data forwarded to the cloud, the host server 58 can assess radio proximity as measured by BT radio signal strength or heading data and can issue an alert if the signal strength or heading direction is not copacetic between any two tracking devices, as would occur if the devices are not moving with the same direction or speed. Accelerometric data is useful for this purpose, but heading sensor output from an integrated sensor package that corrects the heading output for tumbling and random motion by use of solid state gyroscopic and magnetic compass sensor output refines the capacity of the system to detect motion anomalies that are correlated with divergence of members of the group from the owner's path, for example. Heading sensors are increasingly integrated packages that output a true heading after compensating for any tumbling or rotational motions with limited power consumption.

Links 3710, 3720, 3730, 3740 and 3760 may also be used to send or relay commands from the owner or the host server to any of the intermediate devices 70,72,2800 and tracking devices 31,32,33. In some instances, the commands are relayed over BT radio signals, and in other instances the commands are relayed over cellular signals. WiFi radios and UWB radios may also be used to share data and commands.

Snapshots of radio contact data shared in a group or shared with the cloud host may be used to generate notifications or commands to a smartphone or to a remote machine for execution. Conditional logic is used to pair a trigger signal in the received information with a command or notification to be executed. And using the user interface provided on a control apparatus 70, the executables may be programmable by users. Shared devices may be programmed to perform different actions by different users, for example.

Because the owner's handset 70 has a BT radio transceiver, it can transmit commands directly to any of the BT tracking devices to which it is linked. Similarly, the XCB radiotag can generate commands or relay commands to the BT tracking devices to which it is linked. In one useful application, a button press on the XCB radiotag can cause a location of the XCB radiotag to be archived on a server database associated with the user's account. This location can be accessed by the user's smartphone and displayed on a map if there is a need, for example, a need to return to the spot where a car is parked. A button press on one of the tracking devices can cause an alarm tone to sound on the owner's smartphone if misplaced, and conversely, the owner's smartphone can cause an alarm tone to be generated on a tracking device as an aid in finding a missing device when in BT radio proximity.

An advantage of including a cellular modem (2983, FIG. 29) is that the range of cellular connectivity is unlimited where cellular coverage is available, so the finding of missing devices that have been tagged by one of the cellular-enabled tracking devices or radiotags of the invention extends to become a global lost-and-found system 3700 by use of these radiotags.

An "app" installed on smartphone 70 is used to set up the group of tracking devices 31,32,33 and also to set up XCB radiotag 2800, which has a limited user interface. Once the group is defined, the XCB radiotag can monitor and report on the group location and the cloud host can send relevant alerts and notifications to the owner via smartphone 70 as described above with reference to FIGS. 11,12 and FIGS. 32A,32B (in which screenshots of a user interface are shown) for example. In some embodiments, the app may be upgraded using OTA (over-the-air) methods. Similarly, an image update of firmware in any of the tracking devices 31,32,33 or XCB radiotags 2800 can be downloaded into the devices using OTA methods.

XCB radiotags 2800 can also be used as a standalone radio tracker when not part of a group. For example, it may be desirable to attach one to a pet or to a child's backpack or coat. The XCB radiotag can be programmed to periodically CALL HOME using a cellular connection with a virtual private gateway. The radiotag will report current location, and the server will maintain an archive of chronological location data so that the pet or child can be tracked if needed.

While preferred embodiments of the invention have been shown and described, modifications and variations may be made thereto by those of ordinary skill in the art without departing from the spirit and scope of the present invention. In addition, it should be understood that aspects of the various embodiments may be interchanged either in whole or in part. Furthermore, those of ordinary skill in the art will appreciate that the foregoing description is by way of example only, and is not intended to limit the invention, except as further described in the appended claims. Those skilled in the art will understand that other and equivalent components and steps may be used to achieve substantially the same results in substantially the same way as described and claimed.

Example I

Finding and Tracking of Groups of Tagged Objects: The user may find that several individual objects are actually part of a cluster or "group" that he needs to keep track of together so that no one or two of the objects of the group is misplaced or left behind. By tagging a set of individual objects that he wishes to track, the Finding and Tracking subroutines and user interfaces can be simplified and the alerts become more self-explanatory. Thus as a matter of efficiency, the application can be modified so that a single control surface allows the user to set up a rule such that all the radiotags in a group are treated as group-wise on a single screen on the control device. A name can be given to each group of objects that the user identifies. If there is an object in a group that is missing or moving in the wrong direction, an alarm in the user's smart device will indicate which group and which object of the group is not sending the nominal expected data. The user can then use a single interface to cause an alarm in the radiotag attached to the errant object, while not causing an alarm in other members of the group that are all accounted for. Another working example is illustrated in FIGS. 16-17.

If multiple objects are not sending nominal data, then the user is provided with a list and an icon for each of the objects that have lost their place. The user can then activate an alarm in the attached radiotag, starting with a first object and moving down the list until all the objects have been recovered and the alarm condition ends.

In one instance, pressing a button on each radiotag will allow the user to silence an alarm for that radiotag, but not for any other radiotag. Alternatively, the mere act of picking up the object will provide the radiotag enough motion sensor information to inform the smart device that the object has been found.

Thus if a user has tagged a briefcase, a wallet, a keychain, a glasses case, and an umbrella, the alarm will specify which members of the group are not providing data consistent with a first rule, for example the umbrella, and after the umbrella is recovered, the alarm will end.

Using Bluetooth radio, up to seven objects can be tied into a master-slave relationship and the breaking of any radiolink results in an alarm. The master would be minding the radiolinks and would incorporate a flag in its broadcast that would notify the smart device. The Bluetooth master-slave comm protocol is sufficiently robust so that the individual links can be assigned to individual objects of the group (up to seven) and the alarms can be specifically associated with any one or more missing objects from the group.

Example II

Detecting "Left Behind" Assets using "Find and Track Group" Feature: Control program 300 with "find and track group" feature is installed in a control apparatus 70. The feature enables finding and tracking by radio proximity or by using a bell and light built into each tracking device 10, 2800. The program monitors accelerometer output on the control apparatus, and if sustained activity is detected that is consistent with movement that would result in a change in a user's location, the program causes the BT radio to verify radio contact with each of the items of the group and to interrogate the accelerometer of each member of the group. If any items in the group are not in motion, the program causes the screen of the control apparatus to display a menu list (FIG. 17) with a highlight on the items not in motion. The highlight indicates to the user that some items may be "left behind". If this is not what the user intended, the program will assist in locating the items. So for example, pressing button 408 on the display causes the tracking card in the wallet to sound a distinctive tone that can be cleared by pressing button 2302 on the card (FIG. 23) when the user finds the wallet in the pocket of the jacket worn yesterday. The program may also receive a weather forecast of pending rain, and may show a reminder to take the umbrella. All the items in the group are managed from a single screen, and the associated displays or actions are fully programmable. The program will receive sensor information and other information that the user can use as a "trigger condition" to cause the system to invoke an executable action or notification in the control apparatus, in a tracking device, or in a remote machine. The program can also monitor battery status of tracking devices in the group, and issue an alert if one or more of the items has a low battery. By "tracking device", both the BT tracking devices 10 and the XCB radiotags may be included as group members, and in some instances, the XCB radiotags can share management responsibility for monitoring the group and communicating any changes to the cloud host 58 or sending a notification to an owner's control apparatus 70, for example.

The program of the control apparatus is enabled to run a counter that integrates motion sensor or heading sensor output in a rolling window of time, and if there is sufficient motion to cause an expected relocation of the control apparatus, such as a smartphone, then the program will compare motion sensor output received from the members of the radiobeacon group, and flag any inconsistencies. The smartphone can beep or vibrate as a notification, and a screen is displayed that lists the members of the group and their relative motion(s). Permission is given to run the program in background. An override occurs if motion is copacetic, and the counter is reset if there is a period in which the smartphone is stationary.

The converse may also be enabled, whereby an increased motion sensor output from a member of the group of radiotags is inconsistent with a more stationary motion sensor output of an internal motion sensor in the control apparatus and if the motion sensor output of any one or more of the radiotags is consistent with motion that would result in a change in location of the radiotag, then the program will generate an alert on the control apparatus. The alert can be a vibration or a tone, and a display may include a listing of the radiotags and their motion status. The control apparatus may be caused to display a menu of actions if inconsistent motion sensor output any one or more members of the group is detected.

Similarly, the control apparatus may a menu for monitoring the relative motion sensor outputs of a group of radiotags on a single display screen so as to reduce loss of assets, children, and pets that have been radiotagged.

Example III

Nuisance Alert Suppression: An OS smart phone is left on a nightstand along with a keychain and any other tagged objects. Attached to the keychain is a Bluetooth radiotag. The radiotag will typically announce its presence every few seconds by sending a broadcast that includes its UUID, and any frames containing data, including a sensor data payload from one or more sensors in a sensor package installed in the radiotag, and normally the smart phone will parse the signal and collect the UUID and any other data in the signal.

Over the years we have found that many customers have false alerts while both the phone and the radiotag are motionless and next to each other. The alert indicates that the radiotag has gone out of radio range of the phone, even though the phone and the radiotagged object were both sitting side by side. Both phone and device were stationary, never moved, but the alert would still go off. This problem arises because the OS starts deactivating its Bluetooth radioset at random times to save battery. If the phone radioset has been turned off, beacon pings from the Bluetooth tracking device will be missed. This results in a false LEFT BEHIND or OUT OF RANGE alert from the processor in the phone.

A solution to the problem is to inactivate that part of the software application that generates an alert when contact with the radiotag is lost. This can be done temporarily and only takes effect as long as the phone does not move. If the phone is moved, it wakes up, the alerts are re-enabled, and the phone will recognize that the radiotag is where is supposed to be.

Clearly this fix raises the possibility that a phone having gone dormant and turned off its alert routines, will fail to note that the radiotag and the attached car keys, for example, are removed from the table. Consequentially, if the device itself is moved and actually did go out of range (i.e., it walked itself away), the alert will NOT go off. So, a more satisfying signal is to use motion sensor data from the radiotag and allow a positive motion signal in the broadcast to wake up the phone. If the device moves, it sends a signal to the phone that bypasses the disabled alert code, wakes up the phone, and triggers an alert based on the motion data. More specifically, the processor will see a discrepancy in motion data from the radiotag versus the smart phone and according to a rule, trigger an alert.

A second condition (or a third condition) may added to the rule set by the user in the local user profile. While inactive, the smart phone will do a rules-based interpretation of a signal containing accelerometry data from the radiotag as evidence of motion. When this happens, additional features of the smart phone will "wake up", so that an alert can be issued. Similarly, the hour of the day may be a sleep period or a holiday when the owner sleeps in, so the owner can elect to disable some alerts so as not to be disturbed.

In this way, having multiple sensor feeds from the radiotag in combination with multiple programmable conditions that can be layered onto the processing of radio signals from the tag allows the user to more fully become comfortable integrating these devices into his lifestyle. Similarly, multiple simultaneous or sequential sensor data conditions may be required to set off certain alerts or cause certain features to be actuated.

Example IV

Cloud Shortcutting: In some situations, it may be desirable to use "cloud shortcutting" to find a particular BT radiotag using a friend's smartphone, for example your car keys, when you want to loan them to someone else and are not there to hand them over. Necessary conditions are that (1) your smartphone is in BT radio proximity to the radiotag attached to the keys and that (2) you have "shared" the radiotag attached to your car keys with the friend (176, FIG. 9). When the friend opens the tracking program installed on their smartphone, the friend will have access to an icon (a software button) that represents that particular radiotag. By querying the system, the friend can see a map pin that shows the approximate last position of the car keys known to the system (as described in FIG. 12), but cannot directly command the radiotag to begin an audible tune while it is bonded to your smartphone. So instead the system assists. When the friend presses that icon on their smartphone, a command is sent to the cloud host 58, and the cloud host relays the command to your smartphone, causing your smartphone to transmit a BT signal to the radiotag, and commanding it to begin the audible tune. Your friend will hear the tune, and can follow the sound to its source, rather than searching everywhere. Once the radiotag is found, the friend can press the multifunction button (14*a*, FIG. 1A) on the radiotag to stop the tune, and the system can let you know that the car keys have been borrowed.

Example V

Virtual Safe Zones: An XCB radiotag 2800 is programmed to manage its cellular modem power consumption budget according to the location that it is in. In one embodiment, the radiotag scans the surroundings of its location and identifies the presence or absence of familiar BT radio signal(s). A familiar signal defines a "virtual safe zone". If a familiar radio signal is identified, the radiotag moves to a power savings mode. If the familiar radio signal is not detected in the scan, the radio tag moves to a cellular network connection state for periodically reporting its location to a cloud host. In this example, the owner of the radiotag uses a smartphone to scan for BT radio signals at home, and finds a printer and a home appliance that transmit regular BT beacon signals. These are fixed location signals. The owner programs a conditional rule on a menu that defines a trigger condition as the MAC address or service UID of the fixed location signal and an executable as a command to move to a power savings mode when the fixed location signal is detected. This conditional rule is stored in the instruction stack of the XCB radiotag. When a correlator of the radiotag detects the fixed location signal, it moves to a power savings mode because it is home and is in a safe zone where frequent location updates are not needed.

In a related embodiment, at times when the radiotag cannot detect the fixed location signal, a rule is executed whereby the radiotag moves to a cellular network connection state with more frequent location updates to the cloud host.

Alternatively, the cloud host can analyze BT traffic using radio call logs transmitted from the XCB radiotag to the cloud host and can identify radio signals reliably associated with familiar locations such as home or office, each of which may define a "safe zone". The cloud host can then autoprovision the XCB radiotag to toggle power to its cellular modem, activating more frequent location updates when the radiotag is not in a safe zone and reducing power to the cellular modem when the radiotag is in a safe zone. The correlator output is coupled to a flag in the instruction stack so that if a fixed location signal is detected, the cellular modem will negotiate a power-savings protocol with the cellular network provider, for example an extended eDRX or PSM power savings mode.

Example VI (ExVI)

Pet Location And Monitoring Services: A dog is provided with a collar that includes an XCB radiotag 2800. The cloud host autoprovisions the radiotag with one or more BT radio signatures that are reliably associated with a particular location, for example a back yard of a home. The instruction stack in the radiotag is configured so that if a correlator of the radiotag detects a trigger radio signature, then the cellular modem will operate in a power savings mode. But if upon scanning its radio environment (after the dog has jumped the fence, for example), the radiotag scanner no longer detects the trigger radio signature, then the instruction stack will execute commands to activate the transmission of more frequent location updates to a cloud host.

A similar regimen can be operated using a WiFi hub to define a virtual leash around a safe zone. But the advantage of a BT virtual safezone is that it can be defined using BT radio signatures that are "native" to a particular location and require no point-to-point connection to serve as a trigger condition for activating a conditional rule by which an action or a notification is effected. The BT signals used for flagging an escaped dog need not be associated with owner-provided hardware, and can be anonymous. In short, signals from groups and crowds of beacons may provision and even autoprovision notifications. An escaped dog notification will be presented to the owner if there is a transition in the BT signal environment from familiar to alien, and if the radio collar detects a persistent alien signal environment for more than a minute or so, then it will begin generating cellular location data that can be sent to the owner via the system host. The owner can select the notification sensitivity and frequency based on experience and in some instances, the alert can be sent instantly if the dog collar detects a signal that is not expected and loses a signal that is expected, for example, reducing the incidence of false positives. This regimen can be implemented with a few memory registers for storing BT reference signals, a correlator that compares the BT radio traffic with the reference signals, and a program that periodically executes a scan of local BT radio traffic.

In addition, other locations can be readily defined as "familiar and safe" or "dangerous and to be avoided" without the need to install new hardware. By limiting the scans of the BT radio environment to 200 ms at a time, and selecting a latency of 1 or 2 minutes between scans, for example, a compromise can be achieved between battery service life and system latency in which the dog's owner will receive a timely notification from the cloud host if the dog has jumped the fence. The notification to the owner's smartphone 70 may include a map with a moving map pin that shows the dog's location in real time, for example. The cloud host 58 causes the owner's smartphone to display the notification and map and provides other assistance in tracking the dog. A passerby who sees the dog may also receive a notification that the dog is lost if the passerby has a smartphone that operates the lost-and-found software package 700 (FIG. 37) or if the passerby presses the multi-function button (2815, FIG. 28A) on the device. More details of this system are provided in co-pending and co-owned U.S. patent application Ser. No. 16/950,666, which is incorporated in full by reference.

Example VII

Remote Actuation and Control: In another instance of the preceding example (see ExVI above), the executable command paired in the conditional rule is a command to negotiate an eDRX or a PSM mode with a telecomm network, and the trigger signal is a BT signal that is non-specific as a command parameter unless tied to a conditional rule programmed by the user and stored in a user profile on cloud host 58, or is programmed by a system administrator for a community of users. The trigger signal may be received by the owner's smartphone or by a passerby's smartphone, and when communicated to the cloud, the information in the signal results in an execution of a machine action or a notification, such as a display. The effector of the command may be a smartphone, an XCB radiotag, a BT tracking device, a BT device, a cellular radio device, a remote machine, a cloud server, or a networked system.

We claim:

1. A non-transitory computer-readable medium storing instructions that, when executed by a processor of a network-connectable smart device, cause the smart device to operate in association with a radiotag ("the radiotag"), the radiotag broadcasts a radio signal ("the radio signal"), and to perform the following actions:
   a) receive a spread spectrum, frequency hopping radio signal (the signal) from the radiotag, the radio signal having information, the information comprising a radiotag-owner identification code and a community identification code;
   b) generate a radio message that includes the information from the radiotag;
   c) transmit the radio message to a network server configured to:
      i) in response to the radiotag-owner identification code in the message, associate the radio message with a user profile of a radiotag owner and access the user profile from an administrative database;
      ii) in response to the information, determine a command or notification based one or more conditional logic-based rules, wherein each conditional rule comprises,
         (x) a first part defining a customizable trigger condition comprising any one of or combination of: the radiotag owner identifier code information, a radiotag sensor output information, a sensor output information added by the smart device, a timestamp, a radio range proximity information, a mappable location information, a radiotag group member information;
         (y) a second part defining executable function of a remote machine;
      such that IF the radio message received from the smart device contains information that satisfies the customizable trigger condition of the conditional rule, THEN cause the remote machine to execute the executable function.

2. The non-transitory computer-readable medium of claim 1, wherein the instructions, when executed by the processor, causes the smart device to generate, on a display of the smart device, a graphical user interface configured to allow customization of the user profile in the administrative database.

3. The non-transitory computer-readable medium of claim 1 wherein the radio message generated by the smart device includes a timestamp.

4. The non-transitory computer-readable medium of claim 3 wherein the radio message generated by the smart device includes a geostamp.

5. The non-transitory computer-readable medium of claim 1 wherein the information generated by the radiotag includes a sensor data payload.

6. The non-transitory computer-readable medium of claim 5, wherein the sensor data payload includes motion-sensor output data generated by a motion sensor within the radiotag.

7. The non-transitory computer-readable medium of claim 5, wherein the sensor data payload includes temperature-sensor output data generated by a temperature sensor within the radiotag.

8. The non-transitory computer-readable medium of claim 5, wherein the sensor data payload includes button-press-switch-sensor output data generated by a button-press switch within the radiotag.

9. The non-transitory computer-readable medium of claim 1 wherein the information generated by the radiotag includes a community identification code.

10. The non-transitory computer-readable medium of claim 1 wherein the radio message generated by the smart device includes a radiotag proximity measurement.

11. The non-transitory computer-readable medium of claim 1, wherein the instructions, when executed by the processor, cause the smart device to measure a signal strength of the radio signal from the radiotag, to generate a radio proximity measurement, and to include the radio proximity measurement in the information in the radio message.

12. The non-transitory computer-readable medium of claim 1, wherein the instructions, when executed by the processor, cause the smart device to send the radio message, with a timestamp and a geostamp, to an administrative server configured to: in response to the information, determine a command or notification based on rules associated with the user profile and community policies and permissions; and, send said command or notification to a smart device, a remote machine, or an actuation device.

13. The non-transitory computer readable medium of claim 1, wherein the instructions, when executed by the processor, cause the smart device to generate a graphical map on a display screen of the smart device and to display on the graphical map the mappable location information.

14. The non-transitory computer readable medium of claim 13, wherein the graphical map shows a track of the mappable locations at which the radio signal was detected; and, wherein the radiotag is associated with a lost or missing article, a child, a pet, or a friend.

15. The non-transitory computer readable medium of claim 1, wherein the instructions, when executed by the processor, causes the smart device to request, from the administrative server, a report of a location at which the radio signal was last detected.

16. The non-transitory computer readable medium of claim 1, wherein the smart device is selected from a smart phone, a laptop, a personal assistant, or a smart watch.

17. The non-transitory computer readable medium of claim 1, wherein the instructions, when executed by the processor, causes the smart device to report a satellite location or a system location associated with detection of the radiotag radio signal to the administrative server.

18. The non-transitory computer-readable medium of claim 10, wherein the instructions, when executed by the processor, causes the smart device to use the radiotag proximity measurement as a trigger condition and the paired executable function of the conditional rule is a command to actuate an alarm apparatus of the smart device when the trigger condition is satisfied.

19. The non-transitory computer readable medium of claim 10, wherein the instructions, when executed by the processor, causes the smart device to use any of time condition, date condition, location condition, motion information condition, temperature sensor condition, light sensor condition, and radio range information condition as a trigger condition or conditions.

20. The non-transitory computer readable medium of claim 1, wherein the instructions, when executed by the processor, causes the smart device to define a click signal in a received radio signal as a trigger condition of a custom conditional rule.

21. The non-transitory computer readable medium of claim 1, wherein the instructions, when executed by the processor, causes the smart device to transmit the radio message to a system-designated cloud server, wherein no location or motion information is derived by the radiotag from a GPS signal.

22. The non-transitory computer-readable medium of claim 1, wherein the instructions, when executed by the processor, causes the smart device to transmit the radio message to a system-designated cloud server, wherein no location information is received from the radiotag.

23. The non-transitory computer readable medium of claim 1, wherein the radiotag comprises a cellular radio.

24. The non-transitory computer readable medium of claim 1, wherein the network-connectable smart device is a smartphone.

25. The non-transitory computer readable medium of claim 1, wherein the executable function is a command or a notification.

26. A non-transitory computer-readable medium storing instructions that, when executed by a processor of a network-connectable control apparatus having an internal motion sensor with motion sensor output, cause the smart device to:
  a) for each of a plurality of frequency-hopping, spread-spectrum radiotags (the "radiotags", each radiotag broadcasting a radiotag signal) that define a group of radiotags, receive the radio signal, the radio signal having information, the information comprising a radio unit identifier code, a community identification code, and a motion sensor output information from a motion sensor within each radiotag;
  b) compare a motion sensor output of the internal motion sensor of the smart device with the motion sensor output information received from any of the one or more radiotags; and,
  c) display a notification IF the motion sensor output of the internal motion sensor is inconsistent with the motion sensor output information received from any of the one or more of the motion sensor outputs of the group of radiotags.

27. The non-transitory computer readable medium of claim 26, wherein the instructions, when executed by the processor, causes the smart device to display a menu for monitoring the relative motion sensor outputs of a group of radiotags on a single display screen.

28. A system for making radio range-based alerts, which comprises:
(a) a radiotag tagged with a unique radiotag identifier and a community identification code, the radiotag having an instruction set which when executed by the radiotag causes the radiotag to broadcast a spread spectrum, frequency hopping radio signal ("the signal") at a defined power, the signal including the unique radiotag identifier and the community identification code;
(b) a control apparatus having a processor, a display, and a computer-readable instruction set with an instruction set that define an application installed in a non-transitory computer-readable memory, wherein the control apparatus, by the processor, is enabled to execute the application and, in response to the signal from the radiotag, execute instructions for:
i) by a spread spectrum, frequency hopping radio transceiver in the control apparatus, measuring a received radio signal strength of the signal;
ii) calculating a radio proximity range from the received radio signal strength; and,
iii) based on a change in the radio proximity range, if detected as a weakening signal over a defined interval of time; then causing a LEFT BEHIND alert to be displayed on the display of the control apparatus.

29. The system of claim 28, wherein the LEFT BEHIND alert includes a visual display.

30. The system of claim 28, wherein the LEFT BEHIND alert includes an audible display.

31. The system of claim 28, wherein the instructions include, by the control apparatus, an instruction to transmit to the radiotag a command that causes the radiotag to enter an alarm state detectable at a distance.

32. The system of claim 28, wherein the control apparatus includes a cellular radio connectable to a cellular network, and the cellular network includes a cloud host, wherein the executable instructions are configured to cause the control apparatus to compose a network-transmissible message having the unique radiotag identifier, the community identification code, a time stamp and a geostamp, and to send that message to the cloud host.

33. The system of claim 28, wherein the control apparatus is a smartphone.

34. The system of claim 28, wherein the radiotag includes one or more sensors, broadcasts a signal containing sensor data, and the control apparatus includes instructions that parse received sensor data as a trigger for one or more executable functions according to the conditional rules.

35. The system of claim 28, wherein the radiotag includes a motion sensor, broadcasts a signal containing motion sensor data, and the control apparatus includes instructions that parse the received signal with motion sensor data as a trigger for one or more executable functions according to the conditional rules.

36. The system of claim 28, wherein the control apparatus includes a motion sensor and a memory for buffering current motion sensor output data, and wherein the control apparatus receives motion sensor data from a tracking device, and by a conditional rule or rules executed by the control apparatus, causes a visual or audible alert on the display if the timecourse of motion sensor data from the radiotag is not copacetic with the motion sensor data from the control apparatus.

37. The system of claim 36, wherein the buffered data is overridden if motion is copacetic, or the counter is reset if there is a period in which the control apparatus and the radiotag are stationary.

38. The system of claim 28, wherein the radiotag includes a heading sensor, broadcasts a signal containing heading sensor data, and the control apparatus includes instructions that parse the received signal with heading sensor data as a trigger for one or more executable functions according to the conditional rules.

39. The system of claim 28, wherein the control apparatus includes a heading sensor and a memory for buffering current heading sensor output data, and wherein the control apparatus receives heading sensor data from a tracking device, and by a conditional rule or rules executed by the control apparatus, causes a visual or audible alert on the display if the timecourse of heading sensor data from the radiotag is not copacetic with the heading sensor data from the control apparatus.

40. The system of claim 39, wherein the buffered data is overridden if heading is copacetic, or the counter is reset if there is a period in which the control apparatus and the radiotag are stationary.

41. The system of claim 1, wherein the radiotag comprises a multi-function switch operable to output switch data that is functional as a trigger condition when received by the control apparatus.

42. The non-transitory computer-readable medium of claim 1, wherein the control apparatus is a smartphone and wherein the community identification code, when received by the smartphone, encodes an IP Address of the network server at which user profiles are stored.

43. The non-transitory computer-readable medium of claim 1, wherein the instruction set executed by the control apparatus enables the control apparatus to store radiotag data records in a memory, each record corresponding to a radio contact with a radiotag, each record comprising a computer-readable community identification code common to a plurality of radiotags associated with a community of users, an individual radiotag unit identifier associated with an individual user, and sensor data included in the signal from the radiotag, and to forward radiotag data records to the network server.

44. The non-transitory computer-readable medium of claim 43, wherein the network server is configured to execute a community rule or rules by aggregation of forwarded radiotag data received from a plurality of control apparatuses operated by a community of users, to compute a condition or conditions identifiable in the aggregated paired radiotag data, and to transmit a programmable command or commands to one or more of the control apparatuses, to the community of control apparatus users, or to a designated remote machine, wherein the programmable command or commands is associated with the condition or conditions by conditional rules-based logic.

* * * * *